United States Patent
Salem et al.

(10) Patent No.: US 12,169,556 B2
(45) Date of Patent: *Dec. 17, 2024

(54) SYSTEMS AND METHODS FOR EXECUTABLE CODE DETECTION, AUTOMATIC FEATURE EXTRACTION AND POSITION INDEPENDENT CODE DETECTION

(71) Applicant: SENTINEL LABS ISRAEL LTD., Tel Aviv (IL)

(72) Inventors: Shlomi Salem, Tel Aviv (IL); Roy Ronen, Raanana (IL); Assaf Nativ, Tel Aviv-Jaffa (IL); Amit Zohar, Tel Aviv-Jaffa (IL); Gal Braun, Ness Ziona (IL); Pavel Ferencz, Beer Sheva (IL); Eitan Shterenbaum, Kiryat-Ono (IL); Tal Maimon, Rishon LeZiyon (IL)

(73) Assignee: SENTINEL LABS ISRAEL LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,657

(22) Filed: Oct. 16, 2023

(65) Prior Publication Data

US 2024/0184884 A1 Jun. 6, 2024

Related U.S. Application Data

(63) Continuation of application No. 18/089,038, filed on Dec. 27, 2022, now Pat. No. 11,790,079, which is a
(Continued)

(51) Int. Cl.
*G06F 21/56* (2013.01)
*G06F 21/54* (2013.01)

(52) U.S. Cl.
CPC ............ *G06F 21/54* (2013.01); *G06F 21/566* (2013.01); *G06F 2221/033* (2013.01)

(58) Field of Classification Search
CPC .. G06F 21/54; G06F 21/566; G06F 2221/033; G06F 21/577; G06F 21/563
See application file for complete search history.

(56) References Cited

U.S. PATENT DOCUMENTS

| 4,979,118 A | 12/1990 | Kheradpir |
| 5,311,593 A | 5/1994 | Carmi |

(Continued)

FOREIGN PATENT DOCUMENTS

| CN | 103607399 A | 2/2014 |
| EP | 3 171 568 A1 | 5/2017 |

(Continued)

OTHER PUBLICATIONS

Barbhuiya et al., "Detection of neighbor solicitation and advertisement spoofing in IPV6 neighbor discovery protocol." Proceedings of the 4th international conference on Security of information and networks. (2011).

(Continued)

*Primary Examiner* — Izunna Okeke
(74) *Attorney, Agent, or Firm* — Perkins Coie LLP

(57) ABSTRACT

Disclosed herein are systems and methods for enabling the automatic detection of executable code from a stream of bytes. In some embodiments, the stream of bytes can be sourced from the hidden areas of files that traditional malware detection solutions ignore. In some embodiments, a machine learning model is trained to detect whether a particular stream of bytes is executable code. Other embodiments described herein disclose systems and methods for automatic feature extraction using a neural network. Given a new file, the systems and methods may preprocess the code
(Continued)

to be inputted into a trained neural network. The neural network may be used as a "feature generator" for a malware detection model. Other embodiments herein are directed to systems and methods for identifying, flagging, and/or detecting threat actors which attempt to obtain access to library functions independently.

20 Claims, 20 Drawing Sheets

Related U.S. Application Data continuation of application No. 17/448,327, filed on Sep. 21, 2021, now Pat. No. 11,580,218, which is a continuation of application No. 16/920,630, filed on Jul. 3, 2020, now Pat. No. 11,210,392, which is a continuation of application No. 16/879,625, filed on May 20, 2020, now Pat. No. 10,762,200.

(60) Provisional application No. 62/854,118, filed on May 29, 2019, provisional application No. 62/850,170, filed on May 20, 2019, provisional application No. 62/850,182, filed on May 20, 2019.

(56) References Cited

U.S. PATENT DOCUMENTS

| | | | |
|---|---|---|---|
| 6,154,844 A | 11/2000 | Touboul et al. |
| 6,157,953 A | 12/2000 | Chang et al. |
| 6,728,716 B1 | 4/2004 | Bhattacharya et al. |
| 6,804,780 B1 | 10/2004 | Touboul |
| 6,836,888 B1 | 12/2004 | Basu et al. |
| 7,076,696 B1 | 7/2006 | Stringer |
| 7,093,239 B1 | 8/2006 | Van der Made |
| 7,181,769 B1 | 2/2007 | Keanini et al. |
| 7,225,468 B2 | 5/2007 | Waisman et al. |
| 7,299,294 B1 | 11/2007 | Bruck et al. |
| 7,305,546 B1 | 12/2007 | Miller |
| 7,322,044 B2 | 1/2008 | Hrastar |
| 7,464,407 B2 | 12/2008 | Nakae et al. |
| 7,530,106 B1 | 5/2009 | Zaitsev et al. |
| 7,543,269 B2 | 6/2009 | Krueger |
| 7,546,587 B2 | 6/2009 | Marr et al. |
| 7,574,740 B1 | 8/2009 | Kennis |
| 7,596,807 B2 | 9/2009 | Ptacek et al. |
| 7,596,808 B1 | 9/2009 | Wilkinson et al. |
| 7,710,933 B1 | 5/2010 | Sundaralingam et al. |
| 7,739,516 B2 | 6/2010 | Bender et al. |
| 7,832,012 B2 | 11/2010 | Huddleston |
| 7,882,538 B1 | 2/2011 | Palmer |
| 7,890,612 B2 | 2/2011 | Todd et al. |
| 7,937,755 B1 | 5/2011 | Guruswamy |
| 7,984,129 B2 | 7/2011 | Vaught |
| 8,015,605 B2 | 9/2011 | Yegneswaran |
| 8,024,795 B2 | 9/2011 | Newton |
| 8,042,186 B1 | 10/2011 | Polyakov et al. |
| 8,065,722 B2 | 11/2011 | Barford et al. |
| 8,078,556 B2 | 12/2011 | Adi et al. |
| 8,082,471 B2 | 12/2011 | Khan |
| 8,131,281 B1 | 3/2012 | Hildner et al. |
| 8,141,154 B2 | 3/2012 | Gruzman et al. |
| 8,156,556 B2 | 4/2012 | Krishnamurthy |
| 8,171,545 B1 | 5/2012 | Cooley et al. |
| 8,181,033 B1 | 5/2012 | Paul et al. |
| 8,181,250 B2 | 5/2012 | Rafalovich et al. |
| 8,204,984 B1 | 6/2012 | Aziz |
| 8,205,035 B2 | 6/2012 | Reddy et al. |
| 8,230,505 B1 | 7/2012 | Ahrens et al. |
| 8,296,842 B2 | 10/2012 | Singh et al. |
| 8,327,442 B2 | 12/2012 | Herz et al. |
| 8,353,033 B1 | 1/2013 | Chen et al. |
| 8,370,931 B1 | 2/2013 | Chien et al. |
| 8,375,444 B2 | 2/2013 | Aziz et al. |
| 8,375,447 B2 | 2/2013 | Amoroso et al. |
| 8,413,238 B1 | 4/2013 | Sutton |
| 8,413,241 B2 | 4/2013 | Weeks et al. |
| 8,418,250 B2 | 4/2013 | Morris et al. |
| 8,438,386 B2 | 5/2013 | Hegli et al. |
| 8,438,626 B2 | 5/2013 | Anderson et al. |
| 8,443,442 B2 | 5/2013 | Wang et al. |
| 8,474,044 B2 | 6/2013 | Zawadowskiy et al. |
| 8,488,466 B2 | 7/2013 | Breslin et al. |
| 8,528,057 B1 | 9/2013 | Garrett |
| 8,528,087 B2 | 9/2013 | Hsu et al. |
| 8,538,578 B2 | 9/2013 | Battles et al. |
| 8,539,582 B1 | 9/2013 | Aziz et al. |
| 8,549,643 B1 | 10/2013 | Shou |
| 8,555,385 B1 | 10/2013 | Bhatkar et al. |
| 8,561,177 B1 | 10/2013 | Aziz et al. |
| 8,566,946 B1 | 10/2013 | Aziz et al. |
| 8,607,054 B2 | 12/2013 | Ramarathinam et al. |
| 8,607,340 B2 | 12/2013 | Wright |
| 8,627,475 B2 | 1/2014 | Loveland et al. |
| 8,677,494 B2 | 3/2014 | Edery et al. |
| 8,713,306 B1 | 4/2014 | Bennett |
| 8,719,937 B2 | 5/2014 | Sundaram et al. |
| 8,725,898 B1 | 5/2014 | Vincent |
| 8,726,389 B2 | 5/2014 | Morris et al. |
| 8,732,296 B1 | 5/2014 | Thomas et al. |
| 8,752,173 B2 | 6/2014 | Yadav |
| 8,789,135 B1 | 7/2014 | Pani |
| 8,793,151 B2 | 7/2014 | Delzoppo et al. |
| 8,821,242 B2 | 9/2014 | Hinman et al. |
| 8,839,369 B1 | 9/2014 | Dai et al. |
| 8,849,880 B2 | 9/2014 | Thelen |
| 8,850,582 B2 | 9/2014 | Endoh et al. |
| 8,880,435 B2 | 11/2014 | Catlett et al. |
| 8,881,282 B1 | 11/2014 | Aziz et al. |
| 8,893,278 B1 | 11/2014 | Chechik |
| 8,898,788 B1 | 11/2014 | Aziz et al. |
| 8,904,527 B2 | 12/2014 | Dawson et al. |
| 8,943,594 B1 | 1/2015 | Arrowood |
| 8,949,986 B2 | 2/2015 | Ben-Shalom |
| 8,959,338 B2 | 2/2015 | Snow et al. |
| 8,973,142 B2 | 3/2015 | Shulman et al. |
| 8,984,637 B2 | 3/2015 | Karecha et al. |
| 9,009,829 B2 | 4/2015 | Stolfo et al. |
| 9,027,135 B1 | 5/2015 | Aziz |
| 9,043,920 B2 | 5/2015 | Gula et al. |
| 9,081,747 B1 | 7/2015 | Tabieros et al. |
| 9,117,078 B1 | 8/2015 | Chien et al. |
| 9,141,792 B2 | 9/2015 | Baluda et al. |
| 9,166,993 B1 | 10/2015 | Liu |
| 9,185,136 B2 | 11/2015 | Dulkin et al. |
| 9,195,480 B2 | 11/2015 | Wang et al. |
| 9,197,601 B2 | 11/2015 | Pasdar |
| 9,213,838 B2 | 12/2015 | Lu |
| 9,225,734 B1 | 12/2015 | Hastings |
| 9,240,976 B1 | 1/2016 | Murchison |
| 9,246,774 B2 | 1/2016 | Mataitis et al. |
| 9,270,690 B2 | 2/2016 | Kraitsman et al. |
| 9,305,165 B2 | 4/2016 | Snow et al. |
| 9,329,973 B2 | 5/2016 | Bhuyan |
| 9,330,259 B2 | 5/2016 | Klein et al. |
| 9,356,942 B1 | 5/2016 | Joffe |
| 9,356,950 B2 | 5/2016 | Vissamsetty et al. |
| 9,369,476 B2 | 6/2016 | Chekina et al. |
| 9,386,034 B2 | 7/2016 | Cochenour |
| 9,398,001 B1 | 7/2016 | Tidd |
| 9,407,602 B2 | 7/2016 | Feghali et al. |
| 9,413,721 B2 | 8/2016 | Morris et al. |
| 9,430,646 B1 | 8/2016 | Mushtaq et al. |
| 9,432,360 B1 | 8/2016 | Triandopoulos et al. |
| 9,438,614 B2 | 9/2016 | Herz |
| 9,495,188 B1 | 11/2016 | Ettema et al. |
| 9,503,470 B2 | 11/2016 | Gertner et al. |
| 9,547,516 B2 | 1/2017 | Thakkar et al. |
| 9,578,045 B2 | 2/2017 | Jaroch et al. |
| 9,591,006 B2 | 3/2017 | Siva et al. |
| 9,601,000 B1 | 3/2017 | Gruss et al. |
| 9,602,531 B1 | 3/2017 | Wallace et al. |
| 9,606,893 B2 | 3/2017 | Gupta et al. |

(56) References Cited

U.S. PATENT DOCUMENTS

| | | |
|---|---|---|
| 9,607,146 B2 | 3/2017 | Sridhara et al. |
| 9,609,019 B2 | 3/2017 | Vissamsetty et al. |
| 9,628,498 B1 | 4/2017 | Aziz et al. |
| 9,641,544 B1 | 5/2017 | Treat et al. |
| 9,641,550 B2 | 5/2017 | Kraitsman et al. |
| 9,705,904 B1 * | 7/2017 | Davis .................... G06F 21/562 |
| 9,710,648 B2 | 7/2017 | Weingarten |
| 9,712,547 B2 | 7/2017 | Touboul et al. |
| 9,769,204 B2 | 8/2017 | Vissamsetty et al. |
| 9,772,832 B2 | 9/2017 | Rubio |
| 9,781,148 B2 | 10/2017 | Mahaffey et al. |
| 9,807,092 B1 | 10/2017 | Gutzmann |
| 9,807,115 B2 | 10/2017 | Kolton et al. |
| 9,813,451 B2 | 11/2017 | Honda et al. |
| 9,871,766 B2 | 1/2018 | Syed et al. |
| 9,877,210 B1 | 1/2018 | Hildner et al. |
| 9,888,032 B2 | 2/2018 | Dekel et al. |
| 9,898,763 B1 | 2/2018 | Vaynblat et al. |
| 9,942,270 B2 | 3/2018 | Vissamsetty et al. |
| 10,025,928 B2 | 7/2018 | Jaroch et al. |
| 10,044,675 B1 | 8/2018 | Ettema et al. |
| 10,102,374 B1 | 10/2018 | Cohen et al. |
| 10,169,586 B2 | 1/2019 | Maciejak et al. |
| 10,237,282 B2 | 3/2019 | Nelson et al. |
| 10,250,636 B2 | 4/2019 | Vissamsetty et al. |
| 10,257,224 B2 | 4/2019 | Jaroch et al. |
| 10,284,591 B2 | 5/2019 | Giuliani et al. |
| 10,375,110 B2 | 7/2019 | Vissamsetty et al. |
| 10,382,484 B2 | 8/2019 | Shayevitz et al. |
| 10,476,891 B2 | 11/2019 | Vissamsetty et al. |
| 10,509,905 B2 | 12/2019 | Vissamsetty et al. |
| 10,542,044 B2 | 1/2020 | Vissamsetty et al. |
| 10,567,431 B2 | 1/2020 | Vissamsetty et al. |
| 10,574,698 B1 | 2/2020 | Sharifi |
| 10,599,842 B2 | 3/2020 | Vissamsetty et al. |
| 10,599,844 B2 | 3/2020 | Schmidtler et al. |
| 10,609,074 B2 | 3/2020 | Vissamsetty et al. |
| 10,757,090 B2 | 8/2020 | Kahol et al. |
| 10,826,941 B2 | 11/2020 | Jain et al. |
| 10,855,671 B2 | 12/2020 | Kahol et al. |
| 10,938,854 B2 | 3/2021 | Strogov et al. |
| 11,032,301 B2 | 6/2021 | Mandrychenko et al. |
| 11,038,658 B2 | 6/2021 | Vissamsetty et al. |
| 11,171,974 B2 | 11/2021 | Gertner et al. |
| 11,470,115 B2 | 10/2022 | Vissamsetty et al. |
| 11,507,663 B2 | 11/2022 | Cohen et al. |
| 11,522,894 B2 | 12/2022 | Weingarten et al. |
| 11,579,857 B2 | 2/2023 | Montag et al. |
| 11,580,218 B2 | 2/2023 | Enfinger |
| 2002/0010800 A1 | 1/2002 | Riley et al. |
| 2002/0016826 A1 | 2/2002 | Johansson et al. |
| 2002/0078382 A1 | 6/2002 | Sheikh et al. |
| 2002/0093917 A1 | 7/2002 | Knobbe et al. |
| 2002/0095607 A1 | 7/2002 | Lin-Hendel |
| 2002/0178374 A1 | 11/2002 | Swimmer et al. |
| 2002/0194489 A1 | 12/2002 | Almogy et al. |
| 2003/0065950 A1 | 4/2003 | Yarborough |
| 2003/0145225 A1 | 7/2003 | Bruton et al. |
| 2003/0145226 A1 | 7/2003 | Bruton et al. |
| 2003/0152034 A1 | 8/2003 | Zhang et al. |
| 2003/0188189 A1 | 10/2003 | Desai et al. |
| 2003/0223367 A1 | 12/2003 | Shay et al. |
| 2004/0083369 A1 | 4/2004 | Erlingsson et al. |
| 2004/0172557 A1 | 9/2004 | Nakae et al. |
| 2004/0243699 A1 | 12/2004 | Koclanes et al. |
| 2004/0255157 A1 | 12/2004 | Ghanea-Hercock |
| 2005/0050353 A1 | 3/2005 | Thiele et al. |
| 2005/0076235 A1 | 4/2005 | Ormazabal et al. |
| 2005/0076238 A1 | 4/2005 | Ormazabal et al. |
| 2005/0108562 A1 * | 5/2005 | Khazan ............... G06F 11/3604 726/23 |
| 2005/0138402 A1 | 6/2005 | Yoon et al. |
| 2005/0204157 A1 | 9/2005 | Johnson |
| 2005/0223239 A1 | 10/2005 | Dotan |
| 2005/0240989 A1 | 10/2005 | Kim et al. |
| 2006/0053490 A1 | 3/2006 | Herz et al. |
| 2006/0085543 A1 | 4/2006 | Hrastar |
| 2006/0101515 A1 | 5/2006 | Amoroso et al. |
| 2006/0126522 A1 | 6/2006 | Oh |
| 2006/0161989 A1 | 7/2006 | Reshef et al. |
| 2006/0203774 A1 | 9/2006 | Carrion-Rodrigo |
| 2006/0209701 A1 | 9/2006 | Zhang et al. |
| 2006/0230129 A1 | 10/2006 | Swami et al. |
| 2006/0236401 A1 | 10/2006 | Fosdick |
| 2007/0022090 A1 | 1/2007 | Graham |
| 2007/0025374 A1 | 2/2007 | Stefan et al. |
| 2007/0067623 A1 | 3/2007 | Ward |
| 2007/0097976 A1 | 5/2007 | Wood et al. |
| 2007/0100905 A1 | 5/2007 | Masters et al. |
| 2007/0101431 A1 | 5/2007 | Clift et al. |
| 2007/0115993 A1 | 5/2007 | Cohen |
| 2007/0143827 A1 | 6/2007 | Nicodemus et al. |
| 2007/0143851 A1 | 6/2007 | Nicodemus et al. |
| 2007/0177499 A1 | 8/2007 | Gavrilescu et al. |
| 2007/0208822 A1 | 9/2007 | Wang et al. |
| 2007/0208936 A1 | 9/2007 | Ramos |
| 2007/0209070 A1 | 9/2007 | Yadav |
| 2007/0226320 A1 | 9/2007 | Hager et al. |
| 2007/0240215 A1 | 10/2007 | Flores et al. |
| 2007/0250930 A1 | 10/2007 | Aziz et al. |
| 2007/0282782 A1 | 12/2007 | Carey et al. |
| 2008/0005782 A1 | 1/2008 | Aziz |
| 2008/0018927 A1 | 1/2008 | Martin et al. |
| 2008/0022000 A1 | 1/2008 | Furuya et al. |
| 2008/0034429 A1 | 2/2008 | Schneider |
| 2008/0046989 A1 | 2/2008 | Wahl |
| 2008/0060074 A1 | 3/2008 | Okuyama |
| 2008/0071728 A1 | 3/2008 | Lim |
| 2008/0082722 A1 | 4/2008 | Savagaonkar et al. |
| 2008/0083034 A1 | 4/2008 | Kim et al. |
| 2008/0098476 A1 | 4/2008 | Syversen |
| 2008/0104046 A1 | 5/2008 | Singla et al. |
| 2008/0127346 A1 | 5/2008 | Oh et al. |
| 2008/0162397 A1 | 7/2008 | Zaltzman |
| 2008/0168559 A1 | 7/2008 | Touitou et al. |
| 2008/0170566 A1 | 7/2008 | Akimoto |
| 2008/0229415 A1 | 9/2008 | Kapoor et al. |
| 2009/0077664 A1 | 3/2009 | Hsu et al. |
| 2009/0089040 A1 | 4/2009 | Monastyrsky et al. |
| 2009/0104046 A1 | 4/2009 | Martin et al. |
| 2009/0158407 A1 | 6/2009 | Nicodemus et al. |
| 2009/0158418 A1 | 6/2009 | Rao et al. |
| 2009/0170566 A1 | 7/2009 | Kwon et al. |
| 2009/0199296 A1 | 8/2009 | Xie et al. |
| 2009/0241173 A1 | 9/2009 | Troyansky |
| 2009/0249466 A1 | 10/2009 | Motil et al. |
| 2009/0249470 A1 | 10/2009 | Litvin et al. |
| 2009/0254973 A1 | 10/2009 | Kwan |
| 2009/0288158 A1 | 11/2009 | Izatt et al. |
| 2009/0296641 A1 | 12/2009 | Bienas et al. |
| 2009/0327688 A1 | 12/2009 | Li et al. |
| 2009/0328196 A1 | 12/2009 | Bovee |
| 2010/0005339 A1 | 1/2010 | Hooks |
| 2010/0077483 A1 | 3/2010 | Stolfo et al. |
| 2010/0122317 A1 | 5/2010 | Yadav |
| 2010/0122343 A1 | 5/2010 | Ghosh et al. |
| 2010/0169973 A1 | 7/2010 | Kim et al. |
| 2010/0269175 A1 | 10/2010 | Stolfo et al. |
| 2010/0293615 A1 | 11/2010 | Ye |
| 2010/0299430 A1 | 11/2010 | Powers et al. |
| 2011/0023118 A1 | 1/2011 | Wright et al. |
| 2011/0067107 A1 | 3/2011 | Weeks et al. |
| 2011/0078309 A1 | 3/2011 | Bloch |
| 2011/0099633 A1 | 4/2011 | Aziz |
| 2011/0113427 A1 | 5/2011 | Dotan |
| 2011/0138456 A1 | 6/2011 | Ormazabal et al. |
| 2011/0141937 A1 | 6/2011 | Breslin et al. |
| 2011/0145920 A1 | 6/2011 | Mahaffey et al. |
| 2011/0167494 A1 | 7/2011 | Bowen |
| 2011/0178930 A1 | 7/2011 | Scheidt et al. |
| 2011/0185430 A1 | 7/2011 | Sallam |
| 2011/0214176 A1 | 9/2011 | Burch et al. |
| 2011/0214182 A1 | 9/2011 | Adams et al. |
| 2011/0219443 A1 | 9/2011 | Hampel |

(56) References Cited

U.S. PATENT DOCUMENTS

| | | |
|---|---|---|
| 2011/0219449 A1 | 9/2011 | St. Neitzel |
| 2011/0247071 A1 | 10/2011 | Hooks et al. |
| 2011/0271341 A1 | 11/2011 | Satish et al. |
| 2011/0288940 A1 | 11/2011 | Hordan et al. |
| 2012/0023572 A1 | 1/2012 | William, Jr. et al. |
| 2012/0030745 A1 | 2/2012 | Bauer |
| 2012/0030750 A1 | 2/2012 | Bhargava et al. |
| 2012/0079596 A1 | 3/2012 | Thomas et al. |
| 2012/0084866 A1 | 4/2012 | Stolfo |
| 2012/0106377 A1 | 5/2012 | Sommers et al. |
| 2012/0124363 A1 | 5/2012 | Dietrich et al. |
| 2012/0137342 A1 | 5/2012 | Hartrell et al. |
| 2012/0137367 A1 | 5/2012 | Dupont et al. |
| 2012/0144488 A1 | 6/2012 | Sankruthi |
| 2012/0151565 A1 | 6/2012 | Fiterman |
| 2012/0185563 A1 | 7/2012 | Sugiyama et al. |
| 2012/0240182 A1 | 9/2012 | Marayanaswamy et al. |
| 2012/0255003 A1 | 10/2012 | Sallam |
| 2012/0255004 A1 | 10/2012 | Sallam |
| 2012/0291090 A1 | 11/2012 | Srinivasan et al. |
| 2012/0297488 A1 | 11/2012 | Kapoor et al. |
| 2012/0324094 A1 | 12/2012 | Wyatt et al. |
| 2012/0331553 A1 | 12/2012 | Aziz et al. |
| 2013/0052992 A1 | 2/2013 | Lee et al. |
| 2013/0054682 A1 | 2/2013 | Malik et al. |
| 2013/0061097 A1 | 3/2013 | Mendel et al. |
| 2013/0080641 A1 | 3/2013 | Lui et al. |
| 2013/0086684 A1 | 4/2013 | Mohler |
| 2013/0091573 A1 | 4/2013 | Herz et al. |
| 2013/0097706 A1 | 4/2013 | Titonis et al. |
| 2013/0111547 A1 | 5/2013 | Kraemer |
| 2013/0133072 A1 | 5/2013 | Kraitsman et al. |
| 2013/0152200 A1 | 6/2013 | Alme et al. |
| 2013/0167236 A1 | 6/2013 | Sick |
| 2013/0191924 A1 | 7/2013 | Tedesco et al. |
| 2013/0212658 A1 | 8/2013 | Amaya et al. |
| 2013/0219217 A1 | 8/2013 | Seren et al. |
| 2013/0231084 A1 | 9/2013 | Raleigh |
| 2013/0242743 A1 | 9/2013 | Thomas et al. |
| 2013/0247190 A1 | 9/2013 | Spurlock |
| 2013/0290662 A1 | 10/2013 | Teal |
| 2013/0290729 A1 | 10/2013 | Pettigrew et al. |
| 2013/0291111 A1 | 10/2013 | Zhou et al. |
| 2013/0298192 A1 | 11/2013 | Kumar et al. |
| 2013/0298244 A1 | 11/2013 | Kumar et al. |
| 2013/0305377 A1 | 11/2013 | Herz |
| 2013/0329732 A1 | 12/2013 | Vyas et al. |
| 2013/0333040 A1 | 12/2013 | Diehl et al. |
| 2013/0340033 A1 | 12/2013 | Jones et al. |
| 2013/0346472 A1 | 12/2013 | Wheeldon |
| 2013/0347052 A1 | 12/2013 | Choudrie |
| 2014/0046645 A1 | 2/2014 | White et al. |
| 2014/0053267 A1 | 2/2014 | Klein et al. |
| 2014/0068326 A1 | 3/2014 | Quinn |
| 2014/0068779 A1 | 3/2014 | Tan et al. |
| 2014/0090061 A1 | 3/2014 | Avasarala et al. |
| 2014/0096229 A1 | 4/2014 | Burns et al. |
| 2014/0108794 A1 | 4/2014 | Barton et al. |
| 2014/0123280 A1 | 5/2014 | Kedma |
| 2014/0137246 A1 | 5/2014 | Baluda |
| 2014/0150094 A1 | 5/2014 | Rao et al. |
| 2014/0157366 A1 | 6/2014 | Ko et al. |
| 2014/0165203 A1 | 6/2014 | Friedrichs et al. |
| 2014/0215617 A1 | 7/2014 | Smith et al. |
| 2014/0215621 A1 | 7/2014 | Xaypanya et al. |
| 2014/0215625 A1 | 7/2014 | Paul et al. |
| 2014/0237562 A1 | 8/2014 | Nandakumar |
| 2014/0237595 A1 | 8/2014 | Sridhara et al. |
| 2014/0237599 A1 | 8/2014 | Gertner et al. |
| 2014/0245376 A1 | 8/2014 | Hibbert et al. |
| 2014/0250524 A1 | 9/2014 | Meyers et al. |
| 2014/0259092 A1 | 9/2014 | Boucher et al. |
| 2014/0282816 A1 | 9/2014 | Xie et al. |
| 2014/0283076 A1 | 9/2014 | Muttik |
| 2014/0289851 A1 | 9/2014 | Klein et al. |
| 2014/0298419 A1 | 10/2014 | Boubez et al. |
| 2014/0349611 A1 | 11/2014 | Kant et al. |
| 2015/0006384 A1 | 1/2015 | Shaikh |
| 2015/0007312 A1 | 1/2015 | Pidathala et al. |
| 2015/0013006 A1 | 1/2015 | Shulman et al. |
| 2015/0013008 A1 | 1/2015 | Lukacs et al. |
| 2015/0033341 A1 | 1/2015 | Schmidtler et al. |
| 2015/0039513 A1 | 2/2015 | Adjaoute |
| 2015/0074810 A1 | 3/2015 | Saher et al. |
| 2015/0082430 A1 | 3/2015 | Sridhara et al. |
| 2015/0089655 A1 | 3/2015 | Choi et al. |
| 2015/0096048 A1 | 4/2015 | Zhang et al. |
| 2015/0113616 A1 | 4/2015 | Sampas |
| 2015/0121524 A1 | 4/2015 | Fawaz et al. |
| 2015/0121529 A1 | 4/2015 | Quinlan et al. |
| 2015/0128206 A1 | 5/2015 | Haim et al. |
| 2015/0128246 A1 | 5/2015 | Feghali et al. |
| 2015/0143496 A1 | 5/2015 | Thomas et al. |
| 2015/0150125 A1 | 5/2015 | Dulkin et al. |
| 2015/0150130 A1 | 5/2015 | Fiala |
| 2015/0156214 A1 | 6/2015 | Kaminsky |
| 2015/0163121 A1 | 6/2015 | Mahaffey et al. |
| 2015/0172300 A1 | 6/2015 | Cochenour |
| 2015/0195291 A1 | 7/2015 | Zuk et al. |
| 2015/0199512 A1 | 7/2015 | Kim et al. |
| 2015/0200928 A1 | 7/2015 | Burch et al. |
| 2015/0205962 A1 | 7/2015 | Swidowski et al. |
| 2015/0220735 A1 | 8/2015 | Paithane et al. |
| 2015/0254161 A1 | 9/2015 | Baril et al. |
| 2015/0257194 A1 | 9/2015 | Cho |
| 2015/0264068 A1 | 9/2015 | Beauchesne |
| 2015/0264077 A1 | 9/2015 | Berger et al. |
| 2015/0268947 A1 | 9/2015 | Ionescu |
| 2015/0271200 A1 | 9/2015 | Brady et al. |
| 2015/0281267 A1 | 10/2015 | Danahy et al. |
| 2015/0286820 A1 | 10/2015 | Sridhara et al. |
| 2015/0288706 A1 | 10/2015 | Marshall |
| 2015/0310196 A1 | 10/2015 | Turgeman et al. |
| 2015/0326587 A1 | 11/2015 | Vissamsetty et al. |
| 2015/0326588 A1 | 11/2015 | Vissamsetty et al. |
| 2015/0326592 A1 | 11/2015 | Vissamsetty et al. |
| 2015/0326599 A1 | 11/2015 | Vissamsetty et al. |
| 2015/0350236 A1 | 12/2015 | Klinghofer et al. |
| 2015/0358345 A1 | 12/2015 | Clark et al. |
| 2015/0373039 A1 | 12/2015 | Wang |
| 2015/0381376 A1 | 12/2015 | Wardman et al. |
| 2016/0028750 A1 | 1/2016 | Di Pietro et al. |
| 2016/0042179 A1 | 2/2016 | Weingarten |
| 2016/0042180 A1 | 2/2016 | Sayre et al. |
| 2016/0055334 A1 | 2/2016 | Herwono et al. |
| 2016/0055337 A1 | 2/2016 | El-Moussa |
| 2016/0072838 A1 | 3/2016 | Kolton et al. |
| 2016/0078365 A1 | 3/2016 | Baumard |
| 2016/0080414 A1 | 3/2016 | Kolton et al. |
| 2016/0127352 A1 | 5/2016 | Xu et al. |
| 2016/0127413 A1 | 5/2016 | Kraitsman et al. |
| 2016/0142399 A1 | 5/2016 | Pace et al. |
| 2016/0191554 A1 | 6/2016 | Kaminsky |
| 2016/0212225 A1 | 7/2016 | Smith et al. |
| 2016/0261631 A1 | 9/2016 | Vissamsetty et al. |
| 2016/0285914 A1 | 9/2016 | Singh et al. |
| 2016/0315909 A1 | 10/2016 | Von Gravrock et al. |
| 2016/0323300 A1 | 11/2016 | Boss et al. |
| 2016/0323316 A1 | 11/2016 | Kolton et al. |
| 2016/0381023 A1 | 12/2016 | Dulce et al. |
| 2017/0019425 A1 | 1/2017 | Ettema et al. |
| 2017/0026387 A1 | 1/2017 | Vissamsetty et al. |
| 2017/0032122 A1 | 2/2017 | Thakar et al. |
| 2017/0054754 A1 | 2/2017 | Saher et al. |
| 2017/0093910 A1 | 3/2017 | Gukal et al. |
| 2017/0126718 A1 | 5/2017 | Baradaran et al. |
| 2017/0134405 A1 | 5/2017 | Ahmadzadeh et al. |
| 2017/0141980 A1 | 5/2017 | Palanciuc et al. |
| 2017/0147796 A1 | 5/2017 | Sardesai et al. |
| 2017/0149787 A1 | 5/2017 | Niemela et al. |
| 2017/0149795 A1 | 5/2017 | Day, II |
| 2017/0149832 A1 | 5/2017 | Touboul et al. |
| 2017/0171244 A1 | 6/2017 | Vissamsetty et al. |
| 2017/0180421 A1 | 6/2017 | Shieh et al. |

(56) References Cited

U.S. PATENT DOCUMENTS

| | | |
|---|---|---|
| 2017/0206142 A1 | 7/2017 | Pawar et al. |
| 2017/0206357 A1 | 7/2017 | Gorelik et al. |
| 2017/0230384 A1 | 8/2017 | Touboul et al. |
| 2017/0230402 A1 | 8/2017 | Greenspan et al. |
| 2017/0235967 A1 | 8/2017 | Ray et al. |
| 2017/0244729 A1 | 8/2017 | Fahrny et al. |
| 2017/0244749 A1 | 8/2017 | Shulman et al. |
| 2017/0244755 A1 | 8/2017 | Tsao |
| 2017/0264639 A1 | 9/2017 | Sama et al. |
| 2017/0279839 A1 | 9/2017 | Vasseur et al. |
| 2017/0279846 A1 | 9/2017 | Osterweil et al. |
| 2017/0286676 A1 | 10/2017 | Weingarten et al. |
| 2017/0302458 A1 | 10/2017 | Berger et al. |
| 2017/0302653 A1 | 10/2017 | Ortner et al. |
| 2017/0302665 A1 | 10/2017 | Zou et al. |
| 2017/0302696 A1 | 10/2017 | Schutz et al. |
| 2017/0318054 A1 | 11/2017 | Vissamsetty et al. |
| 2017/0322959 A1 | 11/2017 | Tidwell et al. |
| 2017/0324774 A1 | 11/2017 | Ohayon et al. |
| 2017/0324777 A1 | 11/2017 | Ohayon et al. |
| 2017/0331849 A1 | 11/2017 | Yu et al. |
| 2017/0331856 A1 | 11/2017 | Vissamsetty et al. |
| 2017/0346802 A1 | 11/2017 | Gruskin et al. |
| 2017/0346853 A1 | 11/2017 | Wyatt et al. |
| 2017/0359370 A1 | 12/2017 | Humphries et al. |
| 2018/0013788 A1 | 1/2018 | Vissamsetty et al. |
| 2018/0020005 A1 | 1/2018 | Beiter et al. |
| 2018/0027006 A1 | 1/2018 | Zimmermann et al. |
| 2018/0027017 A1 | 1/2018 | Touboul et al. |
| 2018/0039776 A1 | 2/2018 | Loman et al. |
| 2018/0048665 A1 | 2/2018 | Shulman et al. |
| 2018/0063187 A1 | 3/2018 | St Pierre |
| 2018/0089430 A1 | 3/2018 | Mayo |
| 2018/0146008 A1 | 5/2018 | Vissamsetty et al. |
| 2018/0173876 A1 | 6/2018 | Vissamsetty et al. |
| 2018/0183815 A1 | 6/2018 | Enfinger |
| 2018/0248896 A1 | 8/2018 | Challita et al. |
| 2019/0042745 A1 | 2/2019 | Chen et al. |
| 2019/0052659 A1 | 2/2019 | Weingarten et al. |
| 2019/0068642 A1 | 2/2019 | Araujo et al. |
| 2019/0073475 A1 | 3/2019 | Vissamsetty et al. |
| 2019/0114426 A1 | 4/2019 | Cohen et al. |
| 2019/0199736 A1* | 6/2019 | Howard .............. H04L 63/1425 |
| 2019/0253453 A1 | 8/2019 | Vissamsetty et al. |
| 2019/0354355 A1 | 11/2019 | Jacobson et al. |
| 2019/0379697 A1 | 12/2019 | Vissamsetty et al. |
| 2020/0143054 A1 | 5/2020 | Cohen et al. |
| 2020/0218806 A1 | 7/2020 | Cho |
| 2020/0252429 A1 | 8/2020 | Vissamsetty et al. |
| 2020/0374087 A1 | 11/2020 | Vissamsetty et al. |
| 2021/0397710 A1 | 12/2021 | Cohen et al. |
| 2022/0070256 A1 | 3/2022 | Singh et al. |
| 2022/0391496 A9 | 12/2022 | Cho |
| 2023/0007025 A1 | 1/2023 | Weingarten et al. |
| 2023/0007026 A1 | 1/2023 | Weingarten et al. |
| 2023/0007027 A1 | 1/2023 | Weingarten et al. |
| 2023/0007028 A1 | 1/2023 | Weingarten et al. |
| 2023/0007029 A1 | 1/2023 | Weingarten et al. |
| 2023/0007030 A1 | 1/2023 | Weingarten et al. |
| 2023/0007031 A1 | 1/2023 | Weingarten et al. |

FOREIGN PATENT DOCUMENTS

| | | |
|---|---|---|
| JP | 2016-512631 A | 4/2016 |
| JP | 2017-504102 A | 2/2017 |
| KR | 10-2015-0101811 A | 9/2015 |
| KR | 10-1969572 B1 | 4/2019 |
| WO | WO 02/27440 A2 | 4/2002 |
| WO | WO 2010/030169 A2 | 3/2010 |
| WO | WO 2012/027669 A1 | 3/2012 |
| WO | WO 2013/014672 A1 | 1/2013 |
| WO | WO 2015/171780 A1 | 11/2015 |
| WO | WO 2015/171789 A1 | 11/2015 |
| WO | WO 2016/024268 A1 | 2/2016 |
| WO | WO 2016/081561 A1 | 5/2016 |
| WO | WO 2017/064710 A1 | 4/2017 |
| WO | WO 2019/092530 A1 | 5/2019 |
| WO | WO 2019/032728 A1 | 3/2020 |

OTHER PUBLICATIONS

Chen et al., "MitM attack by name collision: Cause analysis and vulnerability assessment in the new gTLD era." Security and Privacy (SP), 2016 IEEE Symposium on. IEEE (2016).

Communication Pursuant to Article 94(3) EPC dated Dec. 11, 2018 for European Application 15 760 520.5, in 7 pages.

Dini et al., "Probabilistic Contract Compliance for Mobile Applications", Eighth International Conference on Availability, Reliability and Security (ARES) IEEE, Sep. 2-6, 2013, pp. 599-606.

Extended European Search Report dated May 9, 2019 for Application No. 16855062.2, in 7 pages.

Extended European Search Report dated Jan. 25, 2021 for European Patent Application No. 20181537.0, in 10 pages.

Extended European Search Report dated Aug. 25, 2021 for European Patent Application No. 21162973.8, in 5 pages.

European Search Report dated Apr. 29, 2021 in European Patent Application No. 18844671 in 38 pages.

Gu et al., "Malicious Shellcode Detection with Virtual Memory Snapshots," 2010 Proceedings IEEE INFOCOM, San Diego, CA, 2010, pp. 1-9, accessed Mar. 6, 2019.

IBM Guardium Documentation "Components and Topology", downloaded from https://www.ibm.com/docs/en/qsip/7.4?topic=deployment-qradar-architecture-overview, printed on Jun. 8, 2021 in 3 pages.

IBM, "Qradar Architecture overview", downloaded from https://www.ibm.com/docs/en/qsip/7.4?topic=deployment-qradar-architecture-overview printed May 28, 2021 in 6 pgs.

IBM Software, "Stepping up the battle against advanced threats", IBM Trusteer Apex Thought Leadership White Paper, Dec. 2013, WGW03043-USEN-00.

"IBM Security Qradar SIEM Installation Guide" downloaded from http://www.siem.su/docs/ibm/Installation_and_updating/IBM_Security_QRadar_installation_Guide.pd, printed 2013, vol. 7.2 in 54 pages.

IBM Security Guardium Insights for IBM Cloud Park for Security, printed from https://www.ibm.com/downloads/cas/QY1RYRLP, printed May 26, 2021 in 12 pages.

IBM Security Qradar Solutuion Brief "Visibility, detection, investigation and response" printed from https://www.ibm.com/downloads/cas/OP62GKAR, printed on May 26, 2021 in 11 pgs.

"IBM Security Trusteer Apex Advanced malware Protection (SaaS) delivers an enterprise endpoint security solution to help protect organizations from advanced malware and targeted attacks" downloaded from https://www-01.ibm.com/common/ssi/rep_ca/0/877/ENUSZP14-0390/ENUSZP14-0390.PDF, printed Aug. 5, 2014, in 9 pgs.

IBM Software "Stepping up the battle against advanced threats", downloaded from https://citrixready.citrix.com/content/dam/ready/partners/ib/ibm-global-services/ibm-security-trusteer-apex-advanced-malware-protection/wgw03043usen.pdf, Printed Dec. 2013 in 12 pages.

Installing a Tanium Client—distributed also using user/password (not encrypted) from a hosted Module server, downloaded from https://docs.tanium.com/client/client/deployment.html#client_management on Apr. 1, 2021.

International Preliminary Report on Patentability in corresponding International Patent Application No. PCT/US2015/61271, dated May 23, 2017, in 7 pages.

International Preliminary Report on Patentability in corresponding International Patent Application No. PCT/US2015/29490, dated Nov. 8, 2016, in 7 pages.

International Preliminary Report on Patentability in corresponding International Patent Application No. PCT/US2015/29501, dated Nov. 8, 2016, in 7 pages.

International Search Report and Written Opinion dated Feb. 18, 2016 for International Application No. PCT/IL2015/050802, in 10 pages.

(56) References Cited

OTHER PUBLICATIONS

International Preliminary Report on Patentability dated Feb. 14, 2017 for International Application No. PCT/IL2015/050802, in 7 pages.
International Search Report and Written Opinion dated Apr. 20, 2017 for International Application No. PCT/IL2016/051110, in 10 pages.
International Search Report and Written Opinion dated Dec. 11, 2018 for International Application No. PCT/US2018/045850, in 12 pages.
International Search Report and Written Opinion dated Aug. 24, 2020 for International Application No. PCT/US2020/033872, in 8 pages.
International Search Report in corresponding International Patent Application No. PCT/US2015/29490, dated Aug. 7, 2015, in 2 pages.
International Search Report in corresponding International Patent Application No. PCT/US2015/29501, dated Aug. 7, 2015, in 2 pages.
International Search Report in corresponding International Patent Application No. PCT/US2015/61271, dated Feb. 2, 2016, in 2 pages.
International Search Report issued in application No. PCT/US2021/050129 on Dec. 21, 2021.
Laureano et al., M., "Intrusion detection in virtual machine environments. In Euromicro Conference, 2004. Proceedings." 30th (pp. 520-525). IEEE Sep. 30, 2004.
Liu et al., "Detecting Trojan Horses Based on System Behavior Using Machine Learning Method", International Conference on Machine Learning and Cybernetics (ICMLC), IEEE, Jul. 11-14, 2010, pp. 855-860.
Moussaileb et al., "Ransomware's Early Mitigation Mechanisms," Proceedings ARES 2018 Proceedings of the 13th International Conference on Availability, Reliability and Security Article No. 2, pp. 1-10 (2018).
Office Action dated Jul. 24, 2019 in European Patent Application No. 15760520.5, in 8 pages.
Office Action dated May 31, 2022 in Japanese Patent Application No. 2020-503272, in 7 pages.
Ornaghi et al., "Man in the middle attacks." Blackhat Conference Europe (2003).
Ramachandran et al., "Detecting ARP spoofing: An active technique." International Conference on Information Systems Security, Springer, Berlin, Heidelberg (2005).
Reaqta Hive, A.I. Based Endpoint Threat Response, Whitepaper, 27 pages (Apr. 6, 2017).
Schollmeier, "A Definition of Peer-to-Peer Networking for the Classification of Peer-to-Peer Architectures and Applications," Proceedings of the First International Conference on Peer-to-Peer Computing, IEEE (2002).
Shosha et al., A.F., "Evasion-resistant malware signature based on profiling kernel data structure objects." In 2012 7th International Conference on Risks and Security of Internet and Systems (CRISIS) (pp. 1-8). IEEE., Oct. 31, 2012.
Tanium™ Client Management 1.6 User Guide, downloaded from https://docs.tanium.com/client_management/client_management/index.html on Apr. 1, 2021.
Ullrich et al., "IPV6 Security: Attacks and Countermeasures in a Nutshell." 8th USENIX Workshop on Offensive Technologies (2015).
Written Opinion in corresponding International Patent Application No. PCT/US2015/29490, dated Aug. 7, 2015, in 6 pages.
Written Opinion in corresponding International Patent Application No. PCT/US2015/29501, dated Aug. 7, 2015, in 6 pages.
Written Opinion in corresponding International Patent Application No. PCT/US2015/61271, dated Feb. 2, 2016, in 6 pages.
Xu et al., "Polymorphic Malicious Executable Scanner by API Sequence Analysis", Fourth International Conference on Hybrid Intelligent Systems, IEEE Dec. 5-8, 2004, pp. 378-383.

\* cited by examiner

FIG. 1B

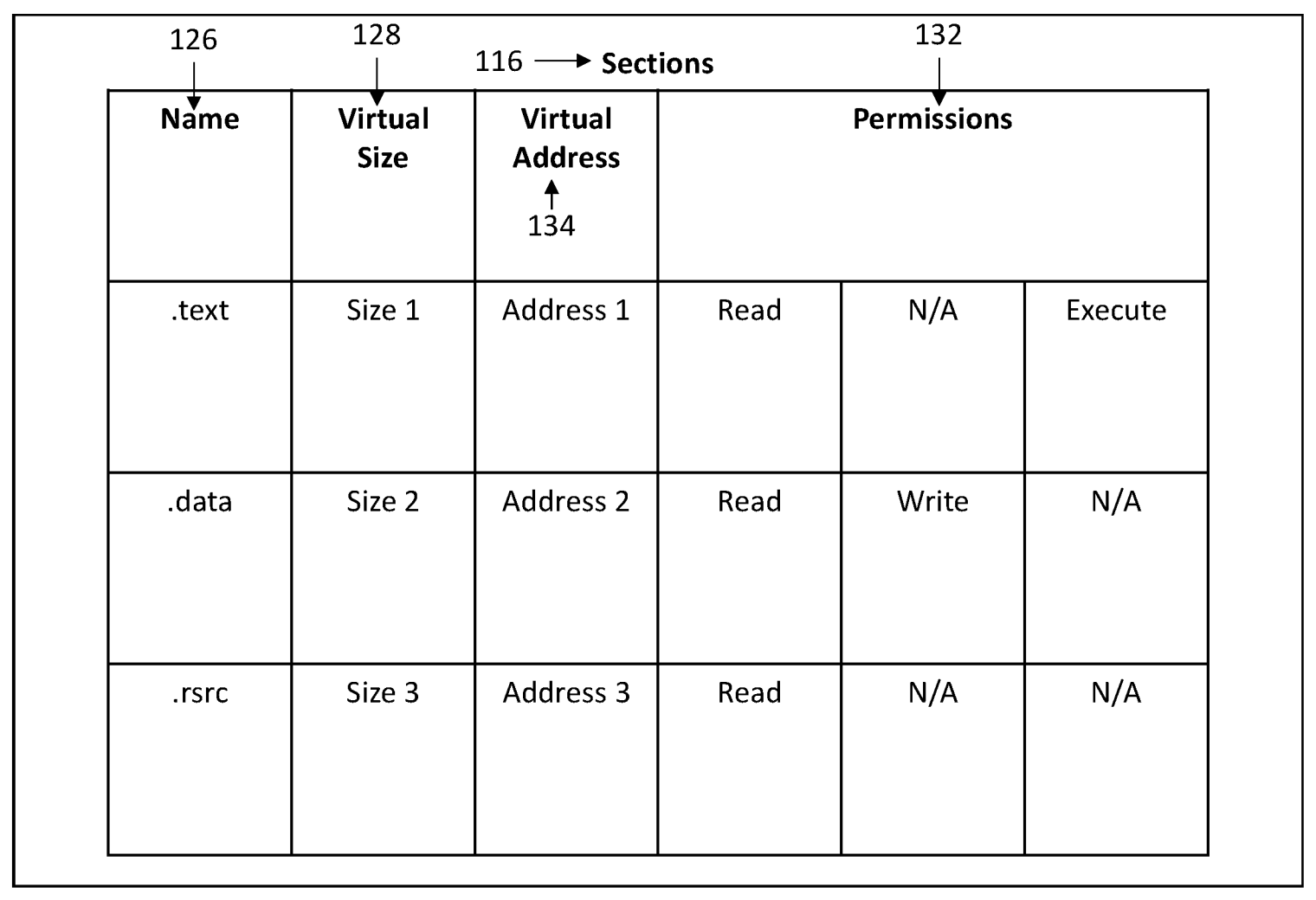

| Name | Virtual Size | Virtual Address | Permissions | | |
|---|---|---|---|---|---|
| .text | Size 1 | Address 1 | Read | N/A | Execute |
| .data | Size 2 | Address 2 | Read | Write | N/A |
| .rsrc | Size 3 | Address 3 | Read | N/A | N/A |

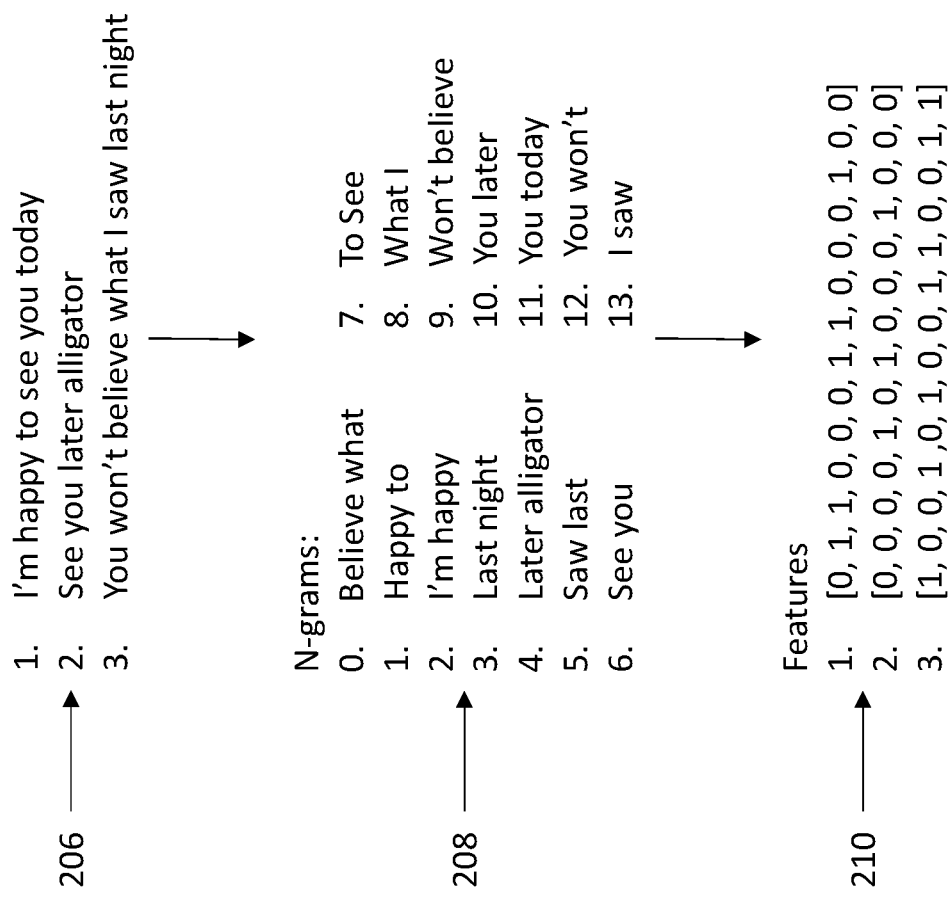

SYSTEMS AND METHODS FOR EXECUTABLE CODE DETECTION, AUTOMATIC FEATURE EXTRACTION AND POSITION INDEPENDENT CODE DETECTION

CROSS-REFERENCE TO RELATED APPLICATIONS

The present application is a continuation of U.S. patent application Ser. No. 18/089,038 (now U.S. Pat. No. 11,790,079), filed Dec. 27, 2022 and titled SYSTEMS AND METHODS FOR EXECUTABLE CODE DETECTION, AUTOMATIC FEATURE EXTRACTION AND POSITION INDEPENDENT CODE DETECTION, which is a continuation of U.S. patent application Ser. No. 17/448,327 (now U.S. Pat. No. 11,580,218), filed Sep. 21, 2021 and titled SYSTEMS AND METHODS FOR EXECUTABLE CODE DETECTION, AUTOMATIC FEATURE EXTRACTION AND POSITION INDEPENDENT CODE DETECTION, which is a continuation of U.S. patent application Ser. No. 16/920,630 (now U.S. Pat. No. 11,210,392), filed Jul. 3, 2020 and titled SYSTEMS AND METHODS FOR EXECUTABLE CODE DETECTION, AUTOMATIC FEATURE EXTRACTION AND POSITION INDEPENDENT CODE DETECTION, which is a continuation of U.S. patent application Ser. No. 16/879,625 (now U.S. Pat. No. 10,762,200), filed May 20, 2020 and titled SYSTEMS AND METHODS FOR EXECUTABLE CODE DETECTION, AUTOMATIC FEATURE EXTRACTION AND POSITION INDEPENDENT CODE DETECTION, which claims the benefit of U.S. Provisional Application No. 62/850,170, filed May 20, 2019, and titled METHODS, SYSTEMS, AND DEVICES FOR CODE DETECTION FOR MALWARE ANALYSIS, U.S. Provisional Application No. 62/850,182, filed May 20, 2019, and titled METHODS, SYSTEMS, AND DEVICES FOR AUTOMATIC FEATURE EXTRACTION FROM EXECUTABLE CODE, and U.S. Provisional Application No. 62/854,118, filed May 29, 2019, and titled METHODS, SYSTEMS, AND DEVICES FOR DETECTING THE EXECUTION OF A POSITION INDEPENDENT CODE. Each of the foregoing applications is hereby incorporated by reference in their entirety.

Any and all applications for which a foreign or domestic priority claim is identified in the Application Data Sheet as filed with the present application are hereby incorporated by reference under 37 CFR 1.57.

BACKGROUND

Field

This application relates to computer and cybersecurity systems, and methods, and in particular, to systems and methods for detecting executable code, extracting useful machine learning features, and identifying position independent code.

Description

Existing systems and methods of programmatic malware and executable code detection are inefficient and inaccurate. New systems and methods are needed in order to prevent, detect, and respond to malicious threats to computer systems.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Some embodiments herein are directed to a computer-implemented method for programmatically identifying executable code within a file, the method comprising: accessing, by a computer system, a sequence of bytes from a portion of the file; extracting, by the computer system from the sequence of bytes, a predetermined number of n-grams, wherein each n-gram comprises a contiguous series of bytes in the sequence of bytes, and wherein each contiguous series of bytes in each n-gram comprises n number of bytes; generating, by the computer system, an array of counters, each counter of the array associated with one of the n-grams, wherein each counter comprises an integer value, the integer value generated based on the frequency of occurrence of the associated n-gram within the sequence of bytes; providing, by the computer system, the array of counters as an input feature for a predictive machine learning model; and determining, by the predictive machine learning model, a model probability value that the sequence of bytes comprises executable code, wherein the computer system comprises a computer processor and an electronic storage medium.

In some embodiments, the executable code is programmatically identified without executing the sequence of bytes on the computer system.

In some embodiments, the method further comprises flagging, by the computer system, the sequence of bytes or the file for further analysis by a malware detection system when the model probability value that the sequence of bytes comprises executable code is above a predetermined threshold.

In some embodiments, the file comprises an executable file format.

In some embodiments, the file comprises a portable executable (PE) file.

In some embodiments, the portion of the file comprises one or more of a resource, a string, a variable, an overlay, or a section.

In some embodiments, the portion of the file does not comprise executable permissions.

In some embodiments, the n-grams comprise bi-grams.

In some embodiments, n is between 2 and 500.

In some embodiments, the n-grams comprise: a first set of n-grams, wherein n is a first integer for the first set of n-grams; and a second set of n-grams, wherein n is a second integer for the second set of n-grams, and wherein the first integer is different from the second integer.

In some embodiments, the predetermined number of n-grams is 500.

In some embodiments, the predetermined number of n-grams is between 50 and 10,000.

In some embodiments, the method further comprises normalizing, by the computer system, each counter by the data length of the sequence of bytes.

In some embodiments, the predictive machine learning model comprises a plurality of separate models, each model corresponding to a different machine architecture code.

In some embodiments, the machine architecture code comprises .NET, x86, and/or x64.

In some embodiments, the predictive machine learning model comprises at least one learning algorithm selected from the group of: support vector machines (SVM), linear regression, K-nearest neighbor (KNN) algorithm, logistic regression, naïve Bayes, linear discriminant analysis, decision trees, neural networks, or similarity learning.

In some embodiments, the predictive machine learning model comprises a random forest.

In some embodiments, the random forest comprises a plurality of decision trees, each decision tree trained independently on a training set of bytes.

In some embodiments, the model probability value is determined by averaging a plurality of decision tree probability values, wherein each decision tree probability value is generated by traversal of the sequence of bytes through each individual decision tree of the plurality of decision trees.

Some embodiments herein are directed to a computer system for programmatically identifying executable code within a file, the system comprising: one or more computer readable storage devices configured to store a plurality of computer executable instructions; and one or more hardware computer processors in communication with the one or more computer readable storage devices and configured to execute the plurality of computer executable instructions in order to cause the system to: access a sequence of bytes from a part of the file; extract, from the sequence of bytes, a predetermined number of n-grams, wherein each n-gram comprises a contiguous series of bytes in the sequence of bytes, and wherein each contiguous series of bytes in each n-gram comprises n number of bytes; generate an array of counters, each counter of the array associated with one of the n-grams, wherein each counter comprises an integer value, the integer value generated based on the frequency of occurrence of the associated n-gram within the sequence of bytes; provide the array of counters as an input feature for a predictive machine learning model; and determine, by the predictive machine learning model, a model probability value that the sequence of bytes comprises executable code.

Some embodiments herein are directed to a computer-implemented method for automatically extracting a machine learning feature from executable code for input to a malware detection model, the method comprising: accessing, by a computer system, the executable code from a file; inputting, by the computer system, the executable code to an image rescaling algorithm comprising an embedding matrix, wherein the image rescaling algorithm is configured to convert each byte of the executable code to a numerical vector using the embedding matrix to produce an embedded vector space, and wherein the order of the executable code is maintained during the conversion; channel filtering, by the computer system, one or more vector layers of the embedded vector space, wherein the channel filtering comprises: consolidating the one or more vector layers into a plurality of blocks; and applying a filter mechanism to produce one or more fixed size vector inputs, each fixed size vector input representing a corresponding vector layer or a block of the corresponding vector layer; inputting, by the computer system, the one or more fixed size vector inputs into an input layer of a neural network, the neural network comprising a plurality of layers of processing units, wherein the plurality of layers comprise at least the input layer, one or more hidden layers, and an output layer, wherein each successive layer of the plurality of layers uses an output value from a previous layer as an input value, and wherein the output layer is configured to generate a classification of maliciousness of the executable code; extracting, by the computer system, the output value of a final hidden layer immediately preceding the output layer of the neural network; and providing, by the computer system, the output value of the final hidden layer as a machine learning feature to the malware detection model, wherein the computer system comprises a computer processor and an electronic storage medium.

In some embodiments, the neural network comprises a supervised, semi-supervised, or unsupervised learning model.

In some embodiments, the executable code is part of a portable executable (PE) file.

In some embodiments, each of the one or more hidden layers is configured to perform a transformation on the input value to generate the output value for an immediately consecutive layer.

In some embodiments, the image rescaling algorithm comprises a pre-processing neural network, the pre-processing neural network comprising Word2Vec.

In some embodiments, the method further comprises discarding the classification of maliciousness of the executable code from the output layer of the neural network.

In some embodiments, the neural network comprises between 1 and 2000 hidden layers.

In some embodiments, the filter mechanism comprises a low-pass filter, box filter, delta filter, or Gaussian filter.

Some embodiments herein are directed to a computer system for automatically extracting a machine learning feature from executable code for input to a malware detection model, the system comprising: one or more computer readable storage devices configured to store a plurality of computer executable instructions; and one or more hardware computer processors in communication with the one or more computer readable storage devices and configured to execute the plurality of computer executable instructions in order to cause the system to: access the executable code from a file; input the executable code to an image rescaling algorithm comprising an embedding matrix, wherein the image rescaling algorithm converts each byte of the executable code to a numerical vector using the embedding matrix to produce an embedded vector space, and wherein the order of the executable code is maintained during the conversion; channel filter one or more vector layers of the embedded vector space by: consolidating the one or more vector layers into a plurality of blocks; and applying a filter mechanism to produce one or more fixed size vector inputs, each fixed size vector input representing a corresponding vector layer or a block of the corresponding vector layer; input the one or more fixed size vector inputs into an input layer of a neural network, the neural network comprising a plurality of layers of processing units, wherein the plurality of layers comprise at least the input layer, one or more hidden layers, and an output layer, wherein each successive layer of the plurality of layers uses an output value from a previous layer as an input value, and wherein the output layer is configured to generate a classification of maliciousness of the executable code; extract the output value of a final hidden layer immediately preceding the output layer of the neural network; and provide the output value of the final hidden layer as a machine learning feature to the malware detection model.

In some embodiments, the neural network comprises a supervised, semi-supervised, or unsupervised learning model.

In some embodiments, the executable code is part of a portable executable (PE) file.

In some embodiments, each of the one or more hidden layers is configured to perform a transformation on the input value to generate the output value for an immediately consecutive layer.

In some embodiments, the image rescaling algorithm comprises a pre-processing neural network, the pre-processing neural network comprising Word2Vec.

In some embodiments, the system is further caused to discard the classification of maliciousness of the executable code from the output layer of the neural network.

In some embodiments, the neural network comprises between 1 and 2000 hidden layers.

In some embodiments, the filter mechanism comprises a low-pass filter, box filter, delta filter, or Gaussian filter.

Some embodiments herein are directed to a system for library position independent code detection, the system comprising: one or more computer readable storage devices configured to store a plurality of computer executable instructions; and one or more hardware computer processors in communication with the one or more computer readable storage devices and configured to execute the plurality of computer executable instructions in order to cause the system to: instrument an import address table (IAT) entry of a monitored symbol, the instrumenting of the IAT entry comprising: replacing a monitored symbol address within the IAT entry of the monitored symbol with a modified address; executing a trampoline code upon a call of the modified address to detect and validate a static call of the monitored symbol; and redirecting the call of the modified address to the monitored symbol address; instrument one or more Loader API functions, the instrumenting of the one or more Loader API functions comprising: modifying the one or more Loader API functions to return values that lead to the trampoline code; detouring the execution of the monitored symbol to a detour code to detect and validate a call of the monitored symbol; redirecting the call of the monitored symbol to the monitored symbol address; monitor the trampoline code and the detour code of the monitored symbol to determine if calls from an executable comprise a static call, a dynamic call, or a local call; if the system determines that at least one call from the executable does not comprise a static call, dynamic call, or a local call, flag the executable as suspicious or malicious for a malware detection system.

In some embodiments, the system is further caused to, if the system determines that the at least one call does not comprise a static call, dynamic call, or local call, classify the at least one call as an independent call.

In some embodiments, the system is further caused to, if the system determines that the calls comprise a static call, dynamic call, or local call, classify the calls as benign calls.

In some embodiments, the system is further caused to, if the system determines that the calls comprise a static call, dynamic call, or local call, classify the executable as benign.

In some embodiments, the system further comprises: A hooking engine comprising the trampoline code and the detour code; and one or more call databases configured to store data related to the calls.

In some embodiments, the dynamic call comprises an attempted retrieval of the monitored symbol address during execution of the executable.

In some embodiments, the static call comprises an attempted retrieval of the monitored symbol address during initialization of the executable.

In some embodiments, determination of whether the calls from the executable does comprise a local call comprises monitoring the detour Code to determine if a return address is located in the same executable as the monitored symbol.

In some embodiments, the one or more Loader API functions comprise one or both of GetModuleHandle or GetProcAddress.

In some embodiments, the at least one call is initiated by the executable using metadata retrieved from a module comprising the monitored symbol.

In some embodiments, the at least one call is initiated by the executable using data retried from a Loader internal record.

In some embodiments, the at least one call is initiated by the executable by calling the monitored symbol without triggering the trampoline code.

Some embodiments herein are directed to a computer implemented method for library position independent code detection, the method comprising: instrumenting, by a computer system, an import address table (IAT) entry of a monitored symbol, the instrumenting of the IAT entry comprising: replacing a monitored symbol address within the IAT entry of the monitored symbol with a modified address; executing a trampoline code upon a call of the modified address to detect and validate a static call of the monitored symbol; and redirecting the call of the modified address to the monitored symbol address; instrumenting, by the computer system, one or more Loader API functions, the instrumenting of the one or more Loader API functions comprising: modifying the one or more Loader API functions to return values that lead to the trampoline code; detouring the execution of the monitored symbol to a detour code to detect and validate a call of the monitored symbol; and redirecting the call of the monitored symbol to the monitored symbol address; monitoring, by the computer system, the trampoline code and the detour code of the monitored symbol to determine if calls from an executable comprise a static call, a dynamic call, or a local call; if the computer system determines that at least one call from the executable does not comprise a static call, dynamic call, or a local call, flagging, by the computer system, the executable as suspicious or malicious for a malware detection system, wherein the computer system comprises a computer processor and an electronic storage medium.

In some embodiments, wherein the method further comprises, if the computer system determines that the at least one call does not comprise a static call, dynamic call, or local call, classifying the at least one call as an independent call.

In some embodiments, the method further comprises, if the computer system determines that the calls comprise a static call, dynamic call, or local call, classifying the calls as benign calls.

In some embodiments, the method further comprises, if the computer system determines that the calls comprise a static call, dynamic call, or local call, classifying the executable as benign.

In some embodiments, the trampoline code and the detour code comprise one or more portions of a hooking engine, the hooking engine connected to a call database configured to store data related to the calls.

In some embodiments, the dynamic call comprises an attempted retrieval of the monitored symbol address during execution of the executable.

In some embodiments, the static call comprises an attempted retrieval of the monitored symbol address during initialization of the executable.

In some embodiments, determination of whether the calls from the executable comprise a local call comprises monitoring the detour Code to determine if a return address is located in the same executable as the monitored symbol.

In some embodiments, the one or more Loader API functions comprise one or both of GetModuleHandle or GetProcAddress.

In some embodiments, the at least one call is initiated by the executable using metadata retrieved from a module comprising the monitored symbol.

In some embodiments, the at least one call is initiated by the executable using data retried from a Loader internal record.

In some embodiments, the at least one call is initiated by the executable by calling the monitored symbol without triggering the trampoline code.

BRIEF DESCRIPTION OF THE DRAWINGS

The features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

The drawings are provided to illustrate example embodiments and are not intended to limit the scope of the disclosure. A better understanding of the systems and methods described herein will be appreciated upon reference to the following description in conjunction with the accompanying drawings, wherein:

FIG. 1B illustrates example sections of a PE file;

FIG. 2B illustrates a text feature generation flowchart in comparison with n-gram generation according to some embodiments herein;

DETAILED DESCRIPTION

Figure 1A:
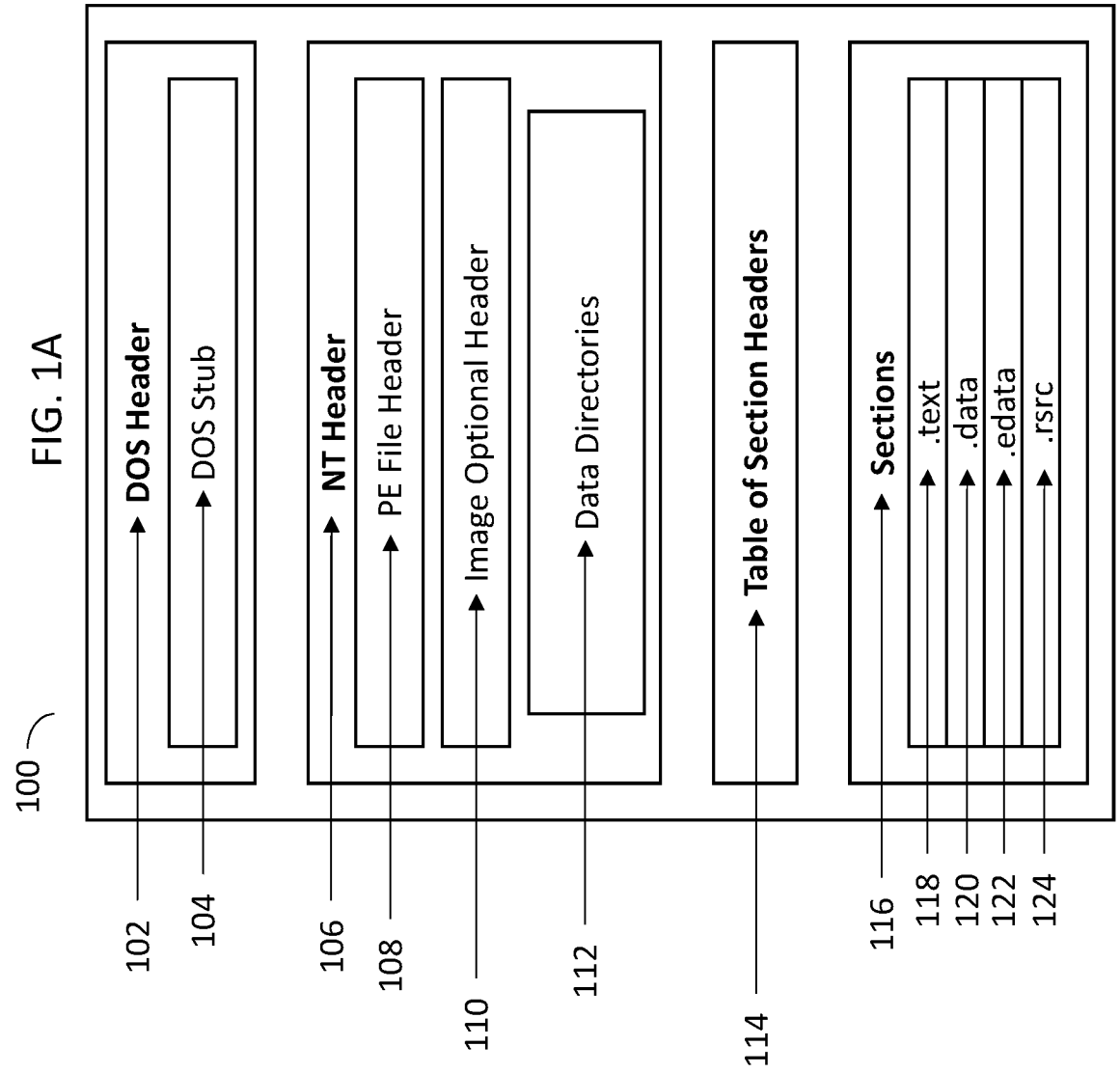
FIG. 1A illustrates an example of a Portable Executable (PE) file format.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

This detailed description discusses certain features for implementing computer and cybersecurity systems, devices, and methods in relation to certain described embodiments, some of which are illustrated in the figures. Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Executable Code Detection

Some embodiments of the present disclosure relate to techniques for identifying executable code that may be hidden away in one or more unconventional areas of files. In some embodiments, once this hidden executable code is detected, it can be flagged for additional processing or analysis for a variety of purposes, including malware detection.

Introduction

Generally speaking, file formats can help standardize the way that information is encoded for storage in a computer file by specifying the overall structure of a file and how bits are used to encode information in a digital storage medium. Many file formats have multiple discrete regions, with each region serving a varying purpose.

A traditional malware detection solution may typically look for suspicious programming logic in only certain sections of a file depending on the file format of the file. However, this is a problem since malware may often evade the detection logic used by these solutions by hiding malicious code in one or more regions of files that do not normally contain code or logic, and thus, are not typically looked at by traditional malware detection solutions. For example, in many files, there exists a section in the file that contains an icon for representing the file. In many instances, there is no practical reason that executable code would be located in a section for holding the icon. However, many malwares or other threat actors may hide malicious code in these types of locations, in which traditional malware detection and antivirus software do not examine. Therefore, when malware is executed in a computer machine, it can simply extract the executable code from the hidden location to execute. In that way, malicious software can successfully hide the code from existing malware detection and antivirus products.

Additionally, detecting whether code in a file is executable code or not is not trivial. There is no existing logical way to determine if code is executable simply by looking at the code. Thus, in order to verify if the code is executable or not, the code must be executed within a computer. In other words, using existing methods, in order to determine if a sequence of bytes is valid executable code, malware detection and antivirus software must attempt to execute the sequence of bytes to see if it can be interpreted as valid executable code. However, attempting to execute the code is undesirable as doing so can substantially impede the performance of the machine and/or introduce malicious software inadvertently during execution. Even if the code could potentially be executed safely in a sandbox, running, executing, and checking the code will result in decreased performance relative to automatic detection of executable code without execution. Further, executing the code in a sandbox itself requires processing power and resources that otherwise would not have been necessary, thereby decreasing the processing capacity of a computer system.

Thus, there exists a need for first accurately and programmatically identifying and detecting executable code hidden in files, which can then be flagged for traditional malware analysis. Some embodiments of systems and methods described herein allow for identification and detection of executable code hidden in files without having to execute subject code itself to determine if the subject code is an executable code. In other words, some embodiments described herein provide systems and/or methods for identifying and detecting executable code hidden in files, wherein such systems and/or methods do not comprise executing subject code to determine if the subject code is an executable code. In particular, in some embodiments herein, one or more machine learning models may be utilized in order to understand the patterns of executable code without the necessity of attempting to execute the code. Specifically, some embodiments herein are directed to a machine learning model for searching specific locations inside of executable files and determining if specific parts in the file contain executable code. In many instances, malicious actors attempt to hide or conceal code in unconventional places inside a file. Thus, in some embodiments, one or more machine learning models may be utilized to take, as input, one or more bytes sequences from a file and to determine the probability that the one or more sections comprise valid executable code.

Traditional malware detection solutions look for malignant patterns, such as imports, strings and suspicious sequences of function calls. However, malware may often evade the detection logic used by these solutions by hiding malicious portions of their code (i.e. payloads) inside resources or hidden areas in the file. Since these hidden areas do not normally contain executable code or programming logic, traditional detection systems may not look there and malware may be able to evade their detection.

In some embodiments, techniques disclosed herein address this technical shortcoming by enabling the automatic detection of executable code given a stream of bytes, which can be sourced from any part of a file, but particularly, the hidden areas of files that traditional malware detection solutions ignore. These techniques are described within the context of a Portable Executable (PE) file for exemplary purposes and to facilitate ease of understanding the techniques, as the mere existence of code in several parts of a PE file, such as resources, can be indicative of highly malicious activity and can aid detection solutions immensely. However, the techniques described herein may be applied to files of any suitable file format. For example, the code detection techniques described herein can be used in other executable file formats (e.g., ELF files) and even non-executable file formats (e.g., PDF files).

More specifically, in some embodiments, a machine learning model can be trained to detect whether a particular stream of bytes is executable code. This machine learning model can then be run on different areas of one or more files, including areas that are not typically analyzed by traditional detection solutions, in order to detect executable code within the one or more files. Any detected executable code can be flagged for further analysis by malware detection software, thus improving the detection of hidden malware payloads significantly. In some embodiments, only a portion of the file may be passed through the model. In some embodiments, the entirety of the data in the file may be passed through the model.

Portable Executable (PE)

FIG. 1A illustrates an example structure associated with a Portable Executable (PE) file format. Some of the structure associated with a PE file is described here for exemplary purposes and to facilitate understanding of the techniques described herein. In particular, as described herein in relation to FIG. 1A, the structure associated with a PE file may comprise many places where executable code for malware can be hidden.

In some embodiments, a Portable Executable (PE) file is a file format for executables, object code, DLLs, FON Font files, and others used in certain versions of Windows operating systems. A PE file may comprise a number of headers and/or sections that inform a dynamic linker how to map the file into the memory of a computer system. An executable image may comprise several different regions, each of which may require different memory protection. For instance, typically the .text section (which holds program code) is mapped as execute/read only, and the .data section (holding global variables) is mapped as no-execute/read/write. FIG. 1B illustrates example sections of a PE file, including example permissions 132. The Sections 116 include, for example, a name 126, virtual size 128, and a virtual address 134. In some embodiments, part of the function of the dynamic linker is to map each section to memory individually and assign the correct permissions 132 to the resulting regions, according to the instructions found in the headers.

A PE file may comprise a Disk Operating System (DOS) Header 102. In some embodiments, the DOS Header 102 may start with the first 64 bytes of every PE file. The DOS Header 102 may play a role in version-checking and backwards compatibility by identifying a MS-DOS compatible file type. In older versions of Windows operating systems and MS-DOS operating systems, the operating system may read the DOS Header 102 in order to be able to determine whether it is compatible with the file. For instance, when attempting to run a Windows NT executable on MS-DOS version 6.0, the operating system may check the DOS Header 102 and may indicate: "This program cannot be run in DOS mode." If, instead, the DOS Header 102 was not included as the first part of the PE file format, the operating system may simply fail the attempt to load the file and offer something completely useless, such as: "The name specified is not recognized as an internal or external command, operable program or batch file."

A PE file may also comprise a DOS code ("Stub") 104, which may comprise a piece of DOS code referred to as a stub that is run when the executable is loaded. Typically, the DOS Stub 104 may print a string, like the message, "This program cannot be run in DOS mode." This may help ensure that the PE file will not cause a crash when run on a DOS system; instead, the program may print the message and then exit. However, the creator of the PE file may be able to place custom code there since Microsoft's linker provides the option to link a stub other than the standard one. Any DOS program may be put in the DOS Stub 104, generally so long as at offset 3Ch (60) there is a DWORD specifying the start of the PE block relative to the start of the file. In some embodiments, the DOS Stub 104 may be a full-blown DOS program.

In some embodiments, the PE file may comprise one or more NT Headers 106, which may comprise a PE File Header 108, Image Optional Header 110, and/or an array of Data Directories 112. The PE File Header 108 may comprise a collection of fields that define what the rest of the PE file looks like, including the location of code and the code size. Additionally, there may be high-level information in the PE File Header 108 that is used by the operating system or other applications to determine how to treat the file. For instance, there may be a field indicating what type of machine or processor the executable file was built for, such as the DEC® Alpha, MIPS R4000, Intel® x86, or some other processor; this field can be referenced to quickly determine how to treat the file without going any further into the rest of the file data. The PE File Header 108 may also include a field identifying how many sections—more specifically, how many section headers and section bodies—are in the file in order to extract the information more easily and efficiently. Each section header and section body may be laid out sequentially in the file, so the number of sections may be necessary to determine where the section headers and bodies end. The Image Optional Header 110 may contain meaningful information about the executable image, such as initial stack size, program entry point location, preferred base address, operating system version, and/or section alignment information, among others. The array of Data Directories 112 entries may comprise relative virtual addresses to data directories contained within section bodies. Each data directory may indicate how a specific section body's data is structured. The section bodies may lack a rigid file structure and they can be organized in almost any way, provided the corresponding section header and data directory entry provides enough information to locate and decipher the data in the section body.

The PE file may also comprise a Table of Section Headers 114, which may comprise a table that may immediately follow the NT Headers 106. As previously mentioned, the PE file may have sections mapped out in the PE File Header 108, which may comprise the content of the file, including code, data, resources, and/or other executable information. Each section may comprise a header and a body, where the raw data or executable code may be stored. The section headers may be arranged together, as each section header may comprise a row or entry in the section table. Each section header may comprise at least 40 bytes of entry, including fields for identifying the size of the corresponding section's data and a pointer to the location of the corresponding section's data (e.g., the section body).

The PE file may also comprise a number of Sections 116 (i.e., the section bodies). The Sections 116 may also comprise certain predefined sections. For example, an application for Windows NT typically has nine predefined sections named .text, .bss, .rdata, .data, .rsrc, .edata, .idata, .pdata, and .debug. Some applications may not utilize all of these sections, while others may define still more sections to suit their specific needs. The predefined sections illustrated in FIGS. 1A and 1B may include the .text Section 118, the .data Section 120, the .edata Section 122, and the .rsrc Section 124.

From FIG. 1A, it can be seen that PE files may comprise many places where executable code for malware can be hidden. Some additional areas to hide executable code can include resources, strings and variables, overlay, and/or sections without execute permissions. Resources may comprise external files and/or data that the PE file can use as necessary. Resources may comprise an area of PE files that malware detection solutions normally do not examine and therefore, may be used to hide malicious code. Any sort of executable code found inside resources may be highly suspicious, and, in some embodiments, the systems and methods described herein can be configured to identify and flag executable code found inside resources for further analysis.

In some embodiments, another file location in which executable code may be hidden is within binary strings and variables, which may comprise a sequence of bytes. Unlike character strings and variables which usually contain text data, binary strings and variables may be used to hold non-traditional data (e.g., media). In some embodiments, it may be common for malware to hide payloads inside binary variables and strings. Existence of code in these areas may be a strong indicator of malicious intent, and, in some embodiments, the systems and methods described herein can be configured to identify and flag executable code found within binary strings and variables for further analysis.

In some embodiments, another location in which executable code may be hidden is the overlay. The overlay of a PE file may be defined as any data that was appended to the PE file and may not be intended to be mapped into memory. In some embodiments, it is a common practice among malware designers to hide payloads in overlays as traditional malware detection solutions typically do not examine the overlay. As such, in some embodiments, the systems and methods described herein can be configured to identify and flag executable code found in the overlay for further analysis.

In some embodiments, another location to hide executable code is within any sections without execute permissions. As previously mentioned, each PE file may comprise several sections. Every section may comprise its own read, write and execute permissions. When loading the PE to memory, the permissions may be inherited from the section in the PE file. In some embodiments, malware frequently hides malicious portions of their code inside sections without execute permissions, as traditional detection systems do not normally check for malicious code within those sections. Existence of any kind of code in these sections may comprise an indicator for malicious intent. As such, in some embodiments, the systems and methods described herein can be configured to identify and flag executable code found within any sections without execute permissions for further analysis.

Executable Code Detection Mechanism

Systems and methods are described herein for identifying executable code (which may or may not be associated with malware) within files. In some embodiments, the malicious code may be located in areas of files that are not typically associated with executable code but can be places for hiding malware payloads. Although some embodiments are directed to PE files and certain locations within the files, some embodiments described herein can be utilized to automatically detect code within any file format or any location within a file. Creating an executable code detection mechanism that can be successfully used in malware detection solutions and run on different parts of the file is highly non-trivial. First, the mechanism may need to be independent of the input size (e.g., it must function well across different file sizes). Second, since the mechanism may be potentially applied to many parts of a file, it may need to maintain a very high level of accuracy so as to avoid false positives (or false negatives). Finally, the task of programmatically predicting if a stream of bytes is executable code or has not been well explored.

In some embodiments, a stream of bytes from, for example, a file are treated as language having words or patterns that appear in a specific order that program a specific function. Thus, the systems and methods described herein may address a stream of code in a similar manner as a series of words. The systems and methods described herein may take advantage of the fact that executable code has many common patterns. In some embodiments, these patterns found in executable code can be exploited for detection purposes by, for example, counting specific byte patterns in order to detect if the data is executable code. More specifically, in some embodiments, n-gram features can be extracted from the data. An n-gram may comprise a contiguous sequence of words (or bytes in the case of code) having a byte length of n. Each n-gram feature may comprise a counter that contains the amount of times that a specific n-gram exists in the data. However, it will be understood that n-gram extraction comprises only one example method for extracting features from a stream of bytes. In some embodiments, other feature generation algorithms may be utilized to generate features from a stream of bytes More specifically, in some embodiments, a predetermined number of the most-frequent n-grams from code sections can be determined. In some embodiments, the predetermined number of n-grams may be about 500. In some embodiments, predetermined number of n-grams may be about 50, 100, 150, 200, 250, 300, 350, 400, 450, 500, 550, 600, 650, 700, 750, 800, 850, 900, 1000, 1500, 2000, 2500, 5000, 10000, and/or any value between two of the aforementioned values. In some embodiments, the number of n-grams may not be predetermined, and instead, every n-gram present in the code sections may be used. In some embodiments, the n-grams may comprise bi-grams (i.e. n=2). In some embodiments, the n-grams may comprise unigrams (1-grams), bi-grams (2-gram), tri-grams (3-grams), 4-grams, 5-grams, 6-grams, 7-grams, 8-grams, 9-grams, 10-grams, 11-grams, 12-grams, 20-grams, 50 grams, 100-grams, 200-grams, 500-grams, and/or any value between two of the aforementioned values. In some embodiments, there may exist a trade-off between the number of features generated and the number of samples when deciding length n. In some embodiments, multiple length n-grams may be used. For example, both bi-grams and tri-grams may be used separately or in combination as features for the predictive model. In some embodiments, n-grams of all possible lengths may be used separately or in combination as features for the predictive model. In some embodiments, extracting n-grams of different length may require a separate feature extraction for each length. The extraction process is discussed below in reference to FIG. 2B.

In some embodiments, when using n-gram features, each counter is normalized by the data length. In some embodiments, those counters can be used as features for a predictive machine learning model, which may be used to determine whether a stream of bytes in one of these areas of PE files is likely to be executable code.

In some embodiments, using bi-grams as features in such machine learning models may achieve very high accuracy rates while being invariant to the size of the data. In some embodiments, the code detection process may be used as part of feature extraction used in traditional malware detection and analysis. In some of such embodiments, the systems and methods described herein may estimate probabilities associated with the likelihood that various locations inside a file contain executable code, and those probabilities may be used as a feature in constructing a model for malware detection. For example, a main malware detection model may be utilized that uses the code sections as input and may check various features of the code sections, such as the imports, strings in the file, and entropy. In some embodiments, the probabilities from the random forests may serve as three or more features for the main malware detection model. Additionally, in some embodiments, any predicted executable code can then be flagged for additional review by a traditional malware detection and analysis program.

Preprocessing the Stream of Bytes

Figure 2A:
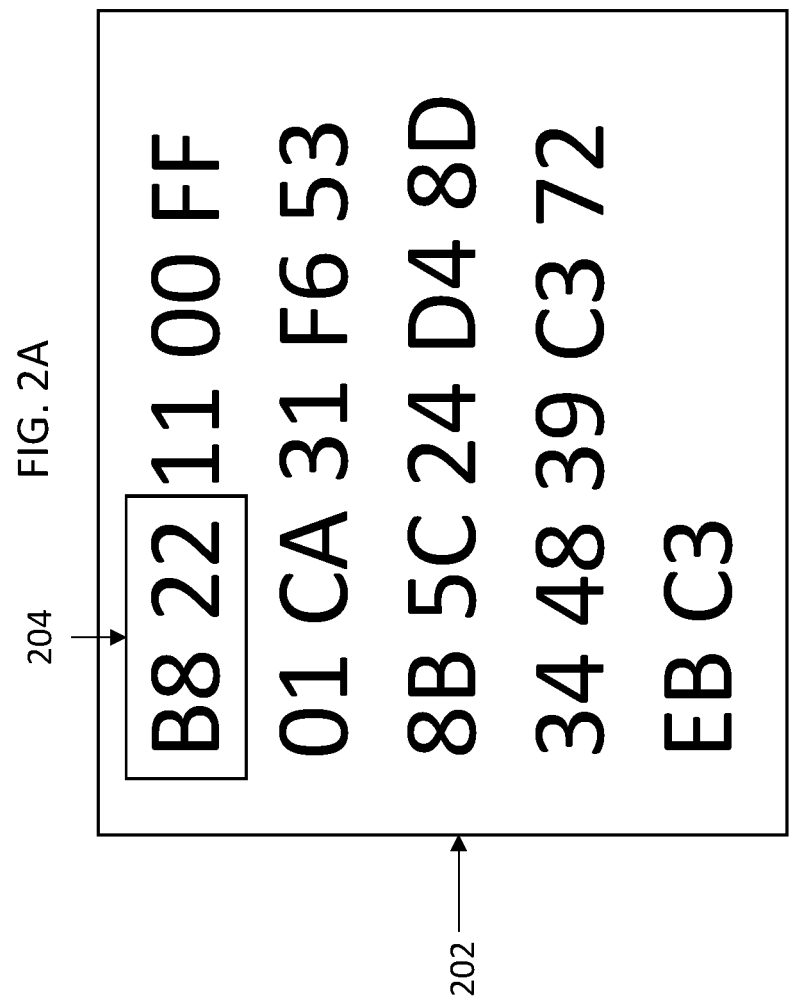
FIG. 2A illustrates an example snippet of machine code, in accordance with some embodiments herein.

FIG. 2A illustrates an example snippet 202 of machine code. More specifically, FIG. 2A illustrates a snippet of x86 machine code with an example bigram ("B8 22") of bytes 204 highlighted. In some embodiments, the next bigram in the stream could be "22 11", and the next one after that could be "11 00", and so forth. It should be noted that the executable code may be associated with any kind of computing architecture (e.g., x86, AMD64, .NET, ARM, and so forth). In some embodiments, executable code generally comprises one of three architectures: x86, AMD64, and .NET. In some embodiments, a machine learning model as described herein may be trained in order to detect executable code for each of these architectures and may select different n-grams for each type, which can also be implemented as three separate models that can be used depending on which architecture the files follow.

Extracting N-grams from the stream of bytes comprises a process for providing the features for input to the predictive machine learning model. Essentially, the n-grams may serve as a repeated series of words of text. For comparison purposes, FIG. 2B illustrates a process for feature generation using a string of words. In the illustrated example, three strings of words 206 are provided, which can be compared to strings of bytes in a file. In some embodiments, preprocessing may comprise analyzing the string of bytes to generate a corpus of n-grams 208, which may comprise a predetermined number of the most common sequence of bytes of n length within the string of bytes. In the illustrated comparative example, a corpus 208 of bi-grams has been generated comprising thirteen bi-grams present within the associated strings of words 206. In some embodiments, n-gram features 210 can be created from the n-gram corpus 208 by moving sequentially through the byte strings and counting how many instances of each n-gram of the n-gram corpus 208 are present in each string of bytes. In the illustrative comparative example, features 210 have been generated, wherein each feature comprises thirteen counters, wherein each counter corresponds to the number of each n-gram numbered 0-13 of corpus 208 within each respective stream of words 206. It should be noted that the counters may exceed one, as there may be multiple identical n-grams within the same stream of bytes. As such, one or more n-gram features may be generated for input into a predictive model for determining if the one or more stream of bytes comprises executable code.

In some embodiments, utilizing n-grams may be critical, as this can help capture the statistical structure of the data and gives the predictive model the needed information to determine whether the stream of bytes is executable code.

Predictive Model

In some embodiments, any suitable machine learning algorithm or combinations thereof may be used to build the predictive machine learning model. Some examples of such machine learning algorithms include support vector machines (SVM), linear regression, K-nearest neighbor (KNN) algorithm, logistic regression, naïve Bayes, linear discriminant analysis, decision trees, neural networks, similarity learning, and so forth. In some embodiments, the machine learning algorithm used to build the predictive machine learning model may be capable of classification (e.g., classifying code as either executable code or non-executable code), and any classifier can be chosen. In some embodiments, and as disclosed herein in the figures for exemplary purposes, a Random Forest algorithm may be used as the machine learning algorithm.

A Random Forest may comprise an ensemble method using machine learning that utilizes multiple decision trees. In some embodiments, a decision tree may comprise a machine learning algorithm capable of fitting complex datasets and performing both classification and regression tasks. For each machine architecture (e.g., x86, AMD64, and .NET), a large number of code sections in that architecture may be collected to serve as input data. Some of the code sections may have executable code, and it may be known which sections have executable code. In this way, the model may understand how to determine a probability that a stream of bytes comprises code.

A Random Forest may comprise an ensemble of these decision trees, each trained independently on a noisy version of the same data. The noise may be in the form of, for example, column subsampling or data resampling. During inference, the trees decisions may be combined via max-voting or averaging.

Figure 3:
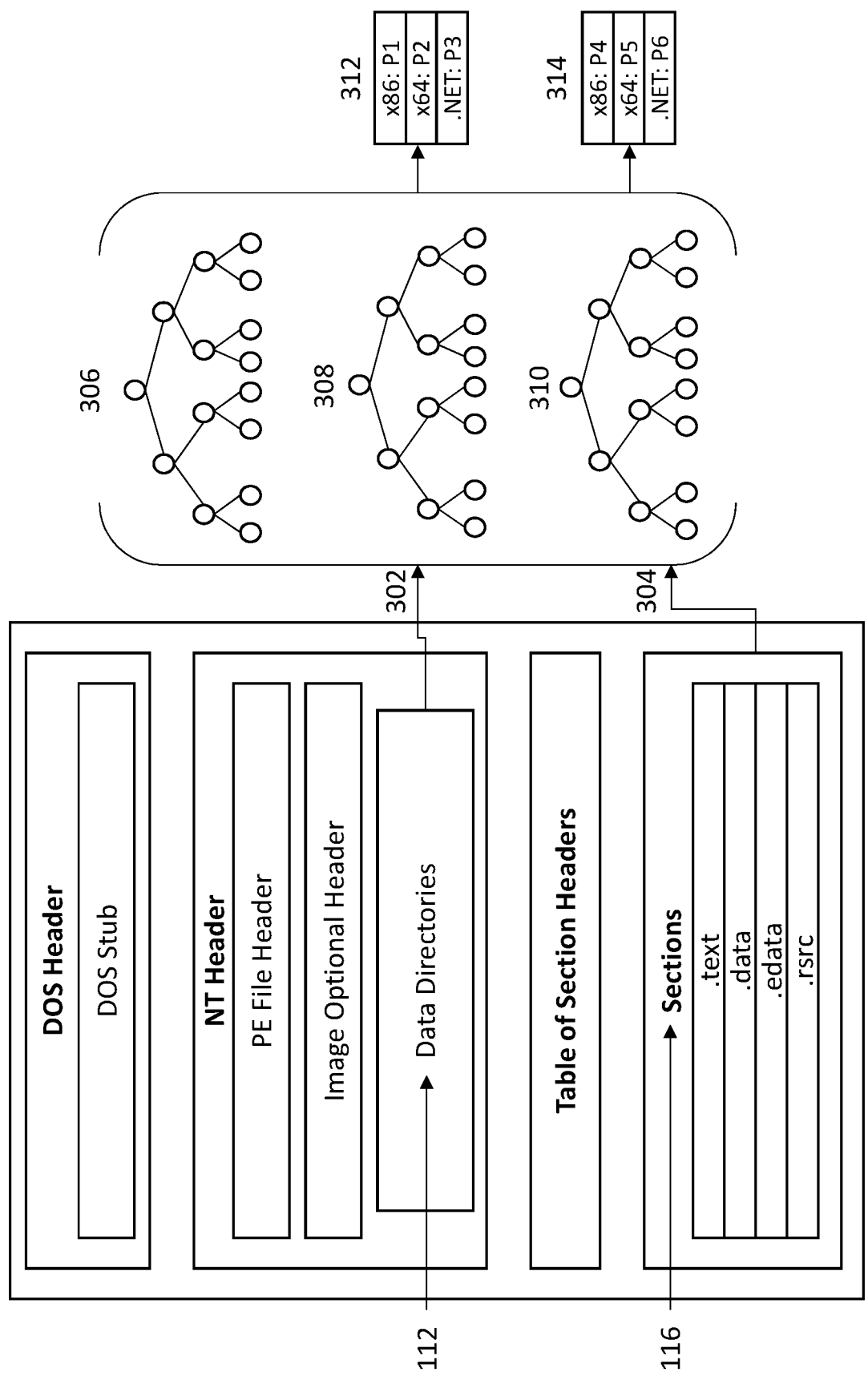
FIG. 3 illustrates a flowchart of a method for using one or more random forests to detect executable code for x86, x64, and .NET architectures according to some embodiments.

FIG. 3 illustrates an example result when using a Random Forest model with n-gram features as input data, in accordance with some embodiments of the present disclosure. As discussed above, the code from various sections (e.g. Data Directories 112 and Sections 116) of a file (e.g. a PE 100) may be broken up into, for example, bi-grams and the 500 most frequent bi-grams may be determined along with a count for how many times each of those bigrams appeared across the code sections. These counts for the 500 most frequent bi-grams may be normalized by data length and used as features for input into the predictive machine learning model, as shown by lines 302 and 304. In some embodiments, the system or machine learning algorithm thereof may comprise three Random Forests 306, 308, and 310, one for each architecture, and each Random Forest may comprise, for example, 500 features. The feature generation may require a single traversal through the data (e.g. $O(n)$) or may be completed using multiple traversals by the model.

In some embodiments, once the Random Forest model is generated for each architecture, the three models 306, 308, and 310 can be run simultaneously for any input without having to determine the architecture associated with the input. In some embodiments, there is no significant delay or effect on the efficiency of a malware detection model utilizing the machine learning model described herein. In some embodiments, this is because running each Random Forest model takes, for example, about $O(\log(n))$ operations, which is negligible. This can be observed in FIG. 3, which shows the set of three separate Random Forest models 306, 308, and 310 being run twice: once at arrow 302 on bytes of from the Data Directories 112 of the PE file 100 and again at arrow 304 on bytes from the Section Bodies 116 of the PE file 100. For arrow 302, the code probabilities for the architectures predicted by the Random Forest models are x86: P1, x64: P2, and .NET: P3. The probabilities P1, P2, and P3 suggest how likely that the bytes from the Data Directories 112 are executable x86, x64, or .NET code, respectively. For the arrow 304, the code probabilities for the architectures predicted by the Random Forest models are x86: P4, x64: P5, and .NET: P6. The probabilities P4, P5, and 63 suggest how likely that the bytes from the Sections 116 are executable x86, x64, or .NET code, respectively.

Although in some embodiments the Random Forest models are useful for determining if bytes in various areas of files are executable code, in the case that the bytes are executable code, the question still remains regarding whether the executable code is associated with a malware payload. In other words, once code is detected, in some embodiments, it may be flagged for further malware detection and analysis. However, empirical results show that, in terms of detection, some code detector machine learning models described herein are capable of providing an overall malware detection boost of at least roughly 0.3%- from 97.7% to 98.0% on PE files in a test dataset. In addition, the increase in malware detection by using code detector machine learning models as described herein can be substantially higher for malware hiding executable code in non-traditional places as described herein.

Figure 4A:
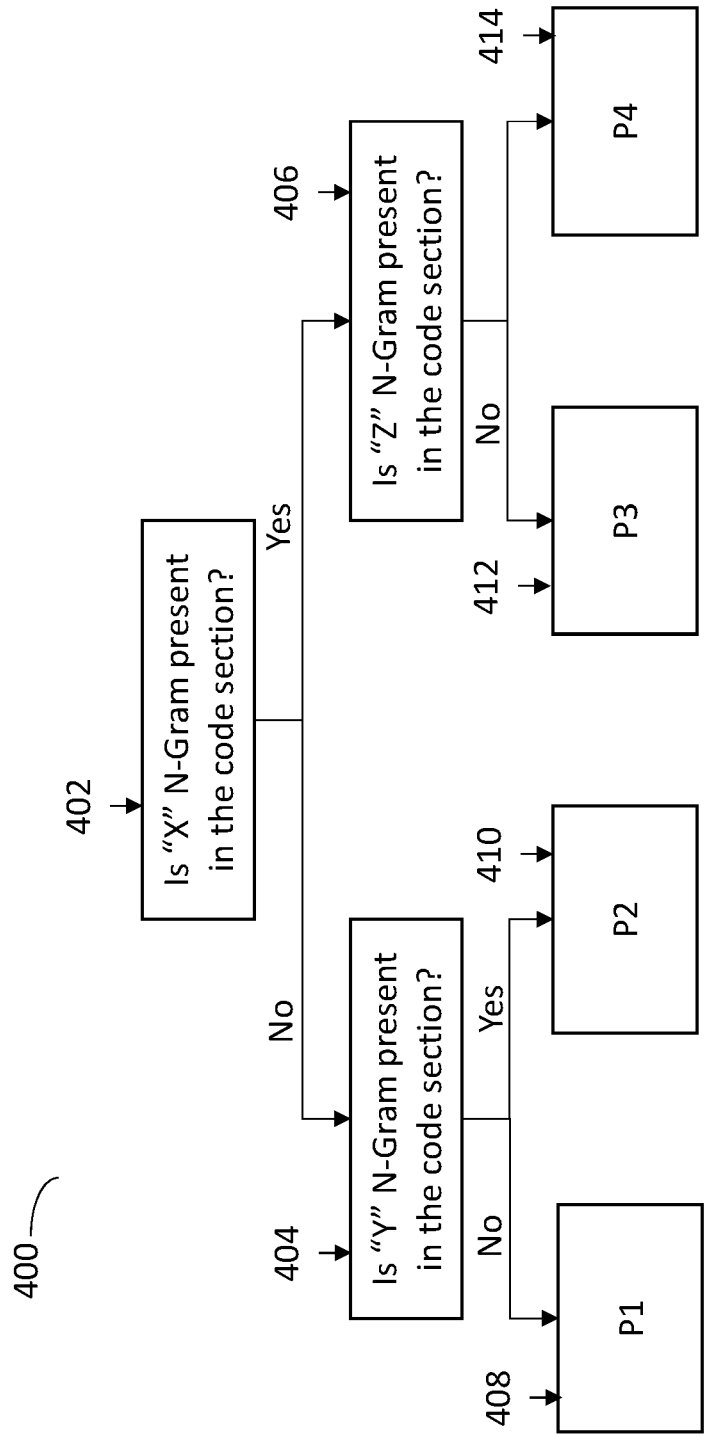
FIG. 4A illustrates an example flowchart for a tree structure according to some embodiments herein.

FIG. 4A illustrates an example flowchart for an individual decision tree structure according to some embodiments herein. Individually, each decision tree of a random forest may comprise a branching structure, wherein each branch is navigated by determining if a specific n-gram is present in the stream of bytes or each if the specific n-gram counter is greater than, less than, or equal to a specific value. For example, node 402 may comprise a check of whether "X" n-gram is present in the code section. If not, the decision three 400 may proceed to node 404 to check if "Y" n-gram is present within the code section. In some embodiments, the decision tree may comprise any number of similar nodes before reaching a probability determination of whether executable code is present in the code section. However, in some embodiments, shallower (i.e. less nodes) trees may be preferable because of bootstrap aggregation, or bagging. Bagging can refer to a machine learning method which improves the stability and accuracy of a model by reducing variance and avoiding overfitting of the training data. Essentially, the results of a large number of weak learners (e.g. shallow trees) learning a different aspect of training data can be averaged to produce a more accurate and stable model than using a smaller number of strong learners (e.g. deeper trees with more nodes). In fact, the use of deeper trees with more nodes can result in overfitting of the training data. Overfitting can occur when a model learns the detail and noise in the training data to an extent that it negatively impacts the performance of the model on new data. When applied here, overfitting can result in the predictive model treating noise or random fluctuations in the code section as necessary features in executable code when, in fact, this randomness may not apply to new code sections outside the training set. Overfitting can negatively impact the predictive model's ability to generalize. Thus, in some embodiments, the number of nodes per tree may be 30 or less to avoid overfitting issues.

Referring back to FIG. 4A, the illustrated embodiment comprises two nodes. In the illustrated embodiment, if "Y" n-gram is not present in the code section, the decision tree 400 may output a probability P1 at 408, while if "Y" n-gram is present in the code section, a different probability P2 may be output at 410. Alternatively, if "X" n-gram is determined to be present at node 402, the decision tree may proceed to check if "Z" n-gram is present at node 406. Depending on the determination of whether "Z" n-gram is present in the code section at node 406, a probability P3 may be outputted at 412 (if "Z" n-gram is not present) or a probability P4 may be outputted at 414 (if "Z" n-gram is present).

Figure 4B:
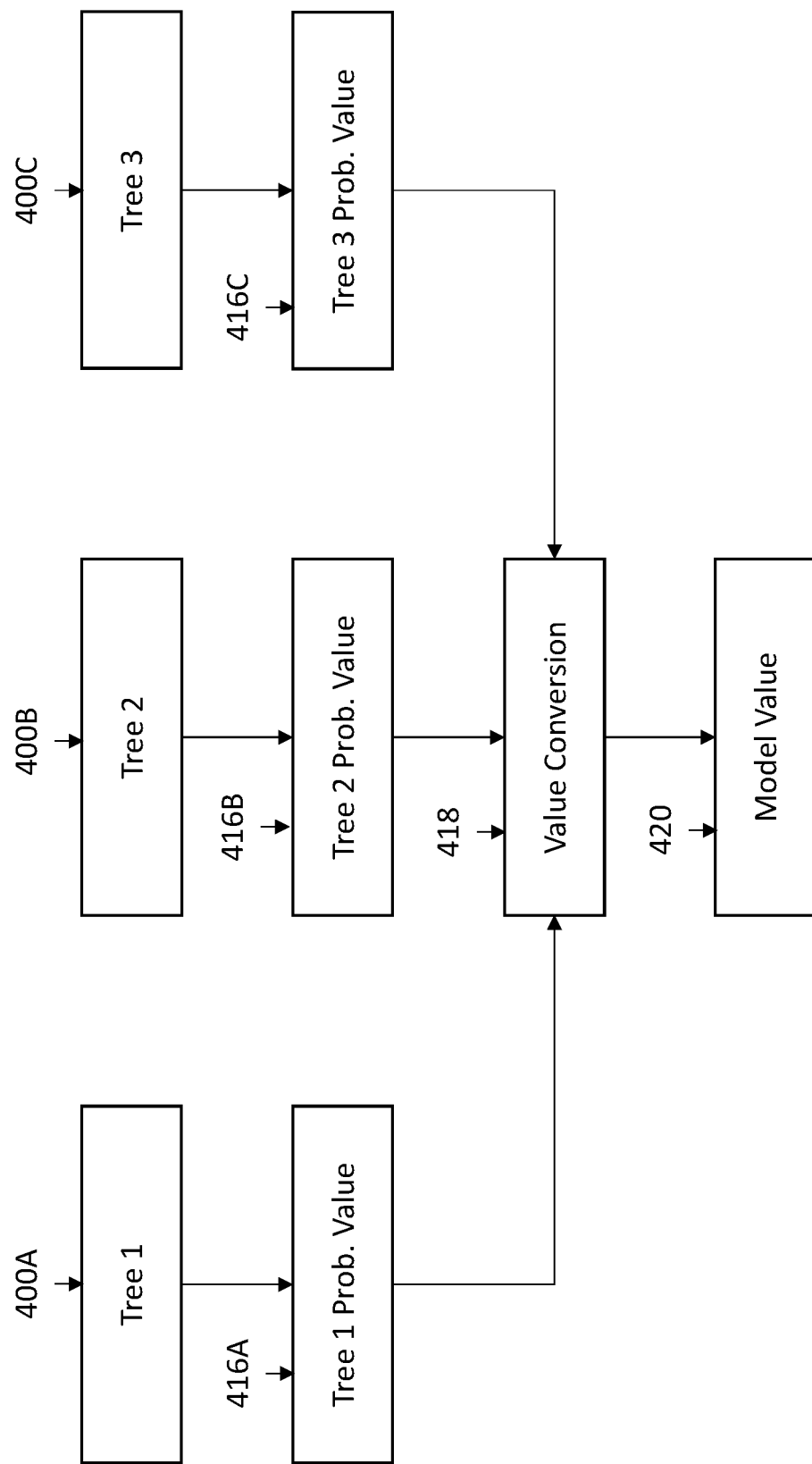
FIG. 4B illustrates an example flowchart for a random forest structure according to some embodiments herein.

FIG. 4B illustrates an example flowchart for a random forest structure according to some embodiments herein. For simplicity, in the illustrated embodiment, the random forest structure is shown as comprising three decision trees. It will be understand by one skilled in the art that the random forest may comprise plurality of decision trees of any number, including, for example, 2 trees, 3 trees, 4 trees, 5 trees, 10 trees, 25 trees, 50 trees, 100 trees, 200 trees, 500 trees, 1,000 trees, 2,500 trees, 5,000 trees, 10,000 trees, 100,000 trees, 1,000,000 trees, or any number of trees in between the aforementioned values. In the illustrated embodiment, the random forest comprises decision tree 1 400A, decision tree 2 400B and decision tree 3 400C. As discussed with respect to FIG. 4A, Tree 1 400A may output a Tree 1 probability value 416A, Tree 2 400B may output a Tree 2 probability value 416B, and Tree 3 400C may output a Tree 3 probability value 416C. Each tree probability value represents a probability that the inputted code section comprises executable code. In some embodiments, the probability values are converted, averaged and/or otherwise manipulated during a value conversion 418. In some embodiments, the value conversion 418 may comprise a simple averaging of the probability values 416A, 416B, and 416C. In some embodiments, the probability of one or more trees may be weighted more heavily than the probability value of one or more other decision trees during the value conversion 418. In some embodiments, a gradient boosting tree model may be utilized. In some embodiments, the result of the value conversion 418 will be a random forest model value 420, which represents a determined probability that the inputted code is executable code in the architecture for which the decision trees and random forest was designed.

Model Training and Testing

In some embodiments, decision trees may be trained in a greedy fashion—that is, the pair of variable-value within the training set that splits the data the "best" can be selected at each iteration. The separation criteria may vary between implementations, including, for example, Information Gain and GINI, among others. During training of the predictive model, various streams of bytes may be tagged, wherein the stream may comprise different sections from files. The sections can be tagged such that the model is taught that some sections comprise executable code and that other sections do not comprise executable code, but rather raw data that is not a valid code. In some embodiments, a plurality of these code sections can be inputted into the model, for example using the n-gram feature extraction method described above. Through this training process, wherein known code and non-code sections are used, the machine learning model may learn specific patterns inside streams of bytes that indicate whether a stream of bytes comprises executable code.

Figure 5:
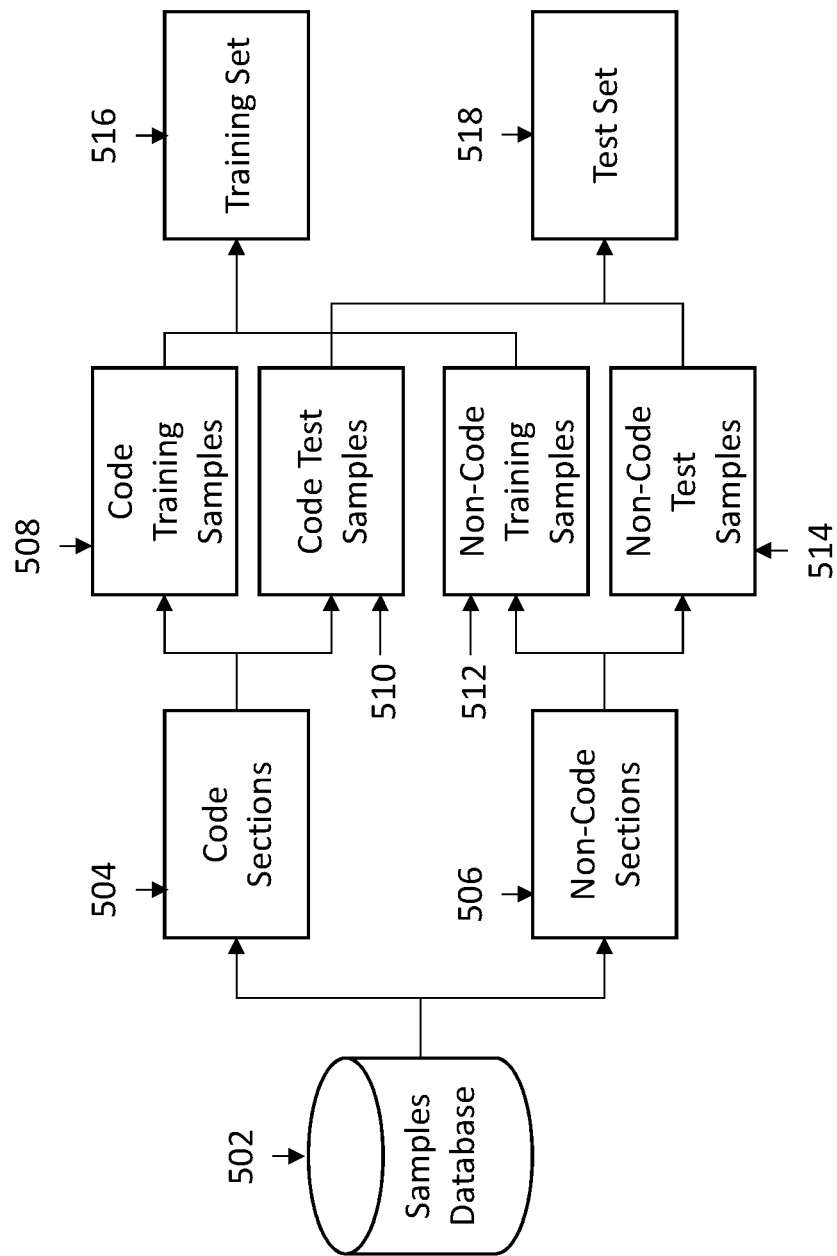
FIG. 5 illustrates an example flowchart for training and testing a code detection model according to some embodiments herein.

FIG. 5 illustrates an example flowchart for training and testing a code detection model according to some embodiments herein. In some embodiments, a samples database 502 is provided comprising a plurality of code samples for training the predictive model. A different samples database 502 may be used for each predictive model for separate architectures (e.g. x86, x64, .NET). Preferably, the plurality of code samples of samples database 502 may comprise a plurality of non-executable code samples and a plurality of executable code samples. In some embodiments, the plurality code samples from samples database 502 are split into executable code sections 502 and non-executable code sections 506. In some embodiments, the code sections 504 and non-code sections 506 are further divided into code training samples 508 and code test samples 510, while non-code sections 506 are divided into non-code training samples 512 and non-code test samples 514. In some embodiments, the code training samples 508 and the non-code training samples 512 are then combined into a training set 516, which can be used to train the predictive model as discussed above. In some embodiments, the model is instructed as to which samples in the training set 516 are executable code and which samples are not executable code, such that the predictive model can generate a series of decision trees, which can be utilized individually or in combination (e.g. Random Forest) as a code detection mechanism. In some embodiments, the test set 518 can be used to test the accuracy of the predictive model. Depending on the results of the testing, different and/or additional samples from samples database 502 may be used to further train the predictive model.

In some embodiments, the samples database may be constructed using code from Sections 116, as the sections comprise most of the file information. As discussed above, a file can be constructed from different Sections 116. Because each section has permissions, the training set 516 can be constructed using a plurality of benign files for which the permission information is known. As previously discussed, it can be difficult to determine if a section is executable code or not. Thus, it can be very problematic to construct a training set 516 and test set 518 using different Sections 116 from various sources and to execute each one of them to determine which sections are executable code. In fact, an inordinate amount of time and effort would need to be spent to construct the training set 516 and test set 518 using this method. Instead, in some embodiments described herein, benign files, like Microsoft files, and like files from known, trusted vendors may be used. Furthermore, in some embodiments, each file may be split into sections having execution permissions that likely would comprise code, and sections without execution permissions that likely would not comprise code. In some embodiments, these prepared sections may be used to construct samples database 502.

Automatic Feature Extraction (AFE)

Some embodiments disclosed herein generally relate to systems and methods for automatically extracting features from code for use in malware detection. Efficient and scalable malware recognition modules can be key components of cybersecurity products.

In some embodiments, an automatic feature extraction system or method may comprise a code-to-numeric feature transformation followed a neural network for extracting automatic features. In some embodiments, the code-to-numeric transformation comprises a lookup table which may replace small code units (e.g. bytes, words, double words) into vectors of numeric values. In some embodiments, for generating an input for the neural network, Word2vec is used over byte codes. However, it will be understood that the lookup table may be created via various different mechanisms. In some embodiments, the neural network may comprise a recurrent neural network (RNN). In other embodiments, the systems and methods may comprise a filtering mechanism for filtering the numeric channels produced by the code-to-numerical transformation, followed by a convolutional neural network.

Introduction

Malware detection modules may decide if an object is a threat, based on the data they have collected on it. The vast majority of static malware detection methods extract highly-engineered features from files and use them to train their Machine Learning (ML) models. However, systems and methods for extracting useful features from executable code are deficient. For this reason, most of the features used in these solutions are related to the file's metadata rather than the actual code. In some instances, this approach works because some malwares contain malicious indicators and patterns in their metadata, such as invalid checksums, suspicious imported APIs and high entropy. However, whereas one may edit a file's metadata to disguise these patterns, the executable code will always have malicious patterns as the code contains the actual logic of the executable. For this reason, human malware researchers are commonly used to examine code and these human researches generally pay much more attention to the executable code rather than the metadata. The downside, however, is that human examination is generally slow, costly, and incredibly inefficient. Thus, efficient and programmatic systems and methods for propagating executable code features to Machine Learning models can improve detection solutions significantly.

In some embodiments, since manually extracting features from code is difficult and inefficient, the systems and methods described herein extract features automatically using a neural network and Deep Learning (DL) (also known as deep structured learning or hierarchical learning). In some embodiments, DL methods are capable of achieving superior results with raw data without having to extract manual features from the raw data. This is part of the reason that deep models have revolutionized the fields of NLP and Vision—it is not trivial to extract features from data in these fields. In some embodiments, DL comprises a specific type of ML methods based on learning data representations. The embodiments described herein are related to automatic feature extraction from executable code using a ML model. In some embodiments, the ML model comprises a DL model. In some embodiments, the DL model comprises a neural network. In some embodiments, the DL model may comprise a deep neural network, deep belief network, recurrent neural network, and/or any other ML and/or DL model structure known to those skilled in the art.

In some embodiments, the DL model comprises multiple layers of linear or nonlinear processing units for feature extraction and data transformation. In some embodiments, each successive layer of the DL model uses the output from the previous layer as an input. In some embodiments, the DL model may be a supervised, semi-supervised, and/or unsupervised learning model. In some embodiments, the DL model comprises a credit assignment path (CAP) comprising the chain of transformations from input to output. In some embodiments, the DL model comprises a feedforward neural network with a CAP depth of 2, 3, 4, 5, 6, 7, 8, 9, 10, 20, 30, 40, 50, 100, 200, 300, 400, 500, 600, 700, 800, 900, 1000, 2000, and/or between any of the aforementioned values. In some embodiments, the DL comprises a recurrent neural network.

In some embodiments, the systems and methods described herein train a neural network for malware prediction directly from executable code. In some embodiments, a file (e.g. Portable Executable) can be processed by the trained neural network and the neural network can be used as a "feature generator" for a broader malware detection model. In some embodiments, the neural network (or any other ML and/or DL model) can be used as an automatic feature extractor from executable code. In some embodiments, using features extracted from the ML and/or DL model (e.g. neural network) significantly improves the results of the malware detection model.

In some embodiments, generally, a neural network is a ML model that is composed of several layers. In some embodiments, each layer performs a transformation on the data and sends the result to the next layer. In general, the last layer of a neural network uses a final data transformation from a penultimate layer of the neural network to predict a label or classification of the data (e.g. this code is malware or benign code). However, in some embodiments, the systems and methods described herein use the penultimate form of the data (i.e. the data transformation immediately before the last layer from which the final label or classification is generated) as features for a malware detection model. In some embodiments, since the neural network achieves its final prediction from a single transformation to the penultimate form of data, this form contains very strong information regarding the maliciousness of the code. In some embodiments, the systems and methods described herein may use any transformation of the data (i.e. input or output from any layer of the neural network) to be used as a feature in the main malware detection model.

In some embodiments, training and using the neural network on raw code is non-trivial. In some embodiments, the size of code can vary considerably (e.g. from 1 KB to 100 MB and any value between the aforementioned values), whereas deep models generally expect a fixed-size input. Furthermore, in some embodiments, augmenting the input data to a fixed maximum size is infeasible. Therefore, in some embodiments an image scaling algorithm is used, where the byte code is interpreted as a one-dimensional "image" and is scaled to a fixed target size. In some embodiments, the systems, methods, and devices herein treat the code as a one-dimensional image. In some embodiments, the code can be rescaled to a constant size using, for example, an image rescaling approach (e.g. interpolation). In some embodiments, the image scaling algorithm may comprise a type of data compression. However, by using an image scaling algorithm, the distortion of spatial patterns present in the data can be limited. Compared to approaches of converting a malware binary file to a two-dimensional image before doing classification, this approach may be simpler since the height and width of the image do not need to be determined. In some embodiments, converting to a byte stream preserves the order of the binary code in the original file, and this sequential representation of the data makes it natural to apply a neural network architecture to the data. In some embodiments, each byte stream is scaled to a predetermined size. In some embodiments, the scaled code corresponds to a sequence of 1-byte values.

Generally, certain methods attempt to classify a malware directly from a binary file without needing to extract features from the file. However, in some embodiments, a ML and/or DL model can be trained and used for malware classification from raw data, but alternatively used as a method of automatically extracting features for a separate malware detection model comprising various additional inputs. Therefore, in some embodiments, the input of the neural network is different from traditional models in that only the code serves as an input, not an entire file. Furthermore, in some embodiments, the utilization of the neural network is different from traditional models, which are used to examine a file and classify the file as malware. In some embodiments, the neural network described herein is used instead for feature extraction. In some embodiments, unlike traditional models, as described below, embedding is completed before the data compression. Furthermore, due to the differences in input, the neural network described herein uses a different neural network architecture from a traditional model.

In some embodiments, linear interpolation uses the fact that similar byte values have a similar semantic meaning. For example, this makes sense for images: a pixel with value 230 and a pixel with value 228 look very similar in color. However, in some embodiments, this is not the case in executable code: two byte values that are close can represent completely different opcodes. Thus, in some embodiments, an embedding table is utilized before rescaling the data by training another separate model (e.g. Word2Vec) on sections of executable code. In some embodiments, the separate model transforms the data into a numerical form that the neural network can understand. In some embodiments, each byte in the data can be translated to a fixed-size vector using the learned embedding table, and vectors in this new dimension maintain the required property for linear interpolation: Euclidean similarity indicates semantic similarity.

Figure 6:
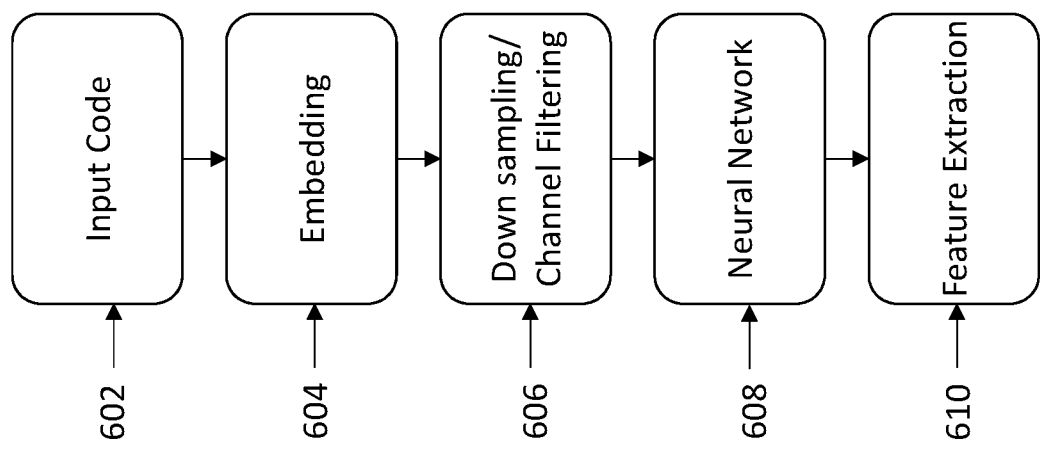
FIG. 6 illustrates an example flowchart of an automatic feature extraction method using a neural network according to some embodiments herein.

FIG. 6 is a flowchart illustrating an example embodiment of a feature extraction method using a neural network according to various embodiments herein. To summarize, the following comprises an example method for training and using an automatic feature extraction system and method according to some embodiments. In some embodiments, the method may comprise providing a raw input code at 602. In some embodiments, an embedding table of size N is generated using a pre-processing neural network (e.g. Word2Vec) on the input code at 604. In some embodiments, N may be any integer. In some embodiments, N is 4. In some embodiments, N may be 2, 3, 4, 5, 6, 7, 8, 9, 10, 15, 20, 25, 50, 100, 1000, 5000, 10000, 50000, and/or any value in between the aforementioned values. In some embodiments, the method may comprise preprocessing a given stream of input code of size X by embedding each byte using the learned embedding table. In some embodiments, the results of the preprocessing is data in a two-dimensional matrix of size (X,N). In some embodiments, the method comprises using interpolation or down sampling such as, for example, nearest neighbor, linear, spline or other to resize a matrix to a fixed size at 606. In some embodiments, the method comprises using linear interpolation to resize the matrix to a fixed size. In some embodiments, the fixed size may be (5000, 4). However, the fixed size may not be limited and can comprise any combination of integers X and N. In some embodiments, the down sampling is completed using channel filtering. In some embodiments, the method further comprises training a neural network (or other ML and/or DL model) for malware prediction with the preprocessed data serving as input for the neural network at 608. In some embodiments, the method further comprises an inference, wherein the neural network processes new data that is presented to the model. In some embodiments, the method further comprises, during inference, preprocessing the new data and running the preprocessed new data through the neural network at 608. In some embodiments, the method further comprises extracting the output data from the penultimate layer (i.e. the input to the last layer of the neural network) at 610 for use as a feature for a malware detection model. In some embodiments, the actual result or prediction of the neural network (i.e. output of the last layer of the neural network) is discarded. In some embodiments, the output data from the penultimate layer may be used as an additional feature vector which represents the code and may be concatenated and/or combined to other manual or automatically extracted features. In some embodiments, the output data may be used as an input to malware detection machine learning model and can be used for training the neural network.

Neural Network Architecture

In some embodiments, a neural network is constructed using a network comprising a fixed number of layers of one-dimensional convolution, where each convolution may be followed by batch normalization and rectified linear unit (ReLU). ReLU can refer to an activation function in neural networks, such as in convolutional neural networks (CNNs). In some embodiments, the fixed number of layers of one-dimensional convolution may be 3. In some embodiments, the fixed amount of layers of one-dimensional convolution may be 1, 2, 3, 4, 5, 6, 7, 8, 9, 10, 20, 30, 40, 50, 100, 200, 300, 400, 500, 600, 700, 800, 900, 1000, 2000, and/or an amount between any of the aforementioned values.

In some embodiments, each convolution has a kernel size, stride, and/or filters. In some embodiments, stride controls how the filter convolves around the input data. In some embodiments, the kernel size may be 7. In some embodiments, the kernel size may be 1, 2, 3, 4, 5, 6, 7, 8, 9, 10, 20, 30, 40, 50, 100, 200, 300, 400, 500, 600, 700, 800, 900, 1000, or 2000, and/or any amount between any of the aforementioned values. In some embodiments, the stride may be 1. In some embodiments, the stride may be 1, 2, 3, 4, 5, 6, 7, 8, 9, 10, 20, 30, 40, 50, 100, 200, 300, 400, 500, 600, 700, 800, 900, 1000, or 2000, and/or any amount between any of the aforementioned values. In some embodiments, each convolution comprises 3 filters. In some embodiments, each convolution comprises 1, 2, 3, 4, 5, 6, 7, 8, 9, 10, 20, 30, 40, 50, 100, 200, 300, 400, 500, 600, 700, 800, 900, 1000, or 2000 filters, and/or any amount between any of the aforementioned values. In some embodiments, the filters may comprise a size of, for example, 30, 50, and/or 90.

In some embodiments, after the convolutional layers, the data is passed through one or more fully-connected layers. In some embodiments, the model may comprise 2 fully-connected layers. In some embodiments, the model may comprise 1, 2, 3, 4, 5, 6, 7, 8, 9, 10, 20, 30, 40, 50, 100, 200, 300, 400, 500, 600, 700, 800, 900, 1000, or 2000 fully-connected layers, and/or any amount between any of the aforementioned values. In some embodiments, the model may comprise 2 fully-connected layers with 810 and 256 units, respectively. In some embodiments, each fully-connected layer may comprise 1, 2, 3, 4, 5, 6, 7, 8, 9, 10, 20, 30, 40, 50, 100, 200, 300, 400, 500, 600, 700, 800, 900, 1000, 2000, 3000, 4000, 5000, 10000, or 25000 units, and/or any amount between any of the aforementioned values.

In some embodiments, the extra embedding dimension can be treated as multiple input channels. In some embodiments, the extra embedding dimension can be treated as 4 input channels. In some embodiments, the extra embedding dimension may comprise 1, 2, 3, 4, 5, 6, 7, 8, 9, 10, 20, 30, 40, 50, 100, 200, 300, 400, 500, 600, 700, 800, 900, 1000, or 2000 input channels, and/or any amount between any of the aforementioned values.

To avoid overfitting, the network may be trained with dropout. Dropout can refer to ignoring units (i.e. neurons) during the training phase of a certain set of neurons which can be chosen at random. In some embodiments, these ignored units are not considered during a particular forward or backward pass. In some embodiments, at each training stage, individual nodes are either dropped out of the network with probability 1-P or kept with probability P, so that a reduced network is left; incoming and outgoing edges to a dropped-out node may also be removed. In some embodiments, P is about 0.5. In some embodiments, P is about 0.05, about 0.10, about 0.15, about 0.20, about 0.25, about 0.30, about 0.35, about 0.40, about 0.45, about 0.50, about 0.55, about 0.60, about 0.65, about 0.70, about 0.75, about 0.80, about 0.85, about 0.90, about 0.95, or about 1.00, and/or between any of the aforementioned values.

Figure 7:
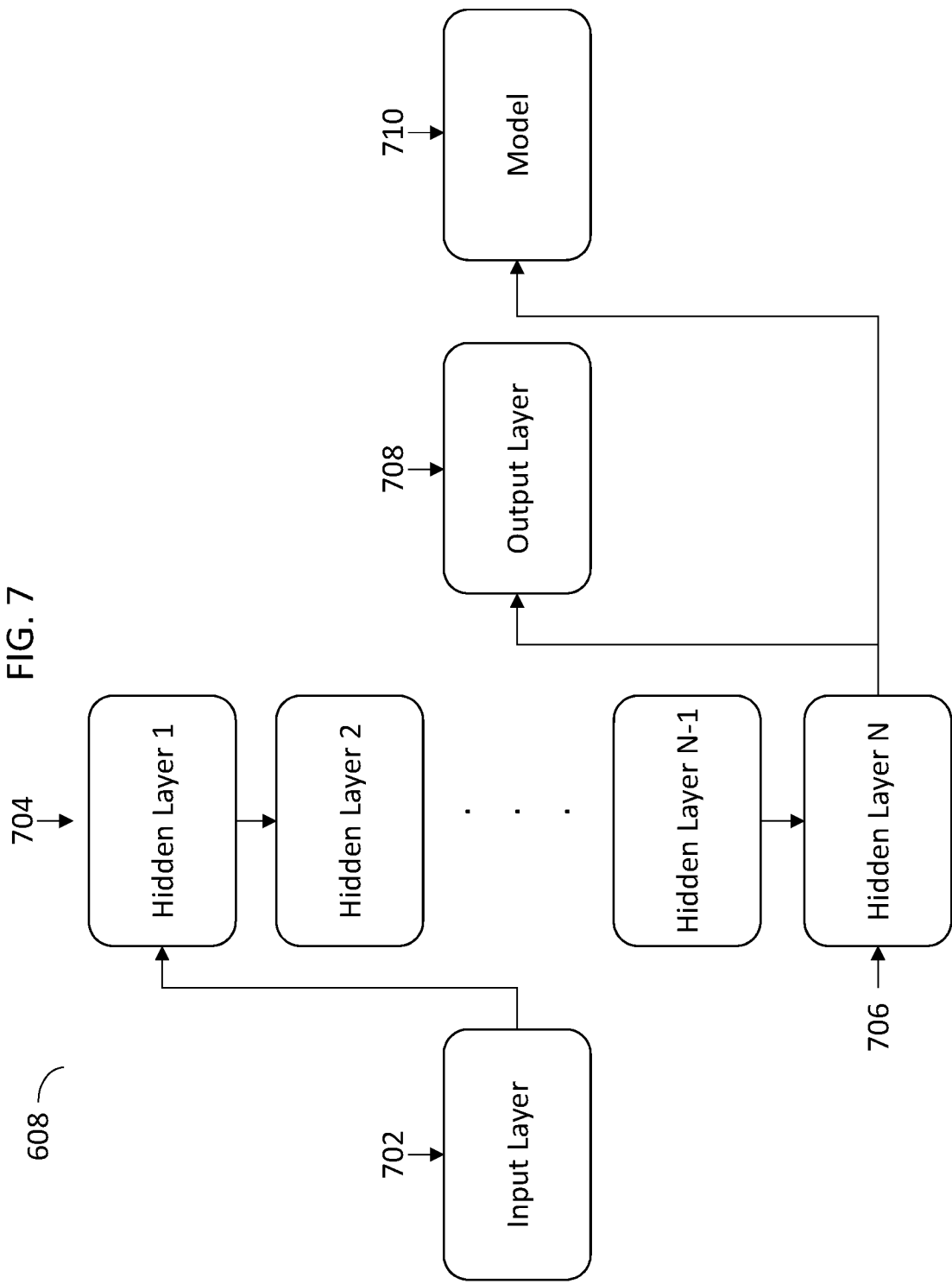
FIG. 7 illustrates an example feature extraction method using a neural network according to some embodiments herein.

FIG. 7 illustrates an example feature extraction method using a neural network according to some embodiments herein. In some embodiments, after embedding and downsampling an input code, the preprocessed code is provided to an input layer 702 of neural network 608. As discussed above, in some embodiments, the neural network comprises multiple layers of linear or nonlinear processing units for feature extraction and data transformation. In some embodiments, each successive layer of the neural network uses the output from the previous layer as an input. Thus, in some embodiments, input layer 702 performs a data transformation on the preprocessed input code and sends the output to a first hidden layer 704. Hidden layers can refer to layers of a neural network that reside between the input layer 702 and an output layer 708. The word "hidden" can imply that the hidden layers are not visible to the external systems and are private to the neural network. Typically, the output of any given hidden layer is not utilized, as the output comprises transformed data that will eventually be used to produce a result to be outputted by the output layer 708 after traversal through all of the hidden layers. In some embodiments, the neural network may comprise zero or more hidden layers. In the illustrated embodiment, the neural network comprises N hidden layers numbered from the first hidden layer 704 to the Nth hidden layer 706. In some embodiments, the Nth hidden layer 706 comprises the penultimate layer of the neural network, directly before the output layer 708. In a typical neural network, the output layer 708 may provide an output classification based on the purpose of the neural network. In this case, the output layer 708 may provide a classification of whether the input code comprises malware. However, some embodiments of the systems and methods described herein disregard the result of the output layer 708. Instead, the final data transformation generated from the Nth hidden layer 706 may be extracted from the neural network 608 and used as a feature for a separate, broader malware detection model 710. The malware detection model 710 may take as input, the feature extracted from the Nth hidden layer 706, and/or features from various other sources, to make a final determination of whether the code is malware. In some embodiments, the final data transformation of the neural network provides a strong indication of whether the code is malware, especially when combined with other indicator features in the broader malware detection model 710.

Channel Filtering

Figure 8:
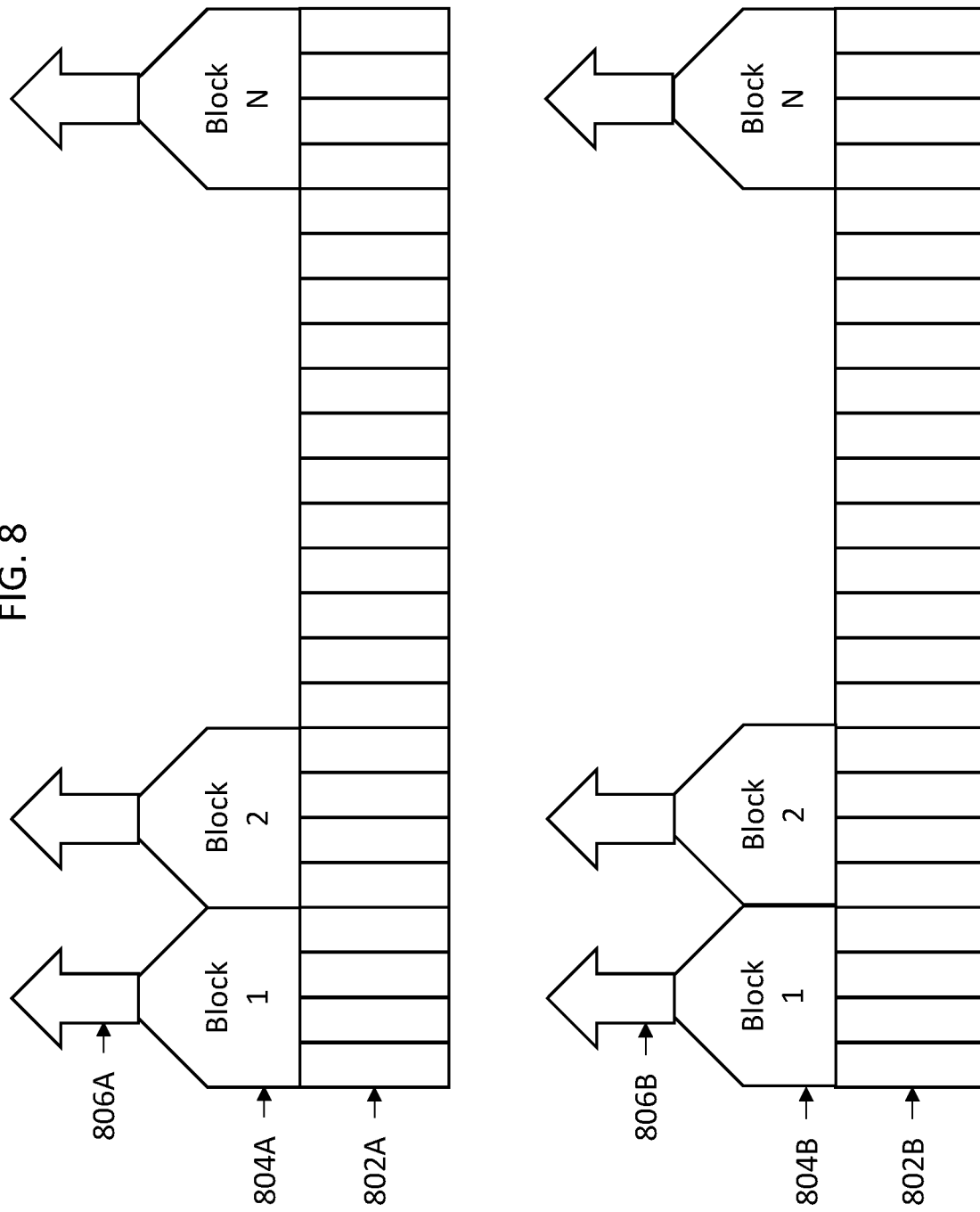
FIG. 8 illustrates an example channel filtering mechanism according to some embodiments herein.

FIG. 8 illustrates an example channel filtering mechanism according to some embodiments herein. As discussed above, in some embodiments, the input code 602 is unbounded. In some embodiments, the input code 602 may be a very short string of code or could be a very long string code. However, the input layer 702 of the neural network 608 must receive a fixed size input. In some embodiments, the input layer 702 may take as input a sample of, for example, 5,000 embedded vectors. In that case, for large code sections, the code must be reduced or down sampled to 5,000 samples of the code in some embodiments. This can be done in various different ways. In some embodiments, samples may be manually or automatically selected from the code. In other embodiments, the code may be divided into blocks and then aggregated, for example, by taking the average response of each block as a sample.

However, in some embodiments, prior to downsampling, the code may undergo embedding, which can refer to a modeling technique used for mapping the code to vectors of real numbers. It can represent the code in vector space with one or more dimensions. Embeddings can be generated using various methods like neural networks, co-occurrence matrix, or probabilistic models. For example, Word2Vec consists of models for generating word embedding. These models can be shallow two layer neural networks having one input layer, one hidden layer and one output layer. In some embodiments, embedding reformats the code such that code that is present in a similar context tends to be closer to each other in a produced vector space. In some embodiments, the embedding results in a four dimension vector space. The embedding step may be necessary because the neural network functions using numerical values as inputs. In some embodiments, the neural network takes as input numerical values which may be received from convolutions, additions, applications, and/or numerical transformations. In some embodiments, the neural network is not configured to use the raw code as an input. In some embodiments, in order to transform the code into meaningful numerical values which can then be down sampled and inputted into the neural network, embedding must be utilized.

Referring to FIG. 8, each of a plurality of channels 802A, 802B can represent one of the vector layers of the embedded vector space. In some embodiments, each vector layer is very large and must be further consolidated into a plurality of blocks 804A, 804B. In some embodiments, each channel 802A, 802B may be consolidated into N blocks. Once the channels are separated into blocks, a filter 806 may be used to produce a response value or sample which may represent that channel and specific blocks of the channel. The purpose of the filtering mechanism can be to provide a fixed size vector input to the neural network. In some embodiments the code is inputted into an embedding layer (e.g. Word2Vec), as described above, which may store an embedding table to map code fragments represented by indexes to vector representations. In some embodiments, the embedding may comprise a representation of the code where similar code fragments are assigned similar representations. In other words, the embedding may represent code in one or more coordinate systems wherein related code fragments, based on a corpus of relationships, are placed closer together.

In some embodiments, the embedded code is inputted into a channel filtering system. In some embodiments, the channel filtering system may perform filtering (e.g. smoothing) of each channel to avoid aliasing and under-sampling of the data. In some embodiments, the filter shape may comprise, for example, a smoothing kernel (e.g. low-pass filter), average filter (e.g. box filter), or Gaussian filter. In some embodiments the sum of the filter values is 1.0. In some embodiments, the filter comprises a one-dimensional filter for each channel, wherein some or all channels have the same filter length. In some embodiments, the filter length may comprise an odd number and may be calculated as Filter Length=1+ 2*floor(L/S*Alpha), wherein 0<=Alpha<=Alpha_max, L is the code length, and S is the final sample size. Alpha_max may equal 1 in some embodiments. In some embodiments, Alpha may be selected to be equal to zero, causing the filter to be equivalent to a delta function.

Figure 9:
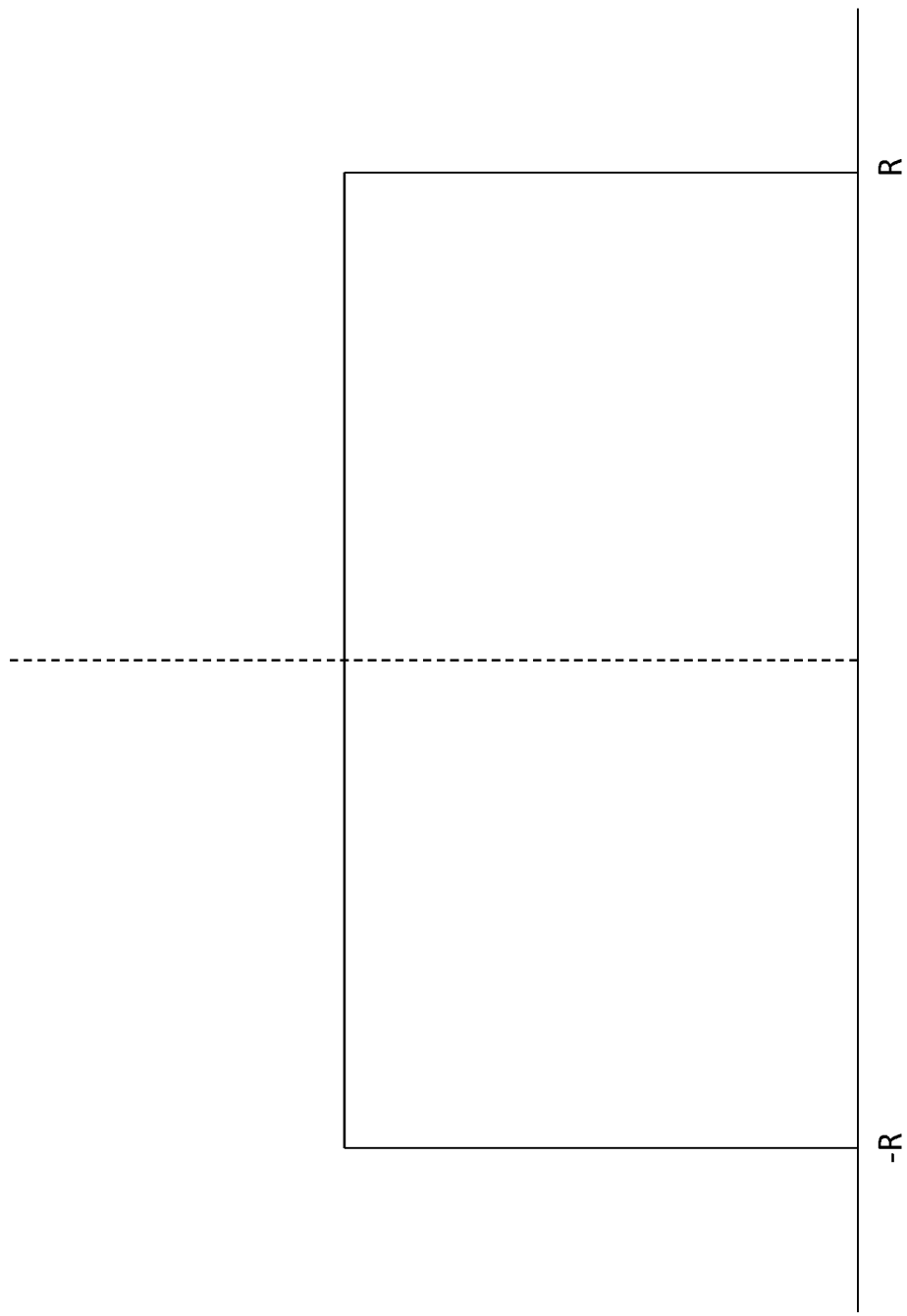
FIG. 9 illustrates an example box function showing the behavior of a filtering system according to some embodiments herein.
Figure 10:
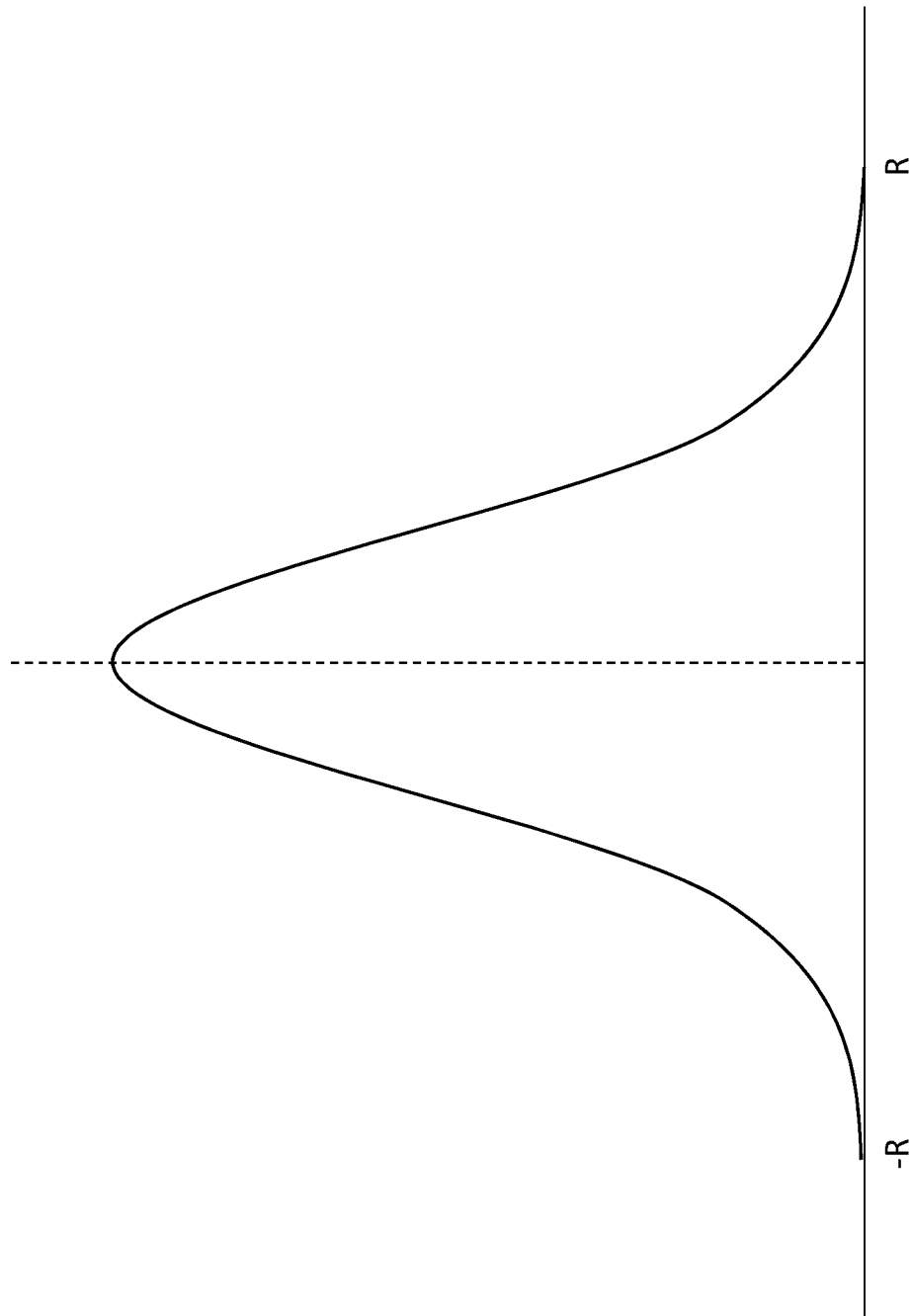
FIG. 10 illustrates an example Gaussian function showing the behavior of a filtering system according to some embodiments herein.
Figure 11:
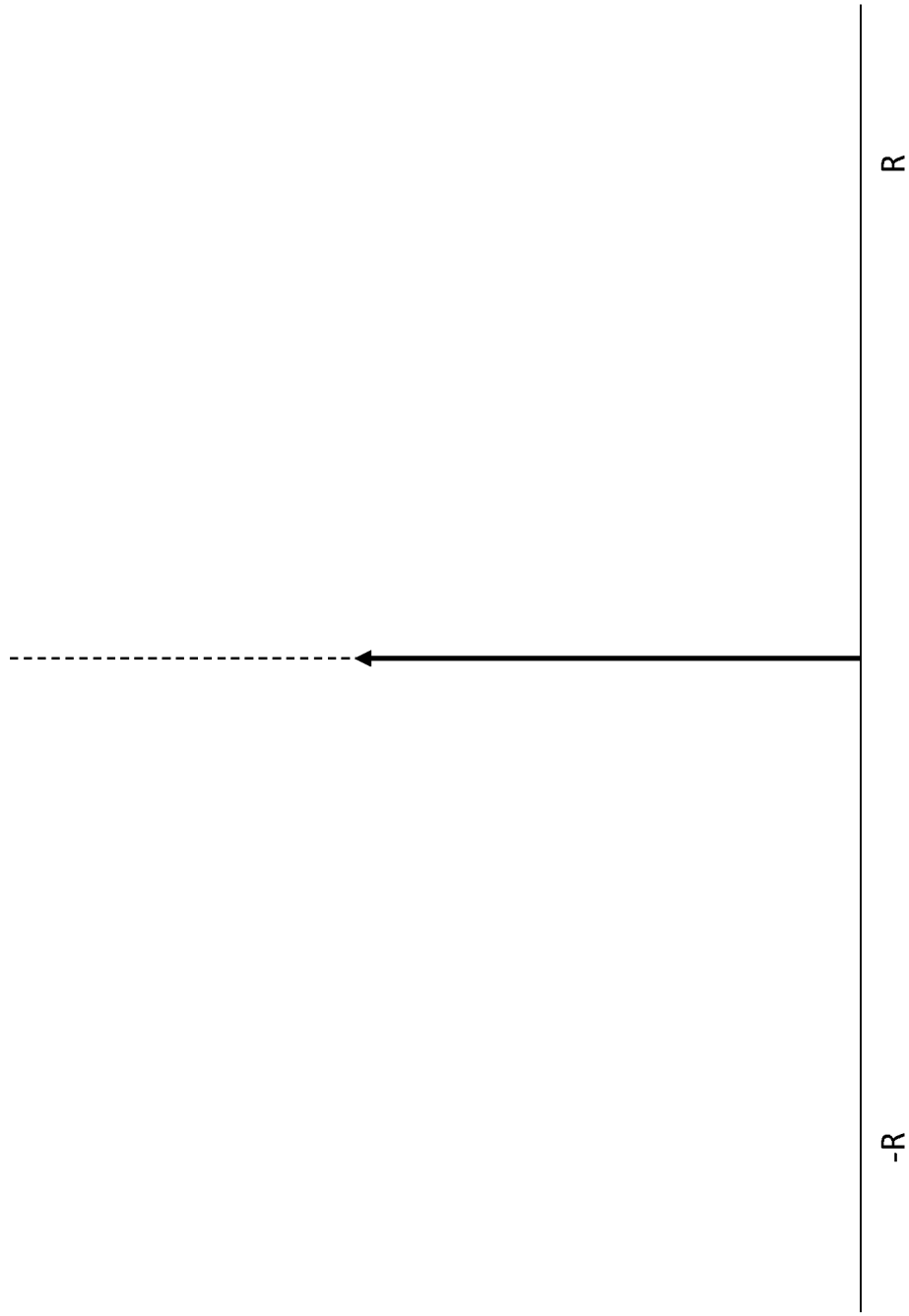
FIG. 11 illustrates an example delta function showing the behavior of a filtering system according to some embodiments herein.

There are several forms of filters that may be used to produce a response value or sample of fixed size for input to the neural network. For example, functions for filtering blocks 804A, 804B are illustrated in FIGS. 9, 10, and 11. FIG. 9 illustrates an example box function showing the behavior of a filtering system according to some embodiments herein. In the illustrated example, a range of values from the range –R to R are selected from the block and given equal weight, while values outside of the range are disregarded. The range –R to R is considered to be representative of the entire block in the illustrated example. As such, the size of the sample can be reduced by estimating representative value from that range. In the illustrated embodiment, using a box function may result in the average embedded value of the block codes being processed.

FIG. 10 illustrates an example Gaussian function showing the behavior of a filtering system according to some embodiments herein. In some embodiments, a Gaussian filter can be used to filter the blocks 804A, 804B, such that values in the middle of a range –R to R are included in the filtered sample so that the estimated embedded value is strongly effected according to values which are closer to the center of the block as in expectation function in statistics FIG. 11 illustrates an example delta function showing the behavior of a filtering system according to some embodiments herein. In the embodiment herein, a delta function filtering mechanism may simply involve selecting the middle value of blocks 804A, 804B as the filtered sample.

Many other filtering mechanisms exist and are well known to those skilled in the art. Any filtering mechanism can be used in the systems and methods described herein. In some embodiments, the result of the embedding and filtering steps is a down sampled, embedded code sample, which can be input into the neural network for feature generation.

Improvement in Malware Detection

In some embodiments, the systems and methods herein detect and propagate features to a malware detection model. In some embodiments, using extracted features may significantly increase the detection capabilities of a malware detection model. As an example, a malware detection model was evaluated by checking the accuracy for a False Positive rate of 0.04% ("validate" threshold) on 500,000 .NET files. In this example evaluation, the neural network used alone (i.e. the result or classification of the network) was found to have a detection rate of 76.1% at the validate threshold. The malware detection model alone was found to have a detection rate of 98.0%. The malware detection model utilizing extracted features from an automatic feature extraction system as described herein was found to have a detection rate of 98.5%. A 0.5% increase in detection represents an improvement of 25% as the model alone does not detect around 2% of malware, but the model with feature extraction does not detect around 1.5% of malware. Such increases are significant in the malware detection field, as even a small increase in detection capabilities can represent an enormous enhancement in malware discovery over a large sample size of files. Furthermore, it is very difficult to further improve a model having a near–100% detection rate, and any such improvement may save computer users from catastrophic harmful software that would otherwise go undetected. It can be noted that the neural network's detection alone is relatively low due to the very strict false positive rate of the validate threshold. Most scientific articles use a much less strict False Positive rate, and likely evaluate detection using simpler datasets.

Runtime Testing

As another example, a runtime test was performed by running the malware detection model on 300 .NET files. Without feature extraction, the text took about 4 seconds, whereas with feature extraction, the test took about 6 seconds. Overall, around 40% of the runtime constitutes feature extraction. This increase may be deemed acceptable as the feature extraction represents a significant improvement on detection of previously undetected malware.

Position Independent Code Detection

Additional techniques, features, and aspects of the present disclosure relate to techniques for identifying, flagging, and/or detecting malicious executable code. Specifically, there exists a need for identifying, flagging, and, detecting malicious software that attempts to utilize Operating System APIs in an abnormal way.

Introduction

In some embodiments, the systems and methods described herein may detect pieces of code which independently find and call a monitored function. In some embodiments, the systems and methods described herein may be used to detect pieces of code which attempt to obtain the address of monitored functions without using traditional approaches, such as Static or Dynamic imports. Many times, threat actors use the Operating System API functions ("OS API functions") e.g. via the correlated exported function address, which might have been determined and called independently (finding these functions in one or more non-legitimate ways). For example, threat actors may attempt to use these functions in an inherited abnormal state, after the threat actor has successfully exploited some vulnerability. Alternatively, threat actors may attempt to mask their operation such that computer security products will have difficulty detecting the threat actors. Hence, the systems, methods, and devices herein may be designed to identify threat actors which attempt to obtain access to library functions and/or function addresses independently.

In some embodiments, the systems and methods herein may be directed to and/or comprise a positive trap for detecting malware or other threat actors through a process of identifying legitimate retrieval of library functions. In some embodiments, the trap is embedded in an operating system. In some embodiments, the trap may be triggered or engaged by malware, allowing the methods and systems for library position independent executable code detection described herein to flag or identify the malware. In some embodiments, the traps described herein may take advantage of a threat actors attempt to gain access to system functions or resources. In particular, the traps described herein may detect threat actors that attempt to gain access to library functions using non-traditional, irregular, atypical, anomalous, or suspicious methods. In some embodiments, the traps described herein may detect threats actors that access library functions using non-traditional methods by monitoring system functions to determine that they were not accessed using traditional methods. In some embodiments, the traps described herein take advantage of the fact that there are a limited traditional number of ways of to locate and call system functions and resources in order to detect a non-traditional call using a process of elimination.

In some embodiments, the technical advantage of "traps" can arise from the fact that, usually, a benign piece of code uses, directly or indirectly, the Loader of the operating system. As such, if and when the use of the Loader is monitored, some Loader API function executions can be marked, monitored, and/or classified as benign or non-benign. Thus, threat actors that determine the address of functions without the Loader (for example, in the case of the initial code executed after a successful exploit, which is usually forced to be "position independent") can be identified. An example of position independent code implementation may comprise scanning all process' memory looking for known function patterns, parsing the PEB structure, and manually finding the relevant function addresses.

In some embodiments, traditional detection methods may assume that an attacker would find an address using a known approach. However, some embodiments of the systems and methods herein do not rely on detection of any specific technique of obtaining function locations. Instead, some embodiments of the systems and methods described herein may monitor traditional function locating techniques and flag and/or eliminate some or all code that executes a system function without using traditional importing procedures.

Operating systems including, for example, Windows, MacOS, Linux, among others, may have defined executable file formats (e.g. Portable Executable), that may encapsulate the information necessary for the operating system loader (e.g. Windows Loader) ("Loader") to manage wrapped executable code.

An executable may import/export functions and/or data ("Symbols") from/to other executables in the machine. The Symbol import process may be implemented by the Loader so that an executable file can easily import/export Symbols. The Loader may also handle some or all pre-requisitions in the Symbol import process.

In some embodiments, a piece of code in the executable ("Code") could execute locally, that is, execute code that is located within the same region and/or executable. In some embodiments, the Code can execute non-locally by, for example, calling a function which is implemented and therefore located in another executable. In some embodiments, in order to call these non-local functions, the Code needs to determine the location of a target function (i.e. the virtual address of the function). The Code can locate the virtual address of the target function using one or more methods described below.

In some embodiments, the Code in the executable can use the Loader API directly to locate the address ("Dynamic Call"). In some embodiments, the Loader exports a set of functions, in its own executable library, allowing any code to dynamically load and retrieve information from a valid executable file. Hence, the code in the executable could use this API to load or locate the necessary executable (e.g. using "LoadLibraryA" or "GetModuleHandleA" API calls that interact with the Loader) and then locate the target exported symbol (e.g. using "GetProcAddress"). In some embodiments, the Code contains the address of the above functions used to locate the virtual address via the Loader API.

In some embodiments, the Code can locate the virtual address of a function using the Loader implicitly ("Static Call"). In some embodiments, an executable file defines (e.g. as part of the PE format specification) which Symbols and libraries are needed for the executable to be loaded and executed. In some embodiments, these Symbols and libraries may be loaded as part of the executable initialization process, such that the executable can use them during its execution without explicitly loading and retrieving the specified symbols by, for example, the Dynamic Call approach described above. In some embodiments, using a Static Call, the addresses of the imported functions will be stored in the specified executable within, for example, Import Address Table (thereafter "IAT") entries. In some embodiments, after the executable loading phase has ended, the executable may call the imported functions indirectly using the IAT table, without explicitly knowing where these functions are located.

In some embodiments, the Code may determine a function address independently ("Independent Call"). In some embodiments, the Code may determine the address of a target function without using a Static Call or a Dynamic Call. In some embodiments, in order to find a target function address, the code may perform one of the following: (a) find the address of the target Symbol or module needed and infer the target function address using the information that the PE module contains; or (b) use other functions that encapsulate the target function. In some embodiments, if the Code may determine the address of one or more specific Loader functions, the Code may also be able to determine the address of any function within any module using the Dynamic Call approach, and using these functions, could also retrieve the address of any executable module and function contained therein.

Determining the function address independently may be achieved using many methods. However, several known ways to do so are described below. In some embodiments, the Code may locate the address independently using internal Operating System structures data. For example, the Loader maintains and uses internal data structures during process execution. These data structures may include data and information needed for the Loader to work properly and efficiently. Among these data structures there may be several data structures that could be used to determine where symbols are located. For example, an application could use the Process Environment Block ("PEB"). The Loader may use the PEB for many purposes, including for maintaining information regarding loaded modules. Thus, the Code could retrieve the address of the executable it needs, and then retrieve the function address or alternatively, retrieve Loader related functions, as described above.

In some embodiments, the malicious code may retrieve the target function address using a heuristic approach. There may be many heuristic ways to determine the address of a loaded module or location of a function. For example, the virtual address space may comprise a pointer that points into an Operating System related module, such as NTDLL.DLL (the executable which holds many of the Loader implementation code). The malicious code could search for the module base address by reading backwards page aligned pages until the executable headers are found. Finally, the malicious code may be able find exported Loader functions and use them to find/load the relevant Symbols.

A Monitored Function, as described herein, may comprise a function that will be monitored for attempts to retrieve the function address independently. In some embodiments, an Import Address Table (IAT) code, as described herein, may comprise, for a symbol S in executable E, a piece of code which is executed because of an indirect call using a corresponding IAT entry (of executable E) for Symbol S. The IAT code may be used to mark a call as a Static Call. A Detour code, as described herein, may comprise, for symbol S, a piece of code which detours the execution of function S. Using the Detour Code, this code, the method of calling the function may be examined.

Implementation

In order to detect when the Code uses an Independent Call to retrieve a Monitored Function address, some embodiments of the systems and methods, and devices described herein may identify legitimate Static Calls and Dynamic Calls of the Monitored Function. In some embodiments, by identifying Static Calls and Dynamic Calls, the systems, methods, and devices described herein may, by process of elimination, detect Independent Calls of the Monitored Function.

In some embodiments, in order to detect Static Calls, Dynamic Calls, and local calls, the Monitored Functions may be instrumented to pivot the flow. In some embodiments, the systems and methods described herein may perform one or more of the following: (1) modify the IAT stubs; (2) Detour the Monitored Function with a Detour code; (3) Ensure that all modules are instrumented—for every loaded module and for every new module load, relevant data structures may be instrumented such that future calls will be redirected to detection system flow; and (4) monitor every call to the monitored functions and check whether the caller accesses the function directly (i.e. not through the Static/Dynamic/Local flow, which may be considered benign flows). In some embodiments, any attacker that retrieves the address of the Monitored Functions using an abnormal procedure (i.e. without using a Static Call/Dynamic Call/Local Call) may not comprise the frame, allowing the system and methods herein to identify the attacker.

Static Flow

In some embodiments, the static flow represents the case in which the Code initiates a function call to an external executable (e.g. Monitored Function) using a Static Call. As described above, the Code may initiate an indirect call using the corresponding IAT table entry. In order to detect the Static Call, some or all relevant IAT table entries for the set of monitored functions may be instrumented such that the flow will be pivoted to an IAT Code. In some embodiments, the IAT Code may detect the Static Call, update the relevant data structures, and restore the flow to the original function target.

Figure 12:
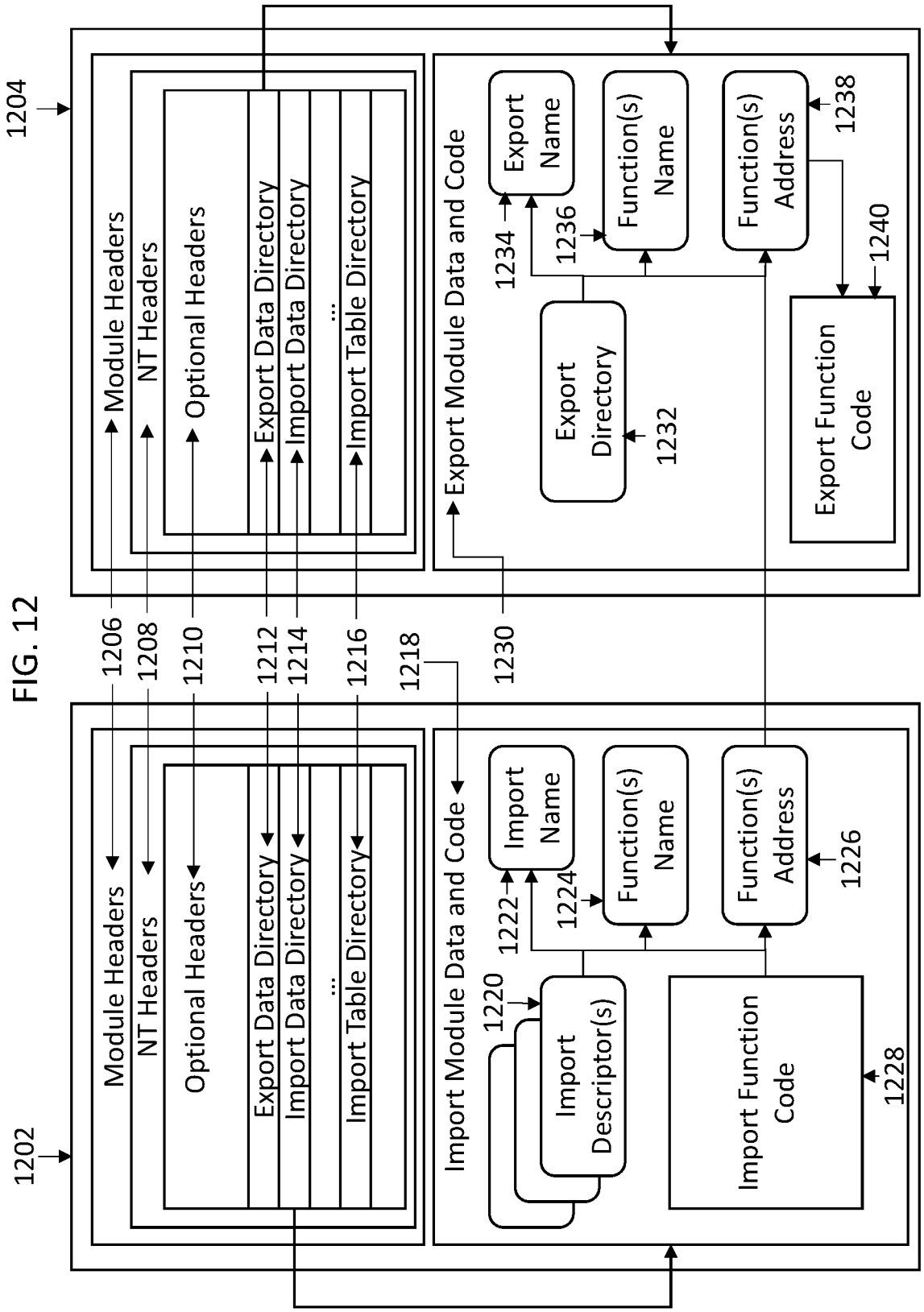
FIG. 12 illustrates an example diagram of a static linking process according to some embodiments herein.

FIG. 12 illustrates an example diagram of a static linking process according to some embodiments herein. In some embodiments, an importing module 1202 may retrieve an imported Symbol from an imported module 1204 using a static linking flow. In some embodiments, both the importing module 1202 and the imported module 1204 may comprise a module header 1206, an NT header 1208, and various optional headers 1210. In some embodiments, the optional headers 1210 may comprise an export data directory 1212, an import data directory 1214 and/or an import table directory 1216, among others. In some embodiments, the import data directory 1214 points to import module data and code 1218 that can be used to import one or more exported modules' data and code 1230 from the imported module 1204. In some embodiments, the import module data and code 1218 may comprise import descriptors 1220, including import names 1222, function names 1224, and function addresses 1226. Import function code 1228 can be used in combination with the function addresses 1226 in order to call an imported function from the imported function 1204. This information can retrieved from the export data directory 1212 of the imported module 1204. Similar to the import data directory 1216, the export data directory points to an export directory 1232, which includes export names 1234, function names 1236, and/or function addresses 1238. The export data directory 1214 points to data that is used to resolve imports to the entry points within the imported module 1204. Export function code 1240 can be utilized in combination with the function addresses 1238 to provide the addresses to importing module 1202. As previously noted, the static flow can occur as part of the executable initialization process, such that the executable can use the imported symbols during its execution without explicitly loading and retrieving the specified symbols by, for example, the Dynamic Call approach described above. In some embodiments, using a Static Call, the addresses of the imported functions will be stored in the specified executable within, for example, Import Address Table (e.g. function addresses 1226, thereafter "IAT") entries. In some embodiments, after the executable loading phase has ended, the executable may call the imported functions indirectly using the IAT table, without explicitly knowing where these functions are located. In some embodiments, the export function code 1240 comprises the code of the specified exported functions. In some embodiments, when module 1202 is compiled, the compiler generates a piece of code that uses the IAT, without knowing the specific values with the IAT. In some embodiments, the Loader, which is an executable implemented by the operating system, fills the IAT with the specific values for module 1202.

Figure 13:
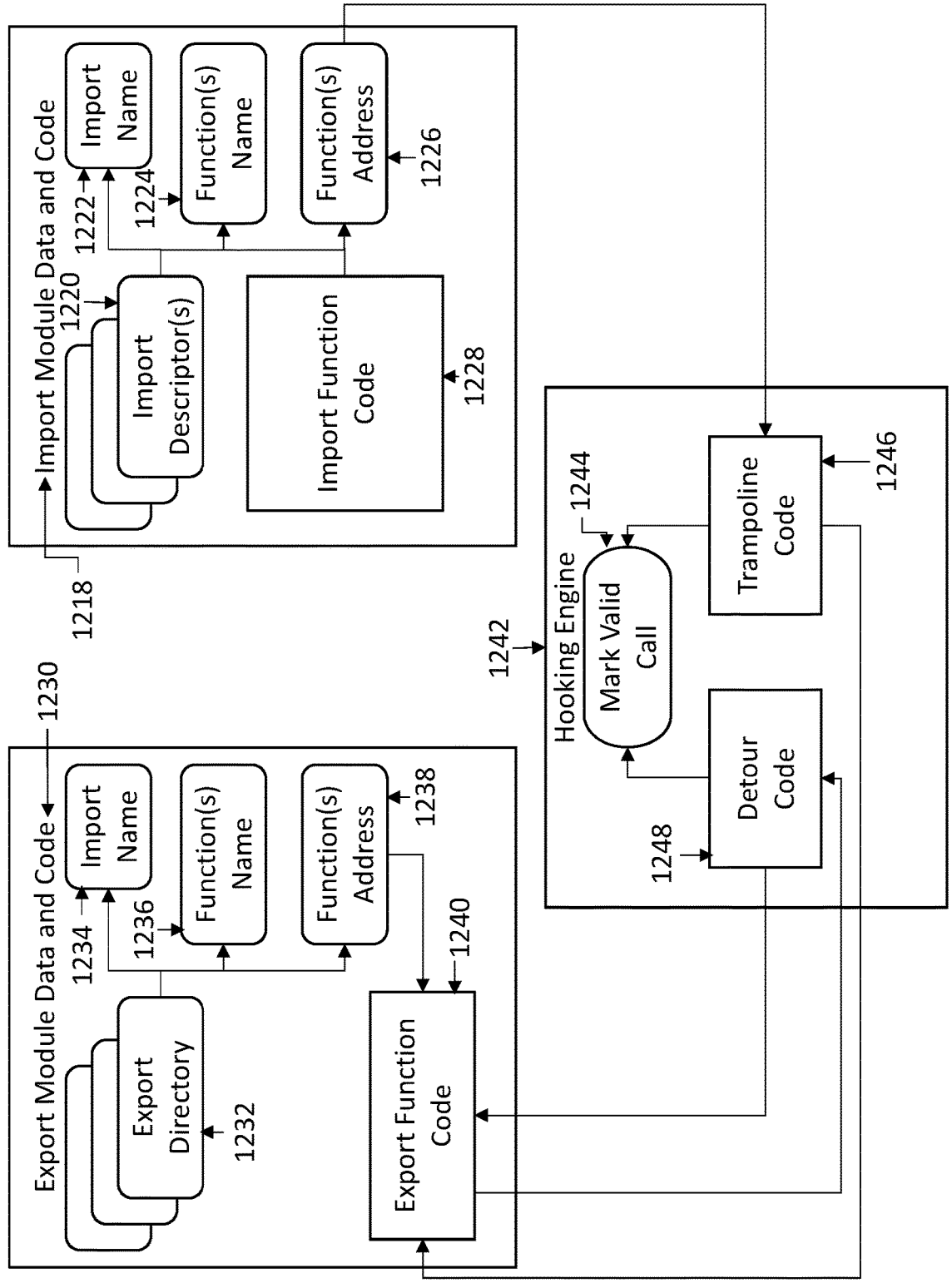
FIG. 13 illustrates an example diagram of a library independent code detection system and method for a static linking process according to some embodiments herein.

FIG. 13 illustrates an example diagram of a library independent code detection system and method for a static linking process according to some embodiments herein. In some embodiments, a hooking engine 1242 is utilized to monitor static calls. In some embodiments, when the importing module 1202 is attempting to retrieve an imported function address 1238 of imported module 1204 that is a monitored function, the systems and methods may involve replacing the original function address 1238 with a modified address. As such, in some embodiments, after loading the imported function address 1238 into IAT table 1226, the modified address will be provided and will be presented in the loaded importing module 1202. In some embodiments, upon execution, if the importing module 1202 attempts to call the monitored function, instead of calling the original function through its original function address, the modified function address will redirect the call to the hooking engine 1242. In some embodiments, when the modified function address is used to call the monitored function during execution, the call is instead directed to a trampoline code 1246 of the hooking engine 1242. In some embodiments, the trampoline code verifies that the modified function address has been called, which verifies that the importing module 1202 retrieved the function address via static call. As such, in some embodiments, the call is marked as a valid call at 1244. After marking the call as valid, the trampoline code may redirect the call back to the monitored function address for execution. In addition to the trampoline, export function code 1240 may be modified to detour the execution of the modified function to the hooking engine 1242. In this way, in some embodiments, before actual execution of the monitored function, the call is detoured to a detour code 1248 in the hooking engine 1242 to validate the call. In some embodiments, after the call has been verified, the flow is returned to the original monitored function for execution. In some embodiments, the detour functionality may comprise an aspect of the dynamic flow discussed below.

Dynamic Flow

In some embodiments, the dynamic flow represents the case where the Code initiates a function call to an external executable using a Dynamic Call. In the dynamic case, an executable may retrieve an external target address on runtime. In this case, the executable may ask the Loader where the external target could be found (both the target module and function). In some embodiments, as described above, the Code may initiate the call to the target function after determining the function address using the Loader API functions. In some embodiments, in order to detect the Dynamic Call, the systems and methods herein control the relevant Loader API functions that supply the information ("Resolving Functions") to the Code. In some embodiments, the control may be implemented by detouring the resolving functions and modifying their return values to the trampoline code 1246 for the corresponding Symbol. Using the method described above, in some embodiments, when the Code calls the returned address of the monitored function, it will be redirected to the Detour Code 1248.

In some embodiments, in dynamic flow, the names of the external libraries (shared libraries) are placed in the final executable file while the actual linking takes place at run time when both executable file and libraries are placed in the memory. Dynamic flow can allow several programs to use a single copy of an executable module.

Figure 15:
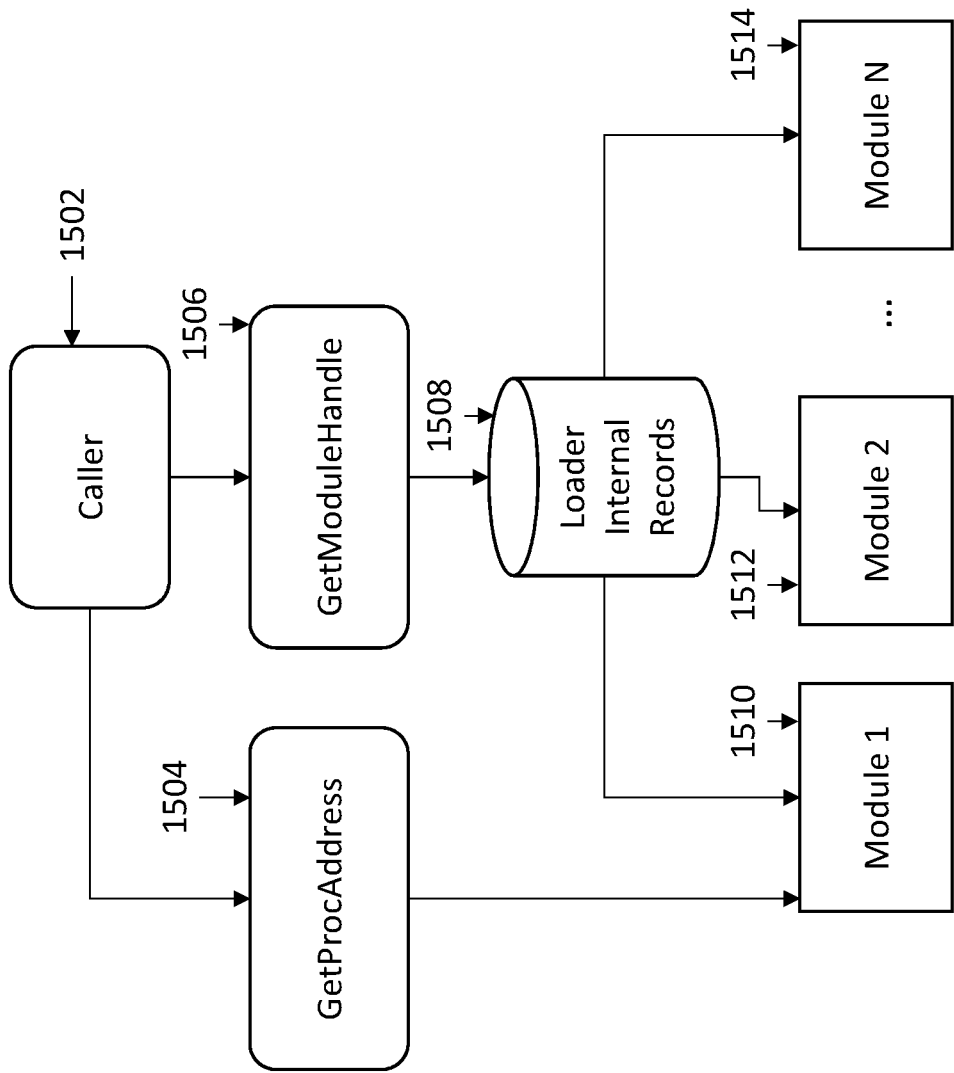
FIG. 15 illustrates an example diagram of a dynamic flow process according to some embodiments herein.

FIG. 15 illustrates an example diagram of a dynamic flow process according to some embodiments herein. In the illustrated example, if a caller 1502 (i.e. importing module 1202) needs to retrieve a module 1510 during runtime, it may be retrieved via various APIs, for example, GetModuleHandle 1506. Using the API 1506, the module handle can be retrieved from the Loader internal records 1508, which may comprise N Modules 1510, 1512, and 1514, among others. Additionally, the desired function address may be acquired dynamically using the API GetProcAddress 1504. However, in some embodiments, in order to retrieve the functions dynamically using the APIs, the caller 1502 must know where the relevant modules are located. In order to monitor the dynamic flow, the return address of the Loader relevant functions may be controlled, including GetProcAddress 1504. As such, the systems and methods herein may be configured to control the return address, which may be, for example, the original function address or a trampoline code.

Figure 14:
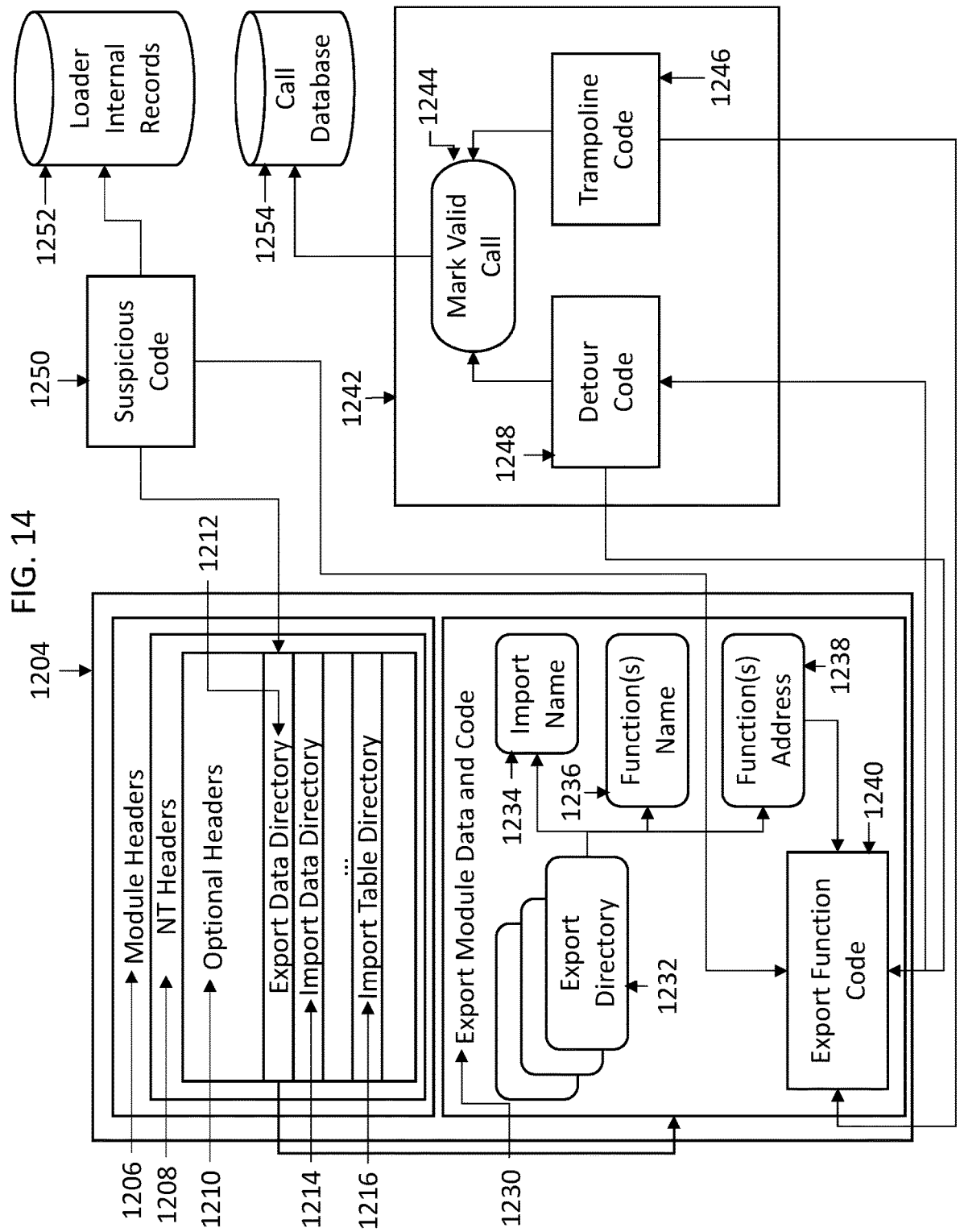
FIG. 14 illustrates an example diagram of a library independent code detection system according to some embodiments herein.
Figure 16:
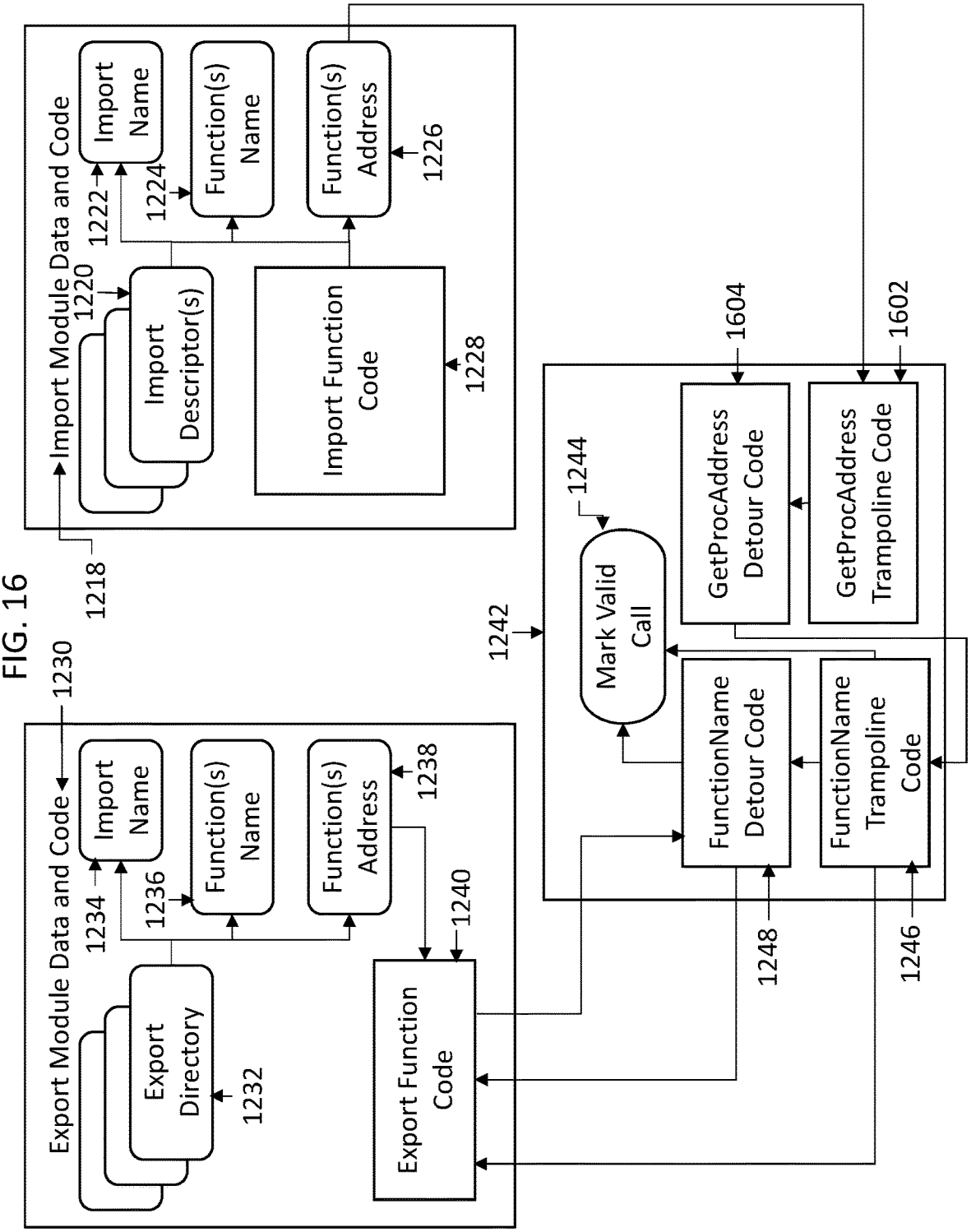
FIG. 16 illustrates an example diagram of a library independent code detection system and method for a dynamic flow process according to some embodiments herein.

FIG. 16 illustrates an example diagram of a library independent code detection system and method for a dynamic flow process according to some embodiments herein. In some embodiments, the Loader' APIs (e.g. GetProcAddress) can be modified by the systems and methods herein to direct the flow of operations to the hooking engine 1242. In particular, in some embodiments, when GetProcAddress is used by importing module 1202 during runtime, instead of returning the original imported function address, the importing function will be directed to a GetProcAddress trampoline code 1602. The GetProcAddress trampoline code 1602 may further direct the flow to a GetProcAddress detour code 1604. If the statically linked function APIs are being used by the importing module 1202 to retrieve a monitored function, the GetProcAddress detour code 1604 may redirect the flow to the function name trampoline 1246, which was discussed in relation to the static flow above. The function name trampoline 1246 may verify the function call is benign, since it traversed through the GetProcAddress trampoline code 1602 and the GetProcAddress detour code 1604, indicating that the call was made dynamically. Similar to the static flow, once verified, the trampoline code 1246 may call the original function after verification. As shown in FIG. 14, the verification data may be stored in a call database 1254. Again, similar to the static flow, before execution of the function, the export function code 1240 may be modified to detour the execution into a detour code 1248, which further verifies the benign nature of the call. After the detour code 1248 is completed, the flow may be returned to the original function for execution.

Suspicious Flow

FIG. 14 illustrates an example diagram of a library independent code detection system according to some embodiments herein. In particular, FIG. 14 illustrates how, in some embodiments, the hooking module would detect suspicious code attempting to access functions independently. In some embodiments, for example, a suspicious code 1250 may attempt to forego retrieving a target function via the static or dynamic flow) finding the target function using metadata (i.e. export headers) within the imported module 1204, 2) finding the target directly from the Loader's internal records 1252, or 3) calling the target function directly without going through the corresponding trampoline. In any case, in some embodiments, the suspicious code will not retrieve the modified address of the export function code 1240 upon loading the monitored function though the IAT table or the Loader. Thus, in some embodiments, upon execution, the suspicious code's call will not be directed to the trampoline code 1246 and the call will not be verified as a call made using the Loader. However, in some embodiments, upon execution of the function using export function code 1240, the call will still be detoured to detour code 1248 of hooking engine 1242. As such, in some embodiments, the hooking engine will verify, in the detour code 1248, that the call was not completed via standard (e.g. static/dynamic/local) flows because the corresponding trampoline code 1246 was not triggered. As such, the suspicious code 1250 can be flagged by the system as potentially malicious. In some embodiments, the detour code 1248 represents a piece of code that will be executed only when the monitored functions is called (either by dynamic, static or indirect call). This occurs because the systems and herein modify the target function. Hence, if any executable, including trampoline code 1246 attempts to call the exported function, the detour code will be executed.

Local Flow

As noted above, the Code may also initiate a Local call. Thus, in some embodiments, neither a Static Call nor a Dynamic Call may be initiated by the Code, but an Independent Call may not be necessary since the caller knows the target function address in the same executable or region. In order to differentiate between a locally-called function and an independently Call, some embodiments of the systems, methods, and devices herein may monitor the Detour Code to determine if a return address is located in the same executable/module as the Monitored Function. In some embodiments, if the return address is located in the same executable/module as the Monitored Function, the call may be determined to be a local call, rather than a suspicious Independent Call.

As such, through use of the trampoline codes, detour codes, and/or modification of the IAT tables and statically linked APIs, access to monitored functions may be verified. If an executable is determined to access a monitored function without using static, dynamic, or local calls, it can be flagged by a hooking engine as suspicious or malicious and may be reviewed further by malware detection software.

Computer System

Figure 17:
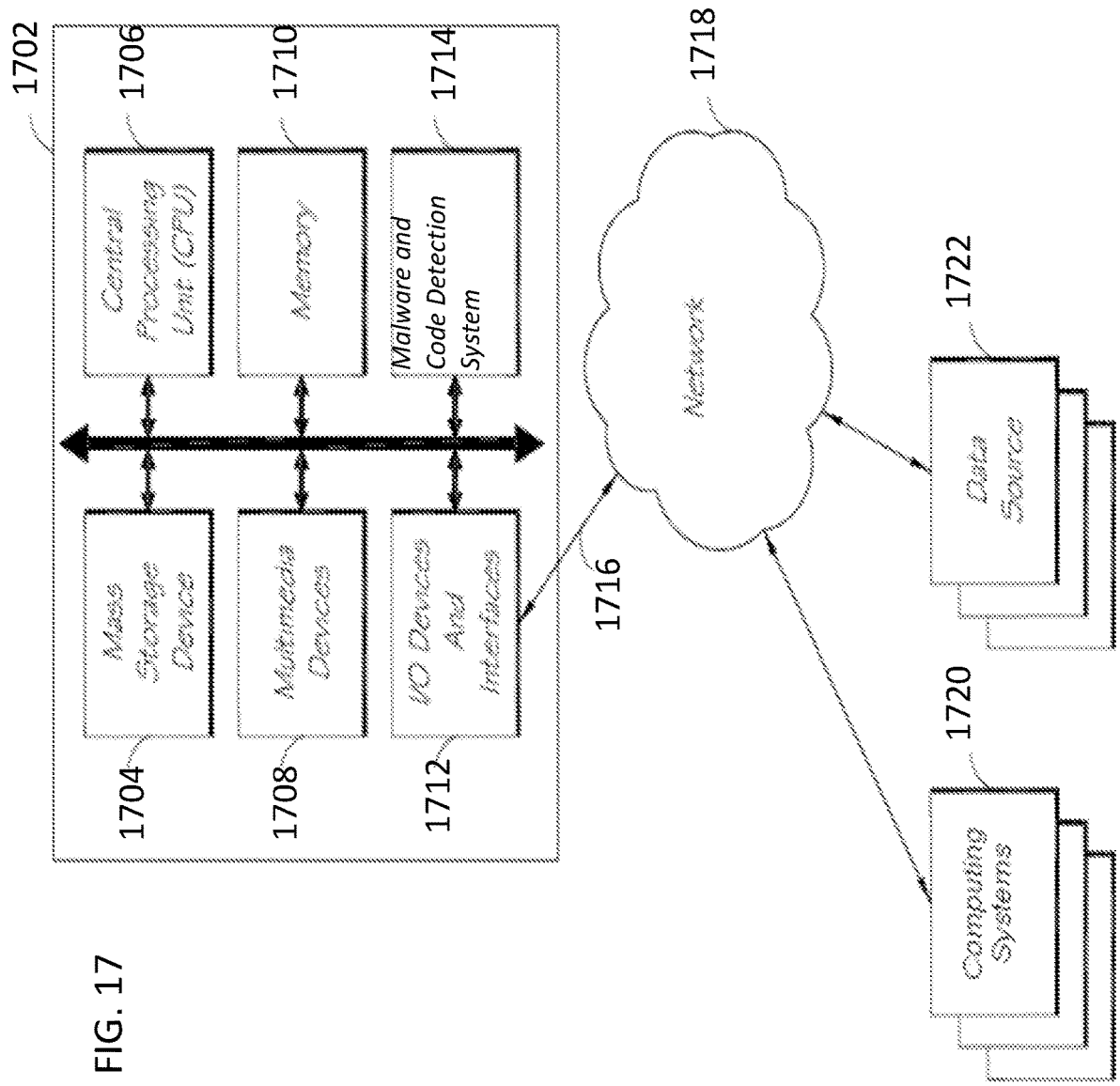
FIG. 17 illustrates a block diagram depicting an embodiment of a computer hardware system configured to run software for implementing one or more embodiments of an executable code detection, automatic feature extraction and position independent code detection system.

In some embodiments, the systems, processes, and methods described herein are implemented using a computing system, such as the one illustrated in FIG. 17. The example computer system 1702 is in communication with one or more computing systems 1720 and/or one or more data sources 1722 via one or more networks 1718. While FIG. 17 illustrates an embodiment of a computing system 1702, it is recognized that the functionality provided for in the components and systems of computer system 1702 can be combined into fewer components and systems, or further separated into additional components and systems.

Computing System Components

The computer system 1702 can comprise a malware and code detection system 1714 that carries out the functions, methods, acts, and/or processes described herein. The computer system 1802 can comprise a malware and code detection system 1714 executed on the computer system 1702 by a central processing unit 1706 discussed further below.

In general, the word "system," as used herein, refers to logic embodied in hardware or firmware or to a collection of software instructions, having entry and exit points. Systems are written in a program language, such as JAVA, C, or C++, or the like. Software systems can be compiled or linked into an executable program, installed in a dynamic link library, or can be written in an interpreted language such as BASIC, PERL, LUA, PHP or Python and any such languages. Software systems can be called from other systems or from themselves, and/or can be invoked in response to detected events or interrupts. Systems implemented in hardware include connected logic units such as gates and flip-flops, and/or can comprise programmable units, such as programmable gate arrays or processors.

Generally, the systems described herein refer to logical systems that can be combined with other systems or divided into sub-systems despite their physical organization or storage. The systems are executed by one or more computing systems and can be stored on or within any suitable computer readable medium or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

The computer system 1702 includes one or more processing units (CPU) 1706, which can comprise a microprocessor. The computer system 1702 further includes a physical memory 1710, such as random access memory (RAM) for temporary storage of information, a read only memory (ROM) for permanent storage of information, and a mass storage device 1704, such as a backing store, hard drive, rotating magnetic disks, solid state disks (SSD), flash memory, phase-change memory (PCM), 3D XPoint memory, diskette, or optical media storage device. Alternatively, the mass storage device can be implemented in an array of servers. Typically, the components of the computer system 1702 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1702 includes one or more input/output (I/O) devices and interfaces 1712, such as a keyboard, mouse, touch pad, and printer. The I/O devices and interfaces 1712 can comprise one or more display devices, such as a monitor, that allows the visual presentation of data to a user. More particularly, a display device provides for the presentation of GUIs as application software data, and multi-media presentations, for example. The I/O devices and interfaces 1712 can also provide a communications interface to various external devices. The computer system 1702 can comprise one or more multi-media devices 1708, such as speakers, video cards, graphics accelerators, and microphones, for example.

Computing System Device/Operating System

FIG. 17 is a block diagram depicting an embodiment of a computer hardware system configured to run software for implementing one or more embodiments of a malware and code detection system.

The computer system 1702 can run on a variety of computing devices, such as a server, a Windows server, a Structure Query Language server, a Unix Server, a personal computer, a laptop computer, and so forth. In other embodiments, the computer system 1702 can run on a cluster computer system, a mainframe computer system and/or other computing system suitable for controlling and/or communicating with large databases, performing high volume transaction processing, and generating reports from large databases. The computing system 1702 is generally controlled and coordinated by operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 1702 illustrated in FIG. 17 is coupled to a network 1718, such as a LAN, WAN, or the Internet via a communication link 1716 (wired, wireless, or a combination thereof). Network 1718 communicates with various computing devices and/or other electronic devices. Network 1718 is communicating with one or more computing systems 1720 and one or more data sources 1722. The computer system 1702 can comprise a malware and code detection system 1714 that can access or can be accessed by computing systems 1720 and/or data sources 1722 through a web-enabled user access point. Connections can be a direct physical connection, a virtual connection, and other connection type. The web-enabled user access point can comprise a browser system that uses text, graphics, audio, video, and other media to present data and to allow interaction with data via the network 1718.

The output system can be implemented as a combination of an all-points addressable display such as a cathode ray tube (CRT), a liquid crystal display (LCD), a plasma display, or other types and/or combinations of displays. The output system can be implemented to communicate with input devices and/or interfaces 1712 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output system can communicate with a set of input and output devices to receive signals from the user.

Other Systems

The computing system 1702 can comprise one or more internal and/or external data sources (for example, data sources 1722). In some embodiments, one or more of the data repositories and the data sources described above can be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 1702 can also access one or more data sources 1722. The data sources 1722 can be stored in a database or data repository. The computer system 1702 can access the one or more data sources 1722 through a network 1718 or can directly access the database or data repository through I/O devices and interfaces 1712. The data repository storing the one or more data sources 1722 can reside within the computer system 1702.

URLs and Cookies

In some embodiments, one or more features of the systems, methods, and devices described herein can utilize a URL and/or cookies, for example for storing and/or transmitting data or user information. A Uniform Resource Locator (URL) can comprise a web address and/or a reference to a web resource that is stored on a database and/or a server. The URL can specify the location of the resource on a computer and/or a computer network. The URL can comprise a mechanism to retrieve the network resource. The source of the network resource can receive a URL, identify the location of the web resource, and transmit the web resource back to the requestor. A URL can be converted to an IP address, and a Doman Name System (DNS) can look up the URL and its corresponding IP address. URLs can be references to web pages, file transfers, emails, database accesses, and other applications. The URLs can comprise a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can comprise data sent from a website and/or stored on a user's computer. This data can be stored by a user's web browser while the user is browsing. The cookies can comprise useful information for websites to remember prior browsing information, such as a shopping cart on an online store, clicking of buttons, login information, and/or records of web pages or network resources visited in the past. Cookies can also comprise information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Additional Embodiments

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will also be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

Embodiment #1: A computer-implemented method for programmatically identifying executable code within a file, the method comprising: accessing, by a computer system, a sequence of bytes from a portion of the file; extracting, by the computer system from the sequence of bytes, a predetermined number of n-grams, wherein each n-gram comprises a contiguous series of bytes in the sequence of bytes, and wherein each contiguous series of bytes in each n-gram comprises n number of bytes; generating, by the computer system, an array of counters, each counter of the array associated with one of the n-grams, wherein each counter comprises an integer value, the integer value generated based on the frequency of occurrence of the associated n-gram within the sequence of bytes; providing, by the computer system, the array of counters as an input feature for a predictive machine learning model; and determining, by the predictive machine learning model, a model probability value that the sequence of bytes comprises executable code, wherein the computer system comprises a computer processor and an electronic storage medium.

Embodiment #2: The method of Embodiment 1, wherein the executable code is programmatically identified without executing the sequence of bytes on the computer system.

Embodiment #3: The method of Embodiment 1 or 2, further comprising flagging, by the computer system, the sequence of bytes or the file for further analysis by a malware detection system when the model probability value that the sequence of bytes comprises executable code is above a predetermined threshold.

Embodiment #4: The method of any one of Embodiments 1-3, wherein the file comprises an executable file format.

Embodiment #5: The method of any one of Embodiments 1-4, wherein the file comprises a portable executable (PE) file.

Embodiment #6: The method of any one of Embodiments 1-5, wherein the portion of the file comprises one or more of a resource, a string, a variable, an overlay, or a section.

Embodiment #7: The method of any one of Embodiments 1-6, wherein the portion of the file does not comprise executable permissions.

Embodiment #8: The method of any one of Embodiments 1-7, wherein the n-grams comprise bi-grams.

Embodiment #9: The method of any one of Embodiments 1-7, wherein n is between 2 and 500.

Embodiment #10: The method of any one of Embodiments 1-7, wherein the n-grams comprise: a first set of n-grams, wherein n is a first integer for the first set of n-grams; and a second set of n-grams, wherein n is a second integer for the second set of n-grams, and wherein the first integer is different from the second integer.

Embodiment #11: The method of any one of Embodiments 1-10, wherein the predetermined number of n-grams is 500.

Embodiment #12: The method of any one of Embodiments 1-10, wherein the predetermined number of n-grams is between 50 and 10,000.

Embodiment #13: The method of any one of Embodiments 1-12, further comprising normalizing, by the computer system, each counter by the data length of the sequence of bytes.

Embodiment #14: The method of any one of Embodiments 1-13, wherein the predictive machine learning model comprises a plurality of separate models, each model corresponding to a different machine architecture code.

Embodiment #15: The method of Embodiment 14, wherein the machine architecture code comprises .NET, x86, and/or x64.

Embodiment #16: The method of any one of Embodiments 1-15, wherein the predictive machine learning model comprises at least one learning algorithm selected from the group of: support vector machines (SVM), linear regression, K-nearest neighbor (KNN) algorithm, logistic regression, naïve Bayes, linear discriminant analysis, decision trees, neural networks, or similarity learning.

Embodiment #17: The method of any one of Embodiments 1-15, wherein the predictive machine learning model comprises a random forest.

Embodiment #18: The method of Embodiment 17, wherein the random forest comprises a plurality of decision trees, each decision tree trained independently on a training set of bytes.

Embodiment #19: The method of Embodiment 18, wherein the model probability value is determined by averaging a plurality of decision tree probability values, wherein each decision tree probability value is generated by traversal of the sequence of bytes through each individual decision tree of the plurality of decision trees.

Embodiment #20: A computer system for programmatically identifying executable code within a file, the system comprising: one or more computer readable storage devices configured to store a plurality of computer executable instructions; and one or more hardware computer processors in communication with the one or more computer readable storage devices and configured to execute the plurality of computer executable instructions in order to cause the system to: access a sequence of bytes from a part of the file; extract, from the sequence of bytes, a predetermined number of n-grams, wherein each n-gram comprises a contiguous series of bytes in the sequence of bytes, and wherein each contiguous series of bytes in each n-gram comprises n number of bytes; generate an array of counters, each counter of the array associated with one of the n-grams, wherein each counter comprises an integer value, the integer value generated based on the frequency of occurrence of the associated n-gram within the sequence of bytes; provide the array of counters as an input feature for a predictive machine learning model; and determine, by the predictive machine learning model, a model probability value that the sequence of bytes comprises executable code.

Embodiment #21: A computer-implemented method for automatically extracting a machine learning feature from executable code for input to a malware detection model, the method comprising: accessing, by a computer system, the executable code from a file; inputting, by the computer system, the executable code to an image rescaling algorithm comprising an embedding matrix, wherein the image rescaling algorithm is configured to convert each byte of the executable code to a numerical vector using the embedding matrix to produce an embedded vector space, and wherein the order of the executable code is maintained during the conversion; channel filtering, by the computer system, one or more vector layers of the embedded vector space, wherein the channel filtering comprises: consolidating the one or more vector layers into a plurality of blocks; and applying a filter mechanism to produce one or more fixed size vector inputs, each fixed size vector input representing a corresponding vector layer or a block of the corresponding vector layer; inputting, by the computer system, the one or more fixed size vector inputs into an input layer of a neural network, the neural network comprising a plurality of layers of processing units, wherein the plurality of layers comprise at least the input layer, one or more hidden layers, and an output layer, wherein each successive layer of the plurality of layers uses an output value from a previous layer as an input value, and wherein the output layer is configured to generate a classification of maliciousness of the executable code; extracting, by the computer system, the output value of a final hidden layer immediately preceding the output layer of the neural network; and providing, by the computer system, the output value of the final hidden layer as a machine learning feature to the malware detection model, wherein the computer system comprises a computer processor and an electronic storage medium.

Embodiment #22: The method of Embodiment 21, wherein the neural network comprises a supervised, semi-supervised, or unsupervised learning model.

Embodiment #23: The method of Embodiment 21 or 22, wherein the executable code is part of a portable executable (PE) file.

Embodiment #24: The method of any one of Embodiments 21-23, wherein each of the one or more hidden layers is configured to perform a transformation on the input value to generate the output value for an immediately consecutive layer.

Embodiment #25: The method any one of Embodiments 21-24, wherein the image rescaling algorithm comprises a pre-processing neural network, the pre-processing neural network comprising Word2Vec.

Embodiment #26: The method of any one of Embodiments 21-25, further comprising discarding the classification of maliciousness of the executable code from the output layer of the neural network.

Embodiment #27: The method of any one of Embodiments 21-26, wherein the neural network comprises between 1 and 2000 hidden layers.

Embodiment #28: The method of any one of Embodiments 21-27, wherein the filter mechanism comprises a low-pass filter, box filter, delta filter, or Gaussian filter.

Embodiment #29: A computer system for automatically extracting a machine learning feature from executable code for input to a malware detection model, the system comprising: one or more computer readable storage devices configured to store a plurality of computer executable instructions; and one or more hardware computer processors in communication with the one or more computer readable storage devices and configured to execute the plurality of computer executable instructions in order to cause the system to: access the executable code from a file; input the executable code to an image rescaling algorithm comprising an embedding matrix, wherein the image rescaling algorithm converts each byte of the executable code to a numerical vector using the embedding matrix to produce an embedded vector space, and wherein the order of the executable code is maintained during the conversion; channel filter one or more vector layers of the embedded vector space by: consolidating the one or more vector layers into a plurality of blocks; and applying a filter mechanism to produce one or more fixed size vector inputs, each fixed size vector input representing a corresponding vector layer or a block of the corresponding vector layer; input the one or more fixed size vector inputs into an input layer of a neural network, the neural network comprising a plurality of layers of processing units, wherein the plurality of layers comprise at least the input layer, one or more hidden layers, and an output layer, wherein each successive layer of the plurality of layers uses an output value from a previous layer as an input value, and wherein the output layer is configured to generate a classification of maliciousness of the executable code; extract the output value of a final hidden layer immediately preceding the output layer of the neural network; and provide the output value of the final hidden layer as a machine learning feature to the malware detection model.

Embodiment #30: The system of Embodiment 29, wherein the neural network comprises a supervised, semi-supervised, or unsupervised learning model.

Embodiment #31: The system of Embodiment 29 or 30, wherein the executable code is part of a portable executable (PE) file.

Embodiment #32: The system of any one of Embodiments 29-31, wherein each of the one or more hidden layers is configured to perform a transformation on the input value to generate the output value for an immediately consecutive layer.

Embodiment #33: The system any one of Embodiments 29-32, wherein the image rescaling algorithm comprises a pre-processing neural network, the pre-processing neural network comprising Word2Vec.

Embodiment #34: The system of any one of Embodiments 29-33, wherein the system is further caused to discard the classification of maliciousness of the executable code from the output layer of the neural network.

Embodiment #35: The system of any one of Embodiments 29-34, wherein the neural network comprises between 1 and 2000 hidden layers.

Embodiment #36: The system of any one of Embodiments 29-35, wherein the filter mechanism comprises a low-pass filter, box filter, delta filter, or Gaussian filter.

Embodiment #37: A system for library position independent code detection, the system comprising: one or more computer readable storage devices configured to store a plurality of computer executable instructions; and one or more hardware computer processors in communication with the one or more computer readable storage devices and configured to execute the plurality of computer executable instructions in order to cause the system to: instrument an import address table (IAT) entry of a monitored symbol, the instrumenting of the IAT entry comprising: replacing a monitored symbol address within the IAT entry of the monitored symbol with a modified address; executing a trampoline code upon a call of the modified address to detect and validate a static call of the monitored symbol; and redirecting the call of the modified address to the monitored symbol address; instrument one or more Loader API functions, the instrumenting of the one or more Loader API functions comprising: modifying the one or more Loader API functions to return values that lead to the trampoline code; detouring the execution of the monitored symbol to a detour code to detect and validate a call of the monitored symbol; redirecting the call of the monitored symbol to the monitored symbol address; monitor the trampoline code and the detour code of the monitored symbol to determine if calls from an executable comprise a static call, a dynamic call, or a local call; if the system determines that at least one call from the executable does not comprise a static call, dynamic call, or a local call, flag the executable as suspicious or malicious for a malware detection system.

Embodiment #38: The system of Embodiment 37, wherein the system is further caused to, if the system determines that the at least one call does not comprise a static call, dynamic call, or local call, classify the at least one call as an independent call.

Embodiment #39: The system of Embodiment 37, wherein the system is further caused to, if the system determines that the calls comprise a static call, dynamic call, or local call, classify the calls as benign calls.

Embodiment #40: The system of Embodiment 37 or 39, wherein the system is further caused to, if the system determines that the calls comprise a static call, dynamic call, or local call, classify the executable as benign.

Embodiment #41: The system of any one of Embodiments 37-40, further comprising: A hooking engine comprising the trampoline code and the detour code; and one or more call databases configured to store data related to the calls.

Embodiment #42: The system of any one of Embodiments 37-41, wherein the dynamic call comprises an attempted retrieval of the monitored symbol address during execution of the executable.

Embodiment #43: The system of any one of Embodiments 37-42, wherein the static call comprises an attempted retrieval of the monitored symbol address during initialization of the executable.

Embodiment #44: The system of any one of Embodiments 37-43, wherein determination of whether the calls from the executable comprise a local call comprises monitoring the detour Code to determine if a return address is located in the same executable as the monitored symbol.

Embodiment #45: The system of any one of Embodiments 37-44, wherein the one or more Loader API functions comprise one or both of GetModuleHandle or GetProcAddress.

Embodiment #46: The system of Embodiment 29, wherein the at least one call is initiated by the executable using metadata retrieved from a module comprising the monitored symbol.

Embodiment #47: The system of Embodiment 29, wherein the at least one call is initiated by the executable using data retried from a Loader internal record.

Embodiment #48: The system of Embodiment 29, wherein the at least one call is initiated by the executable by calling the monitored symbol without triggering the trampoline code.

Embodiment #49: A computer implemented method for library position independent code detection, the method comprising: instrumenting, by a computer system, an import address table (IAT) entry of a monitored symbol, the instrumenting of the IAT entry comprising: replacing a monitored symbol address within the IAT entry of the monitored symbol with a modified address; executing a trampoline code upon a call of the modified address to detect and validate a static call of the monitored symbol; and redirecting the call of the modified address to the monitored symbol address; instrumenting, by the computer system, one or more Loader API functions, the instrumenting of the one or more Loader API functions comprising: modifying the one or more Loader API functions to return values that lead to the trampoline code; detouring the execution of the monitored symbol to a detour code to detect and validate a call of the monitored symbol; redirecting the call of the monitored symbol to the monitored symbol address; monitoring, by the computer system the trampoline code and the detour code of the monitored symbol to determine if calls from an executable comprise a static call, a dynamic call, or a local call; if the computer system determines that at least one call from the executable does not comprise a static call, dynamic call, or a local call, flagging, by the computer system, the executable as suspicious or malicious for a malware detection system, wherein the computer system comprises a computer processor and an electronic storage medium.

Embodiment #50: The method of Embodiment 49, further comprising, if the computer system determines that the at least one call does not comprise a static call, dynamic call, or local call, classifying the at least one call as an independent call.

Embodiment #51: The method of Embodiment 50, further comprising, if the computer system determines that the calls comprise a static call, dynamic call, or local call, classifying the calls as benign calls.

Embodiment #52: The method of Embodiment 50 or 51, further comprising, if the computer system determines that the calls comprise a static call, dynamic call, or local call, classifying the executable as benign.

Embodiment #53: The method of any one of Embodiments 49-52, wherein the trampoline code and the detour code comprise one or more portions of a hooking engine, the hooking engine connected to a call database configured to store data related to the calls.

Embodiment #54: The method of any one of Embodiments 49-53, wherein the dynamic call comprises an attempted retrieval of the monitored symbol address during execution of the executable.

Embodiment #55: The method of any one of Embodiments 49-54, wherein the static call comprises an attempted retrieval of the monitored symbol address during initialization of the executable.

Embodiment #56: The method of any one of Embodiments 49-55, wherein determination of whether the calls from the executable comprise a local call comprises monitoring the detour Code to determine if a return address is located in the same executable as the monitored symbol.

Embodiment #57: The method of any one of Embodiments 49-56, wherein the one or more Loader API functions comprise one or both of GetModuleHandle or GetProcAddress.

Embodiment #58: The method of any one of Embodiments 49-57, wherein the at least one call is initiated by the executable using metadata retrieved from a module comprising the monitored symbol.

Embodiment #59: The method of Embodiment 58, wherein the at least one call is initiated by the executable using data retried from a Loader internal record.

Embodiment #60: The method of Embodiment 58, wherein the at least one call is initiated by the executable by calling the monitored symbol without triggering the trampoline code.

What is claimed is:

1. A computer-implemented method for programmatically identifying executable code within a file, the method comprising:
   accessing, by a computer system, a sequence of bytes from a portion of the file;
   extracting, by the computer system, from the sequence of bytes, a number of n-grams, wherein each n-gram comprises a contiguous series of bytes in the sequence of bytes, and wherein the contiguous series of bytes of each respective n-gram comprises n number of bytes;
   generating, by the computer system, an array of counters, each counter of the array associated with one of the n-grams, wherein each counter comprises an integer value based on a frequency of occurrence of the associated n-gram within the sequence of bytes; and
   applying, by the computer system a predictive model to the array of counters to determine a probability that the sequence of bytes comprises executable code, wherein the computer system comprises a computer processor and an electronic storage medium.

2. The computer-implemented method of claim 1, wherein the executable code is programmatically identified without executing the sequence of bytes on a computer system.

3. The computer-implemented method of claim 1, further comprising flagging, by the computer system, the sequence of bytes of the file for further analysis by a malware detection system when the probability that the sequence of bytes comprises executable code is above a predetermined threshold.

4. The computer-implemented method of claim 1, wherein the file comprises an executable file format.

5. The computer-implemented method of claim 4, wherein the file comprises a portable executable (PE) file.

6. The computer-implemented method of claim 5, wherein the portion of the file comprises one or more of a resource, a string, a variable, an overlay, or a section.

7. The computer-implemented method of claim 1, wherein the portion of the file does not comprise executable permissions.

8. The computer-implemented method of claim 1, wherein the n-grams comprise bi-grams.

9. The computer-implemented method of claim 1, wherein n is between 2 and 500.

10. The computer-implemented method of claim 1, wherein the number of n-grams corresponds to every n-gram present in the sequence of bytes.

11. The computer-implemented method of claim 1, wherein the n number of bytes in the contiguous series of bytes of each respective n-gram is selected based on the number of n-grams.

12. The computer-implemented method of claim 1, wherein the number of n-grams is a predetermined number between 50 and 10,000.

13. The computer-implemented method of claim 1, further comprising normalizing, by the computer system, each counter by a data length of the sequence of bytes.

14. The computer-implemented method of claim 1, wherein the predictive model comprises a plurality of models, each model of the plurality of models corresponding to a different machine architecture code.

15. The computer-implemented method of claim 14, wherein the machine architecture code comprises .NET, x86, and/or x64.

16. The computer-implemented method of claim 1, wherein the predictive model comprises at least one learning algorithm selected from the group of: support vector machines (SVM), linear regression, K-nearest neighbor (KNN) algorithm, logistic regression, naïve Bayes, linear discriminant analysis, decision trees, neural networks, or similarity learning.

17. The computer-implemented method of claim 1, wherein the model comprises a random forest.

18. The computer-implemented method of claim 17, wherein the random forest comprises a plurality of decision trees, each decision tree trained independently on a training set of bytes.

19. A non-transitory computer readable medium containing program instructions for causing a computer to perform a method of:
- accessing a sequence of bytes from a portion of a file;
- extracting, from the sequence of bytes, a number of n-grams, wherein each n-gram comprises a contiguous series of bytes in the sequence of bytes, and wherein the contiguous series of bytes of each respective n-gram comprises n number of bytes;
- generating, an array of counters, each counter of the array associated with one of the n-grams, wherein each counter comprises an integer value based on a frequency of occurrence of the associated n-gram within the sequence of bytes; and
- applying a predictive model to the array of counters to determine a probability that the sequence of bytes comprises executable code.

20. A computer system for programmatically identifying executable code within a file, the system comprising:
- one or more computer readable storage devices configured to store a plurality of computer executable instructions; and
- one or more hardware computer processors in communication with the one or more computer readable storage devices and configured to execute the plurality of computer executable instructions in order to cause the system to:
  - access a sequence of bytes from a part of the file;
  - extract, from the sequence of bytes, a number of n-grams, wherein each n-gram comprises a contiguous series of bytes in the sequence of bytes, and wherein the contiguous series of bytes of each respective n-gram comprises n number of bytes;
  - generate an array of counters, each counter of the array associated with one of the n-grams, wherein each counter comprises an integer value based on a frequency of occurrence of the associated n-gram within the sequence of bytes; and
  - apply a predictive model to the array of counters to determine a probability that the sequence of bytes comprises executable code.

* * * * *